United States Patent [19]

Cohen et al.

[11] Patent Number: 5,373,440
[45] Date of Patent: Dec. 13, 1994

[54] PROMOTIONAL GAME METHOD AND APPARATUS THEREFOR

[75] Inventors: Leopold Cohen, Las Vegas, Nev.; Charles I. Bernhaut, North Brunswick, N.J.; Robert T. Grindell, Sunrise, Fla.

[73] Assignee: UC'NWIN Systems, Inc., Ft. Lauderdale, Fla.

[21] Appl. No.: 893,654

[22] Filed: Jun. 4, 1992

Related U.S. Application Data

[63] Continuation-in-part of Ser. No. 821,988, Jan. 16, 1992, Pat. No. 5,231,568.

[51] Int. Cl.⁵ .................... G06F 15/28; A63F 5/04
[52] U.S. Cl. .................... 364/410; 364/401; 273/139 A
[58] Field of Search .............. 364/401, 410, 411, 412; 283/51, 56, 901, 903, 102; 273/138 A, 139; 235/380, 375, 381

[56] References Cited

U.S. PATENT DOCUMENTS

| | | | |
|---|---|---|---|
| 3,594,760 | 7/1971 | Haker | 340/325 |
| 4,072,930 | 2/1978 | Lucero et al. | 340/152 T |
| 4,335,809 | 6/1982 | Wain | 194/1 R |
| 4,369,442 | 1/1983 | Werth et al. | 340/825.35 |
| 4,373,726 | 2/1983 | Churchill et al. | 273/138 A |
| 4,494,197 | 1/1985 | Tray et al. | 364/412 |
| 4,518,852 | 5/1985 | Stockburger et al. | 235/381 |
| 4,573,681 | 3/1986 | Okada | 273/143 R |
| 4,648,600 | 3/1987 | Olliges | 273/138 A |
| 4,652,998 | 3/1987 | Koza | 364/412 |
| 4,669,729 | 6/1987 | Solitt et al. | 273/138 |
| 4,674,041 | 6/1987 | Lemon et al. | 364/401 |
| 4,681,548 | 7/1987 | Lemelson | 434/311 |
| 4,712,799 | 12/1987 | Fraley | 273/138 A |
| 4,723,212 | 2/1988 | Mindrum et al. | 364/401 |
| 4,775,935 | 10/1988 | Yourick | 364/401 |
| 4,856,787 | 8/1989 | Itkis | 273/737 |
| 4,882,473 | 11/1989 | Bergeron et al. | 235/380 |
| 4,943,090 | 7/1990 | Fienberg | 273/139 |
| 4,982,346 | 1/1991 | Girouard et al. | 364/550 |
| 5,002,313 | 3/1991 | Salvatore | 283/102 |
| 5,007,641 | 4/1991 | Seidman | 273/138 |
| 5,033,744 | 7/1991 | Bridgeman | 273/85 CP |
| 5,038,022 | 8/1991 | Lucero | 235/380 |
| 5,042,809 | 8/1991 | Richardson | 273/138 A |
| 5,083,271 | 1/1992 | Thatcher et al. | 364/411 |
| 5,085,308 | 2/1992 | Wilhem | 194/205 |
| 5,179,517 | 1/1993 | Sarbin et al. | 364/410 |
| 5,212,368 | 5/1993 | Hara | 235/375 |

FOREIGN PATENT DOCUMENTS 0070613 1/1983 European Pat. Off. .

OTHER PUBLICATIONS

"Match The Super Star" ©1978 Coca-Cola Corp.

*Primary Examiner*—Roy N. Envall, Jr.
*Assistant Examiner*—A. Bodendorf
*Attorney, Agent, or Firm*—Lerner, David, Littenberg, Krumholz & Mentlik

[57] ABSTRACT

A patron inserts a coded game card into a game machine which reads the code and determines whether the game card has been played within a designated time period. If the game card has been played within such period, the game machine is not permitted to operate and a message will be generated. If the card has not been played within the time period, the game machine operates and randomly positions a number of product and/or service representations with respect to one another. Prescribed combinations of the representations permit the patron to win a prize. Symbols, which may include symbols representing a business identity, may optionally be employed as wild cards in forming the prescribed combinations. In addition to bearing a unique game card code, the game card can also contain establishment codes which permit a game card to be played only at particular establishments. Other game cards can be specially coded to provide maintenance instructions to the game machine.

61 Claims, 5 Drawing Sheets

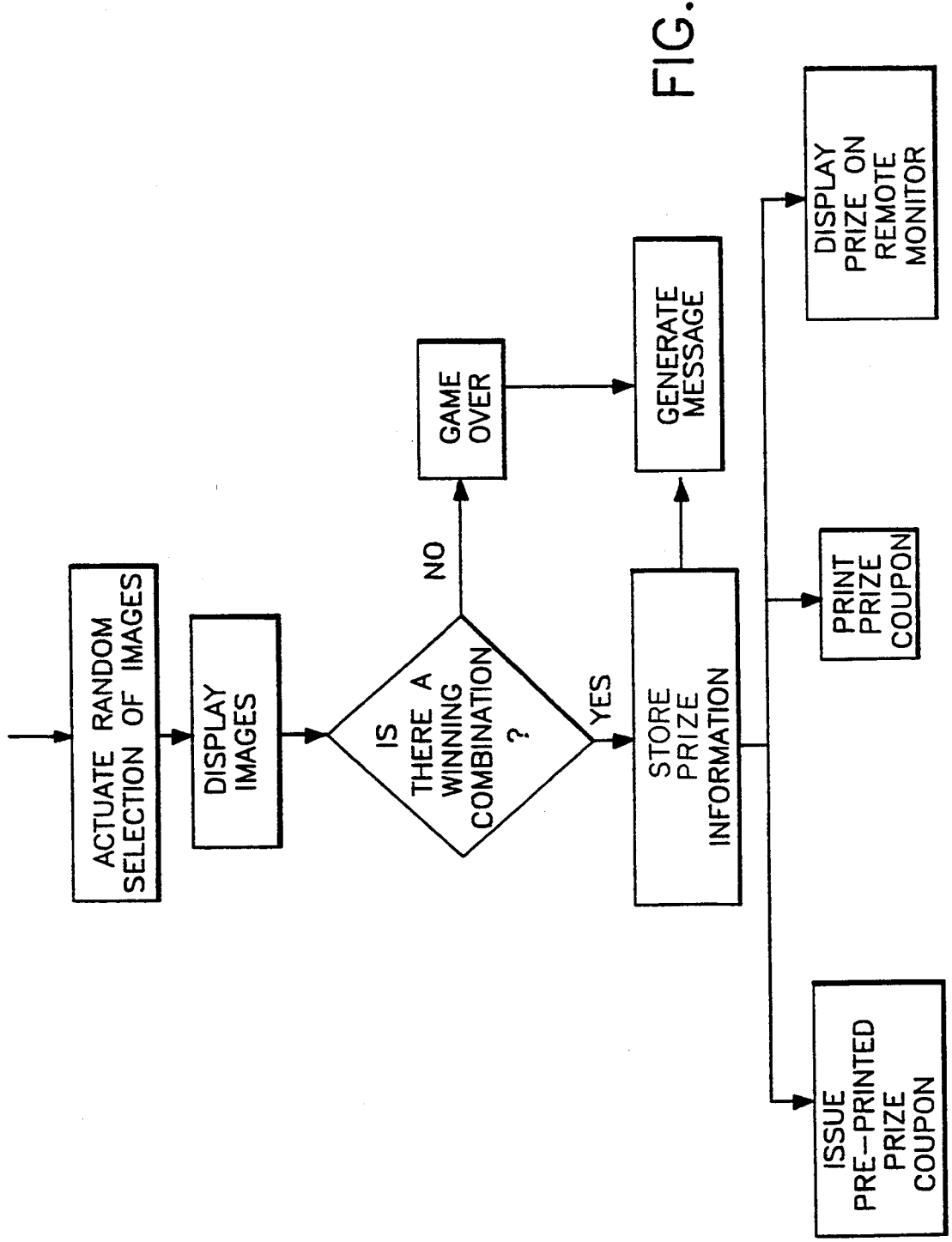

PROMOTIONAL GAME METHOD AND APPARATUS THEREFOR

CROSS-REFERENCE TO RELATED APPLICATIONS

The present application is a continuation-in-part application of application Ser. No. 07/821,988 filed on Jan. 16, 1992 now U.S. Pat. No. 5,231,568.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to games and, more particularly, relates to games in which prizes are awarded. Still more particularly, the present invention relates to games in which the prizes awarded are the products displayed as a result of playing the game.

2. Description of the Prior Art

It is customary for all types of businesses to promote their products and services by offering those products and services at more attractive prices. Such promotions typically involve the use of coupons, such as buy one-get one free coupons, coupons redeemable for products or services at reduced prices or for free, rebate coupons, etc. These promotional techniques are, at best, only marginally effective at promoting the goods and services of businesses and, accordingly, the extraordinary expense in conducting these promotions is hardly justified. Thus, in promotions employing coupons, the coupons are typically distributed through newspapers, magazines and mass mailings to households, and therefore mostly reach consumers who are totally disinterested in the particular product or service being promoted. Of those consumers that may potentially be interested in the particular product or service, many cannot be bothered or do not remember to clip the coupon from the newspaper or magazine and bring it to a store for redemption. Other consumers may collect the coupons, but fail to redeem same prior to their expiration dates. These burdens placed on consumers result in low coupon redemption rates and, hence, inefficient and ineffective promotional programs by businesses.

Other promotional techniques which are frequently employed by businesses are similarly inefficient in that they are not targeted to narrowly defined groups of potential customers. Accordingly, these promotional schemes, which include contests, sweepstakes, free product giveaways, etc., suffer from drawbacks similar to those encountered when using coupons.

In order to overcome the poor results which have been obtained with these conventional promotional schemes, attempts have been made to devise programs which are targeted to more select groups of consumers. In one such system, shown in U.S. Pat. No. 4 723,212 issued Feb. 2, 1988, the purchase of certain products causes the generation of discount coupons which may be used to purchase different products from the ones originally purchased. Each item purchased is examined to see if a coupon is to be generated, and when all items have been examined and the maximum number of coupons determined, a suitable number of discount coupons are printed and issued. The patron does not take part in the process other than to select the original products for purchase. There is no display of the manufacturer's products, and the prizes awarded, if any, are intentionally different from the ones the patron has selected.

Other attempts have been made to develop promotional schemes which will be of more interest to potential customers. Typically, such schemes center around the playing of a game. In one system, described in U.S. Pat. No. 5,007,641 issued Apr. 16, 1991, a number of tokens having the same common code are distributed to patrons by an establishment or packaged with the product line to be promoted. The tokens must be brought by the patron to the establishment and played in the game device. Certain of the tokens result in the award of a prize which must be claimed at a redemption booth. The system itself does not display the manufacturer's products and therefore neither improves the patron's memory of such products nor triggers a desire to purchase such products. Moreover, the prizes awarded bear no resemblance to the code shown on the token or the game display.

A further known device, disclosed in U.S. Pat. No. 4,982,346 issued Jan. 1, 1991, shows visual advertisements of various products and dispenses coupons if the patron wins. The win is determined matching the number on a readable card with a pre-selected set of winning numbers in the device. Again, the actual prize won is not shown by the device and bears no direct relationship to what is shown.

Thus, despite the considerable effort that has gone into the development of many different promotional systems, there remains a need for a more effective system which will attract the attention of potential customers and which can acquaint these customers with the products and/or services being promoted by a business. Preferably, this system can be operated within a business establishment where it can be targeted to a more select group of potential customers.

SUMMARY OF THE INVENTION

One aspect of the invention provides a promotional gaming method which includes the step of establishing at least two separate series of representations, including representations of products, services or both on a game machine. Most preferably, at least some of these representations are present in two or more of these series. Alternatively or additionally, the series may include "wild card" symbols. The method further includes the step of, upon play by a patron, randomly placing the series with respect to one another and with respect to a fixed reference location on the game machine. One representation of a product or service on a first series may at times be aligned with one representation of the product or service on the other series to form a winning combination. Where "wild card" symbols are present, a winning combination may be formed by a product or service representation and a wild card symbol. The method further includes the step of awarding a prize to the patrons who form such a winning combination. Most preferably, the prize is a product or service which is related in some way to the products or services in the winning combination. The patron will naturally focus his or her attention on the displayed representations to see if a winning combination is formed. Because product or service representations are displayed, the promotional game according to this aspect of the invention will focus the patron's attention directly on the product or service representations. The patron cannot play the game without becoming conscious of a product or service being promoted. Moreover, the game is enjoyable and induces patrons to play.

In preferred methods according to this aspect of the invention, each patron who wishes to play the promotional game in an effort to win prizes obtains a game card by registering at a suitable service desk. Certain identifying information about the patron is recorded and a uniquely coded game card is issued to such patron and cross-referenced against his identifying information. The game card desirably also includes a code identifying the establishment in which the game card can be played.

In these preferred methods, the patron takes his game card and inserts it into a game machine to initiate play. In highly preferred methods, the establishment code is first checked to determine whether the game card is entitled to be played on that game machine. The unique code of the game card identifying the patron is then checked against the stored codes of game cards played within a prescribed period, such as 24 hours, and if it is found already stored, signifying that it has initiated play within the last 24 hour period, the game machine is locked out and the date and time of the previous play and an appropriate message are displayed on a visual display of the game machine.

In the event no match is found with stored codes, the random selection device is operated and a visual display of the peripheral surfaces of, for example, three adjacent wheels is shown by the game machine. On these peripheral surfaces are depicted a series of images representing products, services, manufacturer and other business symbols and other indicia. Since the three wheels spin independently, various combinations of these images can be formed entirely at random, including certain combinations for which prizes can be awarded. Alternatively, certain selection criteria can be established so that the formation of a winning combination will be less than entirely random although it will still appear to be random to the playing patron. For example, winners could be established based on preselected game card codes or at preselected times so that a patron playing at, say, 1:04 p.m. could automatically form a winning combination. As to individual patrons these would still be considered random selections of winners, and the formation of the winning combinations would appear to be entirely random.

In highly preferred methods, the game machine may display more than one image at a time on each of the wheels. Thus, for example, when the wheels stop moving there may be displayed an array of nine images consisting of three images on each of the three wheels. Although only three images will be compared to determine whether there is a winning combination, the display of the additional six images increases the advertising effect. In a variant of this method, the additional six images may remain fixed and only the images in those positions which must be compared to determine whether there is a winning combination will be moved randomly.

Another aspect of the invention provides a game machine for playing the promotional game. The game machine includes a display for establishing a reference point and at least two separate series of images, at least one of which includes representations of products, services or a combination of products and services, the two series being independently movable with respect to one another and with respect to the reference location so that an image in one of the series can be aligned at the reference location with an image in another of the series to form various combinations, select ones of which being winning combinations. The game machine further includes movement means for moving the series with respect to one another and means for signaling that one of the winning combinations has been formed. Also, means are provided for awarding a prize on the formation of a winning combination.

In preferred embodiments of the game machine, the code on a game card inserted into the game machine actuates the movement means. In highly preferred game machines, maintenance cards inserted into and read by the game machine instruct the game machine to perform certain non-game functions.

The game machine itself can be set to dispense preprinted coupons or can contain a printing device to print on blank or partially pre-printed tape to form a coupon. Alternatively, a signal can be sent to a remote location such as a service or courtesy desk where the coupon can be issued or arrangements made for receiving the prizes at no or a reduced cost.

The game machine can be used to display the fact that prizes have been awarded and between plays can display prescribed messages about the products and services being promoted, the manufacturer, the establishment or the game itself. These messages can take several forms, including "still" advertisements, banners having messages scrolling across them and moving videos.

It is an object of this invention to provide a promotional game machine which is simple to use and can be readily reprogrammed to change the products and/or services being promoted.

It is a further object of this invention to provide a game machine which can initiate the awarding of prizes in accordance with the objects displayed and in amounts commensurate with the number and type of product, service or symbol images displayed.

It is yet another object of this invention to provide a game machine which can only be played by a given patron a fixed number of times within a fixed time period.

Other objects and features of the invention will be pointed out in the following description and claims and illustrated in the accompanying drawings which disclose, by way of example, the principles of the invention and the best modes which have been presently contemplated for carrying them out.

BRIEF DESCRIPTION OF THE DRAWINGS

In the drawings in which similar elements are given similar reference characters:

FIGS. 9a and 9B together are a flow chart of the operation of the game machine of FIG. 1.

DESCRIPTION OF THE PREFERRED EMBODIMENTS

Figure 1:
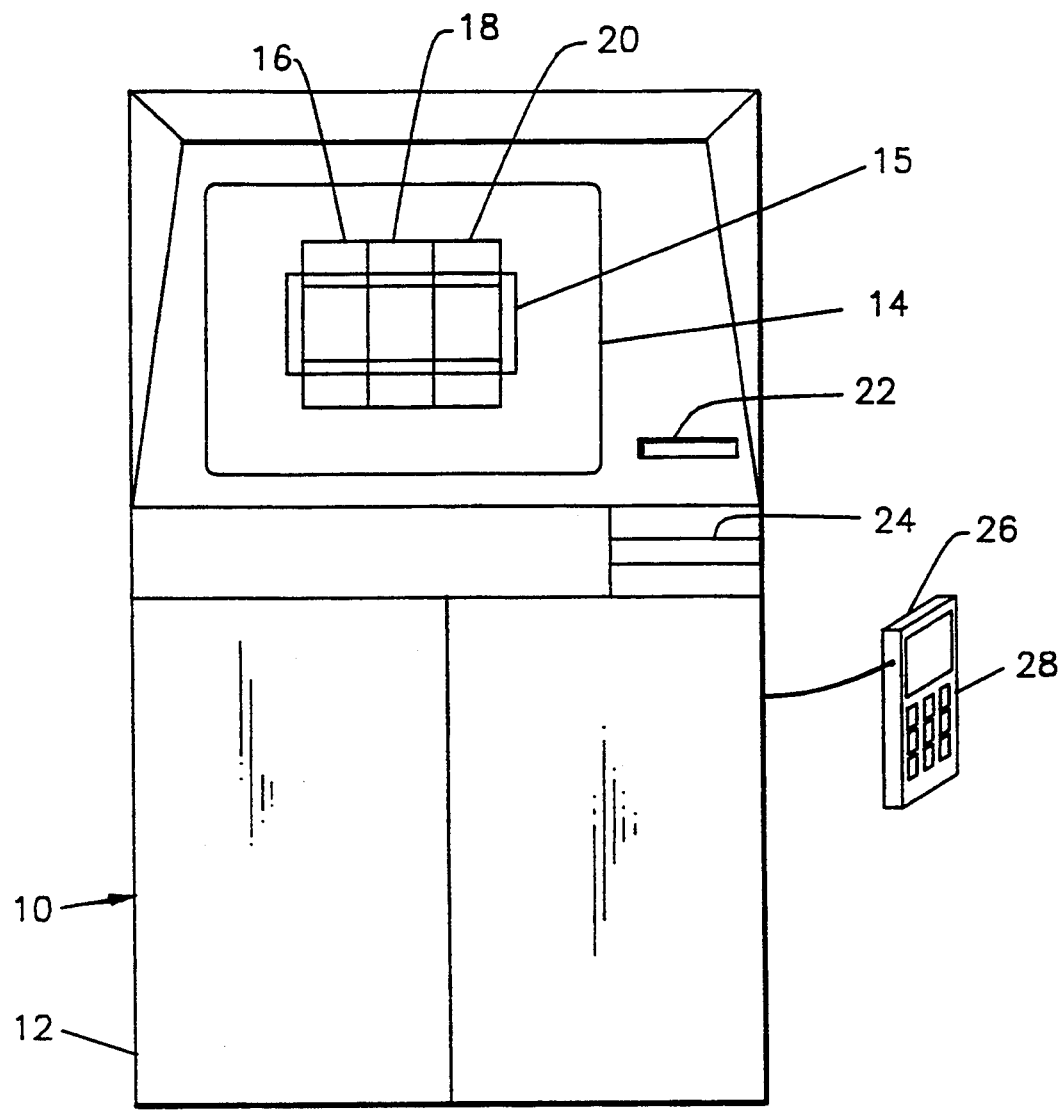
FIG. 1 is a front view of a game machine constructed in accordance with one embodiment of the invention.

Turning now to FIG. 1, there is shown one embodiment of a game machine 10 which may be installed in a store and played in accordance with the methods disclosed herein. Game machine 10 includes a cabinet 12 to house a computer and the peripheral electronic and mechanical devices (not shown) required to operate and perform the various functions of the game machine. In the upper portion of cabinet 12 is a video screen 14 which may be a TV monitor or the like. Optionally, video screen 14 may be positioned in a location remote from cabinet 12, such as at an elevated level which can be more readily seen by patrons throughout the store. The video screen 14 displays computer-generated representations of the peripheral surfaces of three adjacent wheels 16, 18 and 20 which can be rotated independently of one another in a random fashion so that the effect is the same as watching the display of mechanical slot machines. Screen 14 may also display a computer-generated or permanently marked indicia 15 at a preselected reference location. Rather than include depictions of lemons, cherries and other non-significant symbols, the wheels each carry a series of images 17 which represent products and/or services that a manufacturer, distributor or other business wishes to promote. As used herein, the term "products" does not refer to generic products, but rather refers to the brand-name products of one or more manufacturers or distributors. Also as used herein, the term "service representation" refers to a representation of a physical article, apparatus or other thing which is commonly identified with a particular service or which is useful in connection with performing the service. The wheels may also display trademarks, service marks or other symbols or logos 19 associated with the manufacturer, distributor or other business, which marks, symbols or logos may serve as wild cards. Alternatively, a store wishing to promote certain of its own products or services or the products or services of another business can place representations of those products or services on the wheels, as well as symbols identifying the store which may serve as wild cards. Further, the wheels may display images which partially represent the foregoing products, services and/or symbols so that upon the alignment of select ones of these images, a complete representation of one or more of the products, services and/or symbols will be formed. The particular combinations of product and/or service representations for which prizes will be awarded, both with and without wild cards, are determined in advance and programmed into game machine 10, as will be discussed more fully below.

Figure 2:
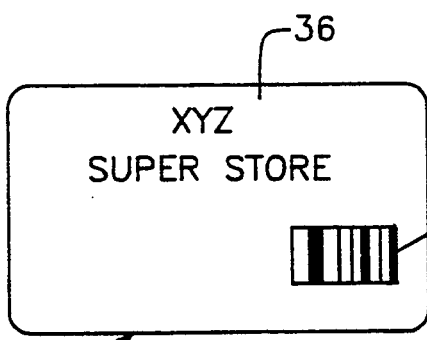
FIG. 2 is a top plan view of a first form of game card which can be employed with the game machine of FIG. 1.
Figure 3:
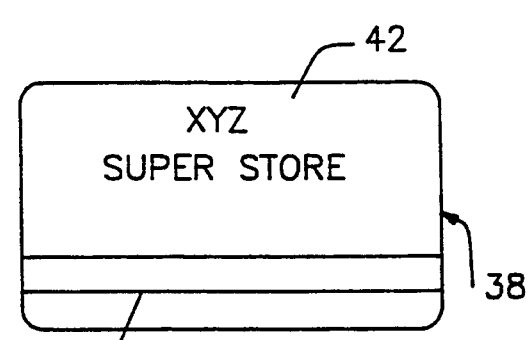
FIG. 3 is a top plan view of another form of game card which can be employed with the game machine of FIG. 1.

The game machine 10 is operated by the insertion of a game card, such as card 32 shown in FIG. 2 or card 38 shown in FIG. 3, into slot 22 of game machine 10. Game card 32 has a bar-code section 34 bearing a unique code which represents a particular patron and which thus identifies the game card. Preferably, the bar-code section 34 will also include a portion coded with information on the establishment or chain of establishments in which the game card 32 may be played. For example, each supermarket chain and each store in the chain may be identified by coded characters. The game machine 10 can then be set to operate only if it reads the code of the chain in which it is installed or, if special promotions in one or more stores are conducted, only those game cards 32 which contain the codes of the chain and those selected stores would operate the game machine 10. Similarly, game card 38 has a magnetic stripe 40 upon which has been recorded a similar unique code which represents a particular patron and which therefore identifies the game card, which code desirably also represents the establishment or chain of establishments in which game card 38 can be played. The name of the chain or the particular establishment at which the game card is valid may be printed upon the card itself, as at 36 on game card 32, or 42 on game card 38.

Located behind slot 22 is a suitable reader (not shown) for reading bar codes of the type contained on game card 32 or the magnetic stripe code of the type contained on game card 38. In this regard, any bar code or magnetic stripe reader capable of supporting an RS232 interface at 9600 baud may be used. The data read by the reader will be used as set out below.

A further slot 24 is provided to dispense coupons representing the prizes awarded. Behind slot 24 may be a feeding mechanism (not shown) for dispensing preprinted coupons stored in the game machine, or a printer (not shown) which first prints the required coupon on a roll of blank paper or partially pre-printed forms on which may appear the store name, address, advertising information, etc., and which then feeds the completed, severed coupon through slot 24.

Figure 9A:
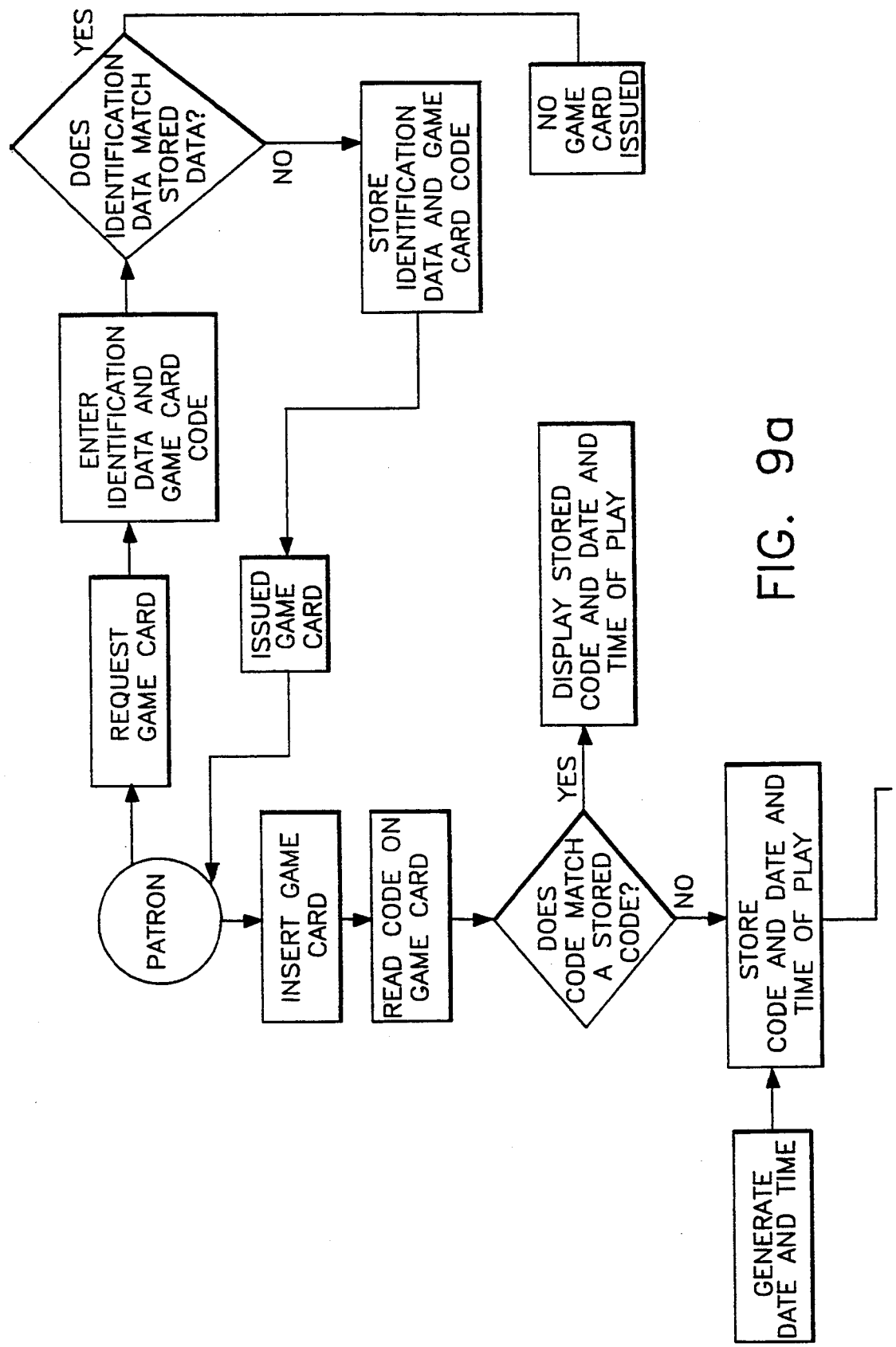

Referring to the flow chart of FIGS. 9a and 9B, the general method for operating the promotional game is set out. First, a patron goes to a service desk or the like and requests a game card. The service desk personnel will take certain identification data from the patron which clearly identifies that patron only. The patron's name, address, social security number, driver's license number and similar data can be used. Optionally, certain biographic information may also be taken, including the patron's sex, age, marital status, number of children, etc. The data is entered into input device 26 by depressing the keys of keypad 28. (See FIG. 1.)

Next, the identification data is compared with like identification data stored in the input device 26 to determine if this identification data has been stored previously. If it matches previously stored identification data, it means the patron already has been issued a game card 32 or 38, the fact of the match is shown by a suitable display, and no new game card is issued. In the absence of a match, a coded game card 32 or 38 is issued to the patron, and all of the entered data is permanently stored in the input device 26. The number of the game card is permanently stored in input device 26 with the identification data of the patron so that the patron can be identified by his identification data or game card number. In the event a game card is lost, the patron can report the loss to persons at the service desk who will enter additional data into the file of the patron in the input device 26 which will render the lost game card invalid for play in game machine 10. A new game card 32 or 38 with a new code can then be issued to such patron. At prescribed intervals, the input device 26 may be connected by a suitable cable (see FIG. 1) to the game machine 10 to upload the codes of the invalid game cards to a permanent memory location in game machine 10. Alternatively, a keyboard (not shown) may be temporarily connected to the game machine 10 to enter invalid game card codes directly into the permanent memory location of game machine 10. In a preferred arrangement, the information regarding invalid game card codes may be downloaded onto a disk or other recordable media (not shown) which may then be inserted into game machine 10 and uploaded into the permanent memory location therein. In any event, if any game card reported as lost is thereafter inserted for play, the game machine 10 will not be activated. A message may be displayed on video screen 14 or at the service desk to indicate that this is an invalid game card.

Once it has been issued to him, the patron may insert his game card into slot 22 of game machine 10 which reads the code in bar code section 34 on game card 32 or the code on magnetic stripe 40 of game card 38. The portion of the game card code bearing the establishment information may first be compared by game machine 10 with establishment codes permanently stored therein to ascertain that the game card is being played in an establishment in which it is accepted. If the game card is not accepted by this particular establishment, a suitable message to that effect will be displayed on video screen 14 and play will not be initiated. On the other hand, if the establishment information in the game card code is acceptable, the random selection device in game machine 10 will be actuated automatically to initiate play.

As used throughout this specification, the term "random" refers to a movement of the wheels 16, 18 and 20 with respect to one another and with respect to reference location 15 which appears to be entirely random to the playing patron. As will be discussed more fully below, the movement of the images on the wheels may be truly random in that it is not influenced by any instructions from the software operating the game machine. It should be emphasized that this truly random movement of the images is the most preferred method for operating the game machine in accordance with the present invention. However, there is the possibility of programming the operating software of the game machine to control the movement of these images to some extent to assure that a winning combination is formed at prescribed times or at prescribed intervals. Although the influence of the software controlling the operation of the game machine may make the movement of the wheels with respect to one another less than truly random, such movements will still appear to be truly random to the playing patron. This latter possibility is a less preferred method of operating the game machine.

In order to more equitably distribute the prizes awarded, the establishment may desire to limit how often each game card may be played during a preselected period of time. The number of plays permitted within the preselected period of time may be limited to one or may be selected to be a number greater than one. For example, each game card may be limited to only one play during each twenty-four hour period, five plays in a one week period, etc. In order to accomplish this result, each time the insertion of a game card into slot 22 of game machine 10 actuates the random selection device of the game machine, the code on that game card is stored in a temporary memory location in game machine 10. Stored along with the game card code are the date and time of play, as determined by an internal clock in game machine 10. If desired, the game machine 10 can also be programmed to store information regarding prizes won by the patron on that play, if any. As the patron inserts his game card into slot 22 of game machine 10, the game machine can compare the game card code on that card with all of the game card codes previously stored in the temporary memory of game machine 10 to determine whether the random selection device should be actuated. In the event game machine 10 determines that the game card code has not been played the maximum permissible number of times within the preselected period of time, the random selection device will be actuated and the patron's game card code, the date and the time of play will again be stored together in the temporary memory location in game machine 10. Thus, a particular game card code may be stored as one or more entries in the temporary memory location, the date and time of play being stored along with each entry. Should the game machine 10 determine that the game card code has already been played the maximum permissible number of times, the random selection device will not be actuated, and instead, the dates and times of each of the patron's plays may be displayed on video screen 14 along with a video and/or audio message indicating that play has been denied.

The internal clock in game machine 10 can be used to periodically clear from the temporary memory location of the game machine the data regarding those patrons who had played. Thus, the machine may check the date and time of play included with each game code entry, and may delete each entry having an "old" date and time, i.e., a date and time more than a preselected period before the checking and deletion cycle. Therefore, at the end of the preselected period, each patron will be able to recommence his playing of the game machine. The clearing of the data stored in the temporary memory will not affect that information stored in the permanent memory, such as the record of invalid game codes. Alternatively, the machine may simply clear all of the entries from the temporary memory at a selected time, such as at midnight each day or at the end of a week.

In a less preferred embodiment, all possible game card codes are permanently stored in game machine 10, and each time a particular game card is played a temporary notation is made within the game machine as to the date and time of play. The additional information provided by these notations is then used by the game machine to determine if that game card is entitled to be played at the time of presentation.

As set out above, the display during the operation of the random selection device in response to the insertion of a game card 32 or 38 is the peripheral surfaces of three wheels 16, 18 and 20 which move independently of one another in a random fashion until they stop at their final settings. In these final settings, one image on each wheel is displayed in alignment with the reference location 15. This alignment will typically be a linear arrangement in either a horizontal row, a vertical row or a diagonal row, alignment in a horizontal row being the most preferred. Although three wheels are described, it should be understood that game machine 10 may include at least two wheels or any number of wheels greater than two. The peripheral surfaces of the wheels are marked with the images of a series of products and/or services which are being promoted. These may include, for instance, a series of products of a particular manufacturer or distributor, the products and/or services of the establishment in which the game machine is installed, the products and/or services of a different establishment, or combinations of any or all of the above. In addition, images of symbols or logos identifying the manufacturer, the distributor, the establishment or another business, collectively referred to herein as "business symbols", may be placed on the wheel surfaces to act as wild cards. No actual wheels exist, but these images result from the operation of the software within the game machine 10 in a well-known manner.

The software required to generate the product representations, service representations and business symbol images; to determine the particular combinations of images that will be awarded a prize; to determine the odds of forming these winning combinations; to display a particular message or series of messages; and to perform any other task in connection with the operation of game machine 10 is recorded on a disk or other storage media insertable in the game machine. The software, a preferred listing of which is shown in Appendix A attached hereto, may be run on any computer system running WINDOWS from Microsoft Corp. Version 3.1 or greater and capable of supporting the requisite peripheral equipment, preferred models of which are identified on the cover page of the attached software listing. By placing the game software on a removable disk, any of these parameters may be changed by merely replacing the storage disk with a new disk having the desired data. For example, the products whose representations appear upon the operation of game machine 10 can be changed merely by inserting a new disk having the proper information. Similarly, a new storage disk could be supplied to change the odds that a winning combination will be formed on any one play of game machine 10. To increase the odds that any one particular product or service representation will be part of a winning combination, the number of times representations or partial representations of that product or service appear on the wheels is increased. Similarly, the odds of forming a winning combination with a particular product or service representation can be decreased by decreasing the number of times representations or partial representations of that product or service appear on the wheels.

Figure 4:
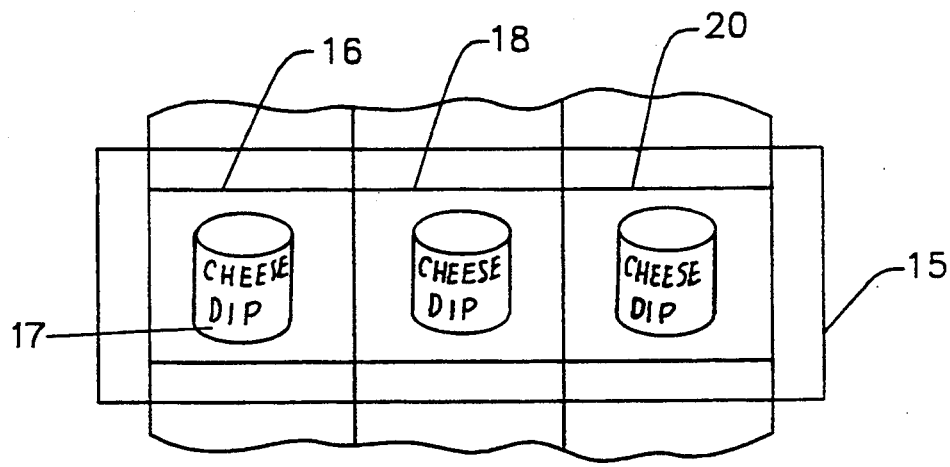
FIG. 4 is a highly schematic front view of one possible display on the screen of the game machine of FIG. 1.
Figure 5:
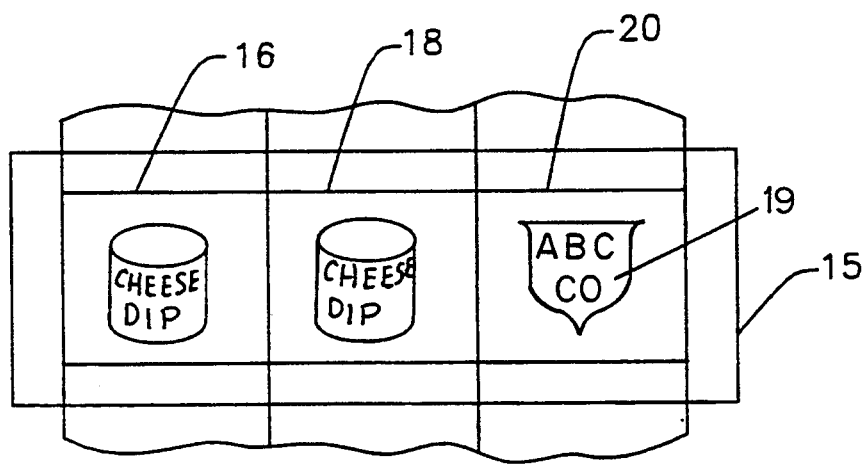
FIG. 5 is a highly schematic front view of another possible display on the screen of the game machine of FIG. 1.

Based upon the particular combination of images which are in alignment in reference location 15 at the end of the spinning of wheels 16, 18 and 20, a prize can be awarded. The criteria for determining which combinations will be awarded a prize can be selected from several different alternatives by an appropriate programing of the software which operates game machine 10. In one method for forming a winning combination, the product and/or service representations on at least two wheels will match one another. Obviously, this method requires that the representations of at least some of the products or services appear on at least two of the wheels so that matches can occur. For example, in game machines employing three wheels 16, 18 and 20, a winning combination may require that the product and/or service representations aligned in reference location 15 when all three wheels come to rest be identical. This concept is illustrated in FIG. 4, in which wheels 16, 18 and 20 have each come to rest showing representations of cheese dip in horizontal alignment. Other winning combinations in accordance with this method may be formed through the use of business symbols which serve as wild cards. Thus as shown in FIG. 5, wheels 16 and 18 have come to rest displaying representations of cheese dip, while wheel 20 has come to rest displaying the manufacturer's logo. It will be appreciated that the use of business symbols as wild cards eliminates the need to have the representations of at least some of the products or services appear on at least two of the wheels. This is particularly true in the case where only two wheels are used, where a winning combination may be formed by matching a wild card symbol with a product or service representation. The extent to which the images on the wheels match may determine the magnitude of the prize awarded. Thus, at the option of the business employing game machine 10 for promotional purposes, the concurrence of the three product representations in FIG. 4 may result in, for example, ten packages of cheese dip being awarded, while the combination of the matching product representations on wheels 16 and 18 with the manufacturer's logo on wheel 20 may result in an award of only three packages of cheese dip or cents-off coupons for this product.

Figure 6:
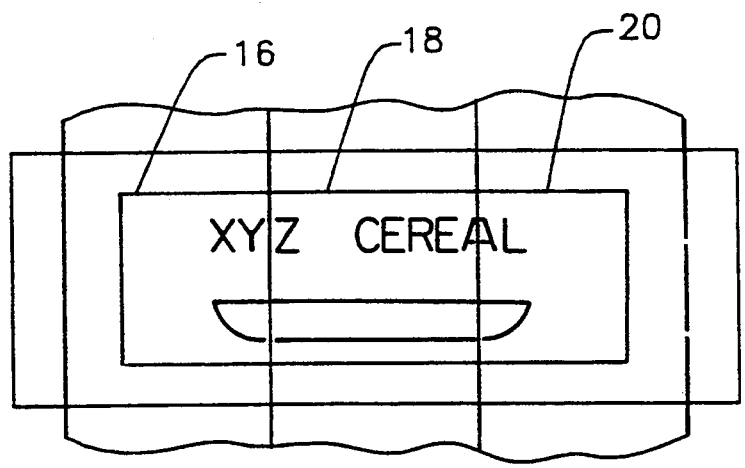
FIG. 6 is a highly schematic front view of yet another possible display on the screen of the game machine of FIG. 1.

A method which is similar to, but less preferred than that described above employs game machines in which the three wheels 16, 18 and 20 include partial representations of products and/or services. In accordance with this method, a winning combination desirably would require the proper alignment of all three wheels to form a complete representation of the product or service, as shown in FIG. 6. It will be readily apparent that for combinations in which less than all of the wheels in the game machine are appropriately aligned a complete representation of the product or service will not be formed and a win will not be produced. Although the use of business symbols as wild cards would prevent complete representations from being formed, the use of such wild cards are contemplated herein to increase the odds of forming a winning combination.

In an alternate method, a winning combination may be formed by aligning representations of a particular type of product or service on each of the wheels. For example, the three wheels of game machine 10 may include representations of cereal products offered by different manufacturers. A winning combination may then be formed by aligning three representations of cereal products offered by a single manufacturer. The representations of the cereal products may all be different, or some may match one another. The extent of the match (i.e., two or even three of the representations being identical) may be used to determine the magnitude of the prize awarded. In another example, game machine 10 may be installed in a video rental store and wheels 16, 18 and 20 may include images of movie stars. The alignment of three images of one particular star, for instance Humphrey Bogart, may then be a winning combination entitling the winner to a free rental of a movie by that star, in this case a movie starring Humphrey Bogart. In a variant of this method, the winning combination does not require that the representations be of the same type of product or service; rather they merely must be related in some predetermined fashion. Thus, for example, were game machine 10 to be installed in a fast food restaurant, a winning combination may comprise aligned representations of a hamburger, french fries and a soda, or orange juice, coffee and an egg sandwich. Should game machine 10 be installed in an automotive parts store a winning combination in accordance with this variant of operation may consist of aligned representations of cans of oil, an oil filter and an oil can spout. Since identical matches of product or service representations per se are not necessary, it will be apparent that the representation of any particular product or service need not appear on more than one wheel to operate the game machine in accordance with this method. Again, business symbols optionally may be used as wild cards in forming the winning combinations.

In yet another method, each play of the game machine will result in a winning combination and the award of a prize. In accordance with this method, the magnitude of the prize will depend upon whether the winning combination includes a match of two or more product or service representations. Thus, for example, in game machine 10, for a combination in which each of the product and/or service representations on wheels 16, 18 and 20 are different, the patron may win an award of a predetermined discount on the product or service appearing on wheel 16. If the product or service representation on either of wheels 18 and 20 match the representation on wheel 16, the patron may be awarded two times or some other multiple of the predetermined discount on the product or service appearing on wheel 16. Matching the product or service representations on wheels 18 and 20 may also result in the award of, for example, twice the predetermined discount on the product or service appearing on wheel 16, or a similar discount on the product or service whose representations on wheels 18 and 20 match. Further, matching the product or service representations on all three of wheels 16, 18 and 20 may result in an award of that product or service for free or some other appropriate award. Of course, business symbols may also be used as wild cards in accordance with this method in order to enhance the opportunity for the patron to win a larger award. In a variant of this method, game machine 10 may include only a single wheel 16 and each patron may win an award related to the product or service appearing on wheel 16 after a random rotation. Preferably, the award will consist of the product or service free of charge or a predetermined discount on the product or service.

As is well known, regardless of the specific criteria used to determine winning combinations, the program controlling the random selection device of game machine 10 can be set to ensure that a given number of prizes are awarded per a given number of plays and to assure a given distribution of the prizes is achieved in concert with the desires of the business promoting its products or services. As an alternative to ensure that prizes are awarded regularly and in the desired value, the game machine may be programmed to form predetermined winning combinations a minimum number of times in a prescribed period if prizes have not been awarded or have not been awarded in sufficient numbers during that period by the random selection process. Thus, for example, game machine 10 may be programmed to form a certain winning combination at least once in a twenty-four hour period to maintain patron interest. As to each patron the selection would be random. As emphasized above, programming game machine 10 so that the movement of wheels 16, 18 and 20 is influenced by the operating software of the game machine is less desirable than having the wheels move in a truly random fashion.

The game machine may be programmed in other ways to form predetermined winning combinations on a less random basis. Thus, for example, it may be desirable to maximize the promotional effect of the game by assuring that a winning combination is formed at a certain time or within a certain time period each day when the number of patrons in the establishment is at its greatest. Also, the game machine may be programmed to award a prize to a predetermined customer by forming a winning combination upon reading a preselected game code. Although these last two methods for controlling the formation of winning combinations may appear to be entirely random to the patron, the influence of the operating software for the game machine makes them less than truly random. Again, these are less preferred modes of operation.

Figure 7:
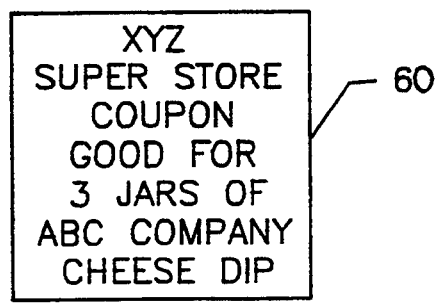
FIG. 7 is a top plan view of a coupon which may be issued by the game machine of FIG. 1.
Figure 8:
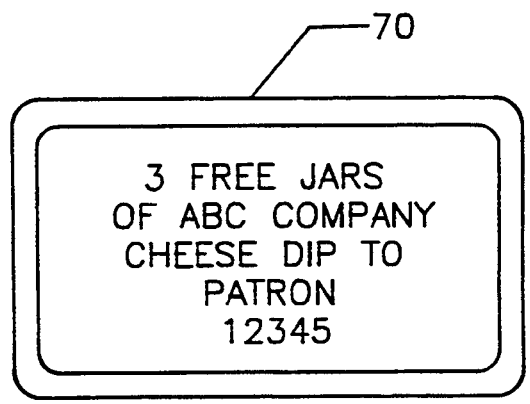
FIG. 8 is a highly schematic front view of a screen at a location remote from the game machine of FIG. 1.

Once it is determined that the display shows a winning combination, a signal is generated within game machine 10 instructing that a prize is to be awarded and what that prize is. This signal may be employed to dispense a pre-recorded coupon stored within the game machine or to cause the printing within the game machine of a coupon (see 60 in FIG. 6) redeemable for the product or service won in the quantity indicated. Alternatively, the signal may be directed to a display 70 at a service counter (see FIG. 7) where personnel at the counter may provide the required coupon or mark the actual product won so that it is free at the check-out counter. The signal may also be used to sound bells, flash lights, provide some audio message or cause a display on the video screen 14 of the game machine 10 to announce that the patron playing has won a prize and any other information desired to be disseminated.

The prizes awarded upon the formation of a winning combination may be totally unrelated to the products and/or services displayed on the game machine and may include, for example, monetary awards, store credits, coupons redeemable for any product or service offered by a manufacturer or other business entity promoting products or services on the game machine, coupons redeemable for a particular product or service offered by a manufacturer or other business entity not promoting its products or services on the game machine, etc. Preferably, the awarded prizes are products and/or services which are related to the products or services in the winning combination. As used herein, a prize "related to" a product or service A includes (1) one or more of the product or service A itself; (2) a discount on one or more of the product or service A; (3) one or more of a product or service which is typically used in combination or connection with the product or service A; and (4) a discount on one or more of a product or service which is typically used in combination or connection with product or service A. Most preferably, the prizes are those which are typically available in the establishment in which the game machine has been installed. In the case where the game machine has been installed in a mall, the prizes are preferably available from one of the stores in the mall.

As noted at the outset, the purpose of the promotional game method and apparatus of the present invention is to promote the products and/or services of one or more businesses. To that end, it is contemplated that the advertising affect of game machine 10 may be increased by displaying images representing products, services and/or business symbols on game machine 10 in addition to those images which are displayed in alignment with reference location 15 when wheels 16, 18 and 20 have stopped moving. Thus, for example, video screen 14 may simultaneously display three images on each of wheels 16, 18 and 20 both as the wheels are moving and when they have come to rest. Although only one image on each of the wheels will be in alignment with reference location 15 and, hence, only those images will determine the existence of a winning combination, the display of the additional images will increase the promotional affect of game machine 10 because the patron's attention will be focused on the product representations, service representations and/or business symbols displayed in these additional images. The promotional affect can be increased still further by having the images which may be displayed on video screen 14 outside of reference location 15 remain fixed while wheels 16, 18 and 20 are being randomly moved with respect to one another. That is, only the images in reference location 15 would appear to move with respect to one another during play of the game, while the remaining images displayed on video screen 14 would remain in place. Naturally, the increased promotional affect of this latter embodiment would result from the patron's attention being focused on the still images during the entire random placement step.

Between operations of the random selection device, the video screen 14 of game machine 10 may also be used to display a series of messages promoting the products or services involved in the game, other information regarding the products or services, establishment messages, inducements to play the game and lists of the prizes awarded, and any other information to be called to the patrons' attention. Such messages may encompass a portion or the entirety of video screen 14, and may commence automatically a preselected length of time after operation of the random selection device has terminated and the wheels have come to rest. In a particularly preferred arrangement which enhances the advertising effect, a banner bearing an advertising message may be scrolled across the top portion of video screen 14 without obscuring the combination of images aligned in reference location 15. The banner will appear a preselected period of time after play has terminated, which period of time may be increased or decreased as desired. A particularly beneficial advertising effect can be obtained by having the advertising banner appear promptly after the wheels have stopped moving so that the playing patron will see the banner and its advertisement while examining the images on video screen 14 to determine whether he is a winner.

In an equally preferred arrangement, at a predetermined time after the wheels have stopped moving, the product or service represented on one of the wheels will automatically grow in size to encompass all or substantially all of the video screen 14. For example, five seconds after the wheels have stopped moving (which should provide the patrons with sufficient time to note whether the combination of images formed on the screen is a winner) the image on the first wheel may gradually grow in size until it consumes a majority of video screen 14, obliterating the images of the other products, services or symbols displayed on the screen. When the image reaches its maximum size, an audible and/or visual message may be generated to promote the product or service appearing on the screen. Once this message has been completed and the enlarged image has been displayed for a preselected length of time, the video screen may revert to displaying the combination of images which resulted from the last play, or may display other advertisements or messages.

In yet another highly preferred embodiment, a moving video may be displayed on video screen 14 between plays of the game. These moving videos may be one or more advertisements, preferably for products or services whose representations appear during play of the game, or may be a demonstration on how the game is played, and may encompass the entirety of video screen 14 or any fraction thereof. The data for generating these moving videos, which are much like the moving images typically viewed on a television, may be recorded on a storage disk in a known fashion for access by the operating program of game machine 10. As a result, the series of moving videos in game machine 10 can be replaced with a new series of such videos merely by removing one storage disk from the game machine and inserting a new disk in its place.

In order to keep game machine 10 simple to operate by patrons and simple to maintain by generally available store personnel, game machine 10 is not provided with a keyboard. Since no keyboard is available for instructing game machine 10 to perform certain operations, all such instructions are supplied by inserting maintenance cards (not shown) into slot 22. In all outward appearances, the maintenance cards are the same as game cards 32 and 38, except that the coded information appearing in bar code sections 34 or magnetic stripes 40 are not game card codes, but rather are instruction codes recognizable by the game machine. Thus, one maintenance card may contain a code for instructing game machine 10 to assemble various statistical data which may be obtained. Statistical information regarding the patrons playing the game machine, their frequency of play, prizes won, etc., may be summarized in various tables to indicate, for example: (1) the total number of plays during the prescribed period, i.e., twenty-four hours, one week, etc.; (2) the number of plays hour-by-hour; (3) prizes won and the profile of the persons who won; (4) the number of prizes won and the total value of the prizes awarded, etc. The code on the maintenance card may further instruct game machine 10 to print this statistical data either on the printer within the game machine or at a remote location.

Another maintenance card may include a code for instructing the game machine to accept replays on some or all of the game cards, such as by reducing by one the number of times each of the game card codes have been stored in the temporary memory of the game machine.

The code on yet another maintenance card may instruct the game machine to update and/or change the program in the game machine. Thus, as a storage disk containing new game parameters is placed in the game machine 10, the information thereon will not be uploaded into the operating memory of the game machine until the maintenance card bearing the proper instruction code has been inserted into the card reader via slot 22. The proper maintenance card will instruct the game machine to replace the game parameters in its operating memory with the game parameters on the newly inserted disk. Additional maintenance cards may be provided for instructing the game machine to perform other tasks, such as downloading or uploading card and play information to a remote computer. In less preferred embodiments, all of these instructions may be provided to game machine 10 through the use of input device 26 or some other keyboard temporarily connected to the game machine.

Games of this nature may be employed usefully at the point of sale in retail establishments such as supermarkets, fast food restaurants, auto parts stores, home centers, toy stores and the like. The ability to charge back to a sponsor, such as a manufacturer or distributor, the availability of recorded information regarding the total number of prizes won and the total value of prizes awarded as set forth above, the absence of any need for special goods packaging or specially distributed game cards, and the elimination of the need to distribute a plethora of coupons which will never be redeemed, all coupled with the ability to easily and quickly change promotions at will, provides a uniquely effective promotional tool.

As will be readily appreciated, laws bearing on gambling and the lotteries limit certain types of promotions involving an element of chance, particularly where the purchase of goods or services is required as a pre-condition for entry into the game. Games according to the present invention can be, and are intended to be, operated in conformity with applicable laws. Such laws ordinarily require that the patron or prospective patron be allowed to enter any game of chance without purchasing anything or paying money to acquire an entry. Ordinarily, such laws are satisfied if the patron has the opportunity to acquire a game card without a purchase.

Although the invention herein has been described with reference to particular embodiments it is to be understood that these embodiments are merely illustrative of the principles and applications of the present invention. It is therefore to be understood that numerous modifications may be made to the illustrative embodiments and that other arrangements may be devised without departing from the spirit and scope of the present invention as set forth in the appended claims.

APPENDIX A

```
Filename: C:\SM\SM1\SMGLB.BAS
  1 ' Global Definition Module - UC'NWIN Game Machine
  2 ' based on Windows 3.1 Microsft Corp and Professional Visual Basic 1.0
  3 ' Dynamic Link Library written in Microsoft QuickC for Windows 1.0
  4
  5 ' Copyright 1991/92 SR Information Solutions, Inc.
  6 ' Employer for Hire: Robert T. Grindell
  7
  8 ' Complete list of preferred hardware is as follows:
  9 '    486/33 Intel-Based CPU or any CPU supporting Microsft Windows w/
 10 '      200 Meg Hard Drive, min 4 Meg Ram, 2 Serial, 1 Parallel, 3 1/2" Floppy Drive
 11 '    Actix Quantum VGA Card 800X600 w/256 colors or any S3 Inc. based video board
 12 '    Media Vision Pro Audio Spectrum Board w Windows 3.1 Drivers/any audio board with mixer controls
 13 '    New Media Graphics Super Motion Compression Kit or any Full Motion Video Equip w/Windows MCI Drivers
 14 '    American Microsystems Model 2500 Wedge, Bar Code and Mag Stripe Reader, or any reader w/RS-232 comm
 15 '    Seiko Epson TM-T80 Printer, or any printer w/ Windows Drivers, auto-cutter, and auto-feeder
 16 '    21" Super VGA Monitor w/ 70 hz vertical refresh rate non-interlaced 800X600 resolution
 17
 18 ' The Following Files are required, although not explicitly declared or included with Windows 3.1
 19 ' All Drivers and Libraries for Microsoft 3.1 Multimedia Extensions (Most included w/ 3.1)
 20 '   Printer.Drv    Some Printer Driver (Usually included w/ Windows 3.1)
 21 '   COMMDLG.DLL    Included with Windows 3.1 SDK
 22 '   DDEML.DLL      Included with Windows 3.1 SDK
 23 '   MMMIXER.DLL    Media Vision Software Mixer Driver - Pro Audio Spectrum Sound Board
 24 '   MVAPI.DLL      Media Vision Software Mixer Driver
 25 '   MCIMIXER.DLL   Media Vision Mixer Media Control Interface Driver
 26 '   MCISEQ.DRV     MCI MIDI Sequencer Driver
 27 '   MCIWAVE.DRV    MCI Waveform Audio Driver
 28 '   MMSOUND.DRV    Windows 3.1 Sound Driver
 29 '   MVMIXER.DRV    Media Vision Mixer Driver
 30 '   MVPROAUD.DRV   Media Vision Waveform Driver
 31 '   MVFM.DRV       Media Vision MIDI Sequencer Driver
 32 '   SMCMCI.DRV     New Media Graphics Super Motion Compression Board MCI Driver
 33 '   SVWMCI.DRV     New Media Graphics Super Video Window Capture Board MCI Driver
 34 '   CAR1K.DRV      Actix Quantum S3 VGA Board 800X600 Software Driver
 35 '   CARVGA.GRX     Actix Quantum S3 VGA Board 800X600 Software Driver
 36
 37 '   PICX.BMP       200X200 Bitmap Picture Files (Changes according to pictures displayed)
 38 '   CARD.BMP       Bitmap File Containing Sample Playing Card
 39 '   BANNERX.BMP    One or More bitmaps containing the Banner to display while machine is inactive
 40 '   COUPON.DAT     Text File showing format and content of coupons
 41 '   SM.DAT         Odds File containing Number of Symbols per wheel, and how many pics on each wheel
 42 '   SMPAY.DAT      Winning Combo File, determines wins, and what to print on the coupons
 43 '   STAT.DAT       History File built each time game is played
 44 '   MOVIE.VID      Super Video Windows Compressed Video Movie File to be played while game inactive
 45 '   MOVIE.AUD      Super Video Windows Compressed Audio Movie File to be played while game inactive
 46 '   BACKSTAT.WAV   Audio File "Backing Up Statistics"
 47 '   CARDINV.WAV    Audio File "Invalid Card"
 48 '   CARDUSD.WAV    Audio File "That Card was already used"
 49 '   ENDSPNT.WAV    Audio File "Sorry you didn't win"
 50 '   ERASTAT.WAV    Audio File "Erasing Statistics"
 51 '   LDSFTT.WAV     Audio File "Loading New Software"
 52 '   MUSOFF.WAV     Audio File "Music Off"
 53 '   MUSON.WAV      Audio File "Music On"
 54 '   PAUSL.WAV      Audio File "Lengthen Pause Before Banner"
```

```
55 '  PAUSS.WAV     Audio File "Shorten Pause Before Banner"
56 '  PAUSMAX.WAV   Audio File "Pause at maximum"
57 '  PAUSMIN.WAV   Audio File "Pause at minimum"
58 '  PICKUP.WAV    Audio File "Please pickup your coupon below"
59 '  PRINTALL.WAV  Audio File "Printing All Statistics"
60 '  PRINTWIN.WAV  Audio File "Printing Winning Statistics"
61 '  PRNTTST.WAV   Audio File "Printing Test Coupon"
62 '  RESET.WAV     Audio File "All Cards Reset for additional play"
63 '  SONGS.WAV     Audio File containing Background Music while machine is inactive
64 '  VOLDWN.WAV    Audio File "Volume Down"
65 '  VOLUP.WAV     Audio File "Volume Up"
66 '  WHEEL.WAV     Audio File "Around it goes"
67 '  WHEELSTP.WAV  Audio File with noise of wheel stopping
68 '  WIN.WAV       Audio File with noise showing winning play
69 '  WINX.WAV      Audio File "You're a winner, you have gotten 3 pictures in a row!"
70 '  RTG.INI       Initialization file located in the Windows 3.1 Directory
71 '   can contain any of the following:
72 '     CardDevice= Port to read info from Card Reader, usually COM1:9600,N,8,1
73 '     WheelItems= Number of Total Items on each wheel - 1
74 '     NmPictures= Number of PicX.BMP files to load in
75 '     MME= Flag if Multimedia Extensions are present
76 '     Music= Flag if music is turned on or off
77 '     Dir= Directory of program, data and audio files
78 '     Volume= Current Master Volume of all audio
79 '     BannerCount= Number of Banner Bitmap Files
80 '     BannerWidth= Length of each Banner Bitmap
81 '     BannerTimeOut= Number of seconds after each play to start banner
82 '     Video= Flag if Video is present or not
83 '     VideoTimeOut= Number of Seconds between playing Videos
84 '     ResetTime= Time to reset all cards for additional playing
85 '     ResetInterval= Interval in Hours to reset each card
86 '     MainBack= Windows 3.1 Color Index of Background, usually &H00FFFFFF
87 '     CardIndex= Prefix of digits of Playing Cards allowed to operate this machine
88 '     Autowin= three numbers showing what combination should appear, default=000
89 '     GameSwitch= Allows switching of multiples of NmPictures between plays
90 '           used to allow different "sets" of symbols for each alternating play
91
92 DefInt A-Z
93
94 ' Define Windows GDI function calls - Module GDI.EXE
95 Declare Function BitBlt Lib "Gdi" (ByVal destHdc, ByVal X, ByVal Y, ByVal w, ByVal h, ByVal srcHdc, ByVal srcX, ByVal srcY, ByVal Rop As Long)
96 Declare Function StretchDIBits Lib "Gdi" (ByVal hDC%, ByVal dX%, ByVal dY%, ByVal dW%, ByVal dH%, ByVal sX%, ByVal sY%, ByVal sW%,
ByVal sH%, ByVal lpB$, ByVal lpBI$, ByVal wUsage%, ByVal dwRop&) As Integer
97 Declare Function CreateCompatibleBitMap Lib "Gdi" (ByVal hDC, ByVal w, ByVal h) As Integer
98 Declare Function CreateCompatibleDC Lib "Gdi" (ByVal hDC) As Integer
99 Declare Function DeleteDC Lib "Gdi" (ByVal hDC) As Integer
100 Declare Function DeleteObject Lib "Gdi" (ByVal hObject) As Integer
101 Declare Function StretchBlt Lib "Gdi" (ByVal destHdc, ByVal X, ByVal Y, ByVal w, ByVal h, ByVal srcHdc, ByVal srcX, ByVal srcY, ByVal srcW,
ByVal srcH, ByVal Rop As Long)
102 Declare Function SetStretchBltMode Lib "Gdi" (ByVal hDC, ByVal nStretchMode)
103 Declare Function GetBitmapBits Lib "Gdi" (ByVal hBitmap, ByVal dwCount As Long, ByVal lpBits As Long) As Long
104 Declare Function SelectObject Lib "Gdi" (ByVal hDC, ByVal hObject) As Integer
105 Declare Function SetBitmapBits Lib "Gdi" (ByVal hBitmap, ByVal dwCount As Long, ByVal lpBits As Long) As Long
106 Declare Function CreatePalette Lib "Gdi" (ByVal lpPal$) As Integer
107 Declare Function GetTextExtent Lib "Gdi" (ByVal hDC As Integer, ByVal TxtStr As String, ByVal Count As Integer) As Long
108 Declare Function TextOut Lib "Gdi" (ByVal hDC As Integer, ByVal X, ByVal Y, ByVal TxtStr As String, ByVal Count As Integer) As Integer
109 Declare Function GetDeviceCaps Lib "GDI" (ByVal hDC As Integer, ByVal index As Integer) As Integer
110
111 ' Define Windows USER Serial Communication Calls - USER.EXE
112 Declare Function BuildCommDCB Lib "User" (ByVal Def As String, ByVal DCB As String) As Integer
113 Declare Function CloseComm Lib "User" (ByVal Cid As Integer) As Integer
114 Declare Function FlushComm Lib "User" (ByVal Cid As Integer, ByVal Queue As Integer) As Integer
115 Declare Function GetCommState Lib "User" (ByVal Cid As Integer, ByVal DCB As String) As Integer
116 Declare Function OpenComm Lib "User" (ByVal ComName As String, ByVal InQueue As Integer, ByVal OutQueue As Integer) As Integer
117 Declare Function ReadComm Lib "User" (ByVal Cid As Integer, ByVal Buf As String, ByVal Size As Integer) As Integer
118 Declare Function SetCommState Lib "User" (ByVal DCB As String) As Integer
119 Declare Function TransmitCommChar Lib "User" (ByVal Cid As Integer, ByVal Char As Integer) As Integer
120 Declare Function WriteComm Lib "User" (ByVal Cid, ByVal Buf As String, ByVal Size As Integer) As Integer
121 Declare Function GetCommError Lib "User" (ByVal Cid As Integer, ByVal Buf As String) As Integer
122 Declare Function SelectPalette Lib "User" (ByVal hDC%, ByVal hPal%, ByVal bForce%) As Integer
123 Declare Function RealizePalette Lib "User" (ByVal hDC%) As Integer
```

124 Declare Function MoveWindow Lib "User" (ByVal hWnd, ByVal X, ByVal Y, ByVal nWidth, ByVal nHeight, ByVal bRePaint)
125
126 ' Define Windows Kernal Routines for Initialization - Kernel/Krnl386.Exe
127 Declare Function GetPrivateProfileInt Lib "Kernel" (ByVal Appname As String, ByVal KeyName As String, ByVal DEFAULT As Integer, ByVal FileName As String) As Integer
128 Declare Function GetPrivateProfileString Lib "Kernel" (ByVal Appname As String, ByVal KeyName As String, ByVal DEFAULT As String, ByVal ReturnedString As String, ByVal MaxSize, ByVal FileName As String) As Integer
129 Declare Function WritePrivateProfileString Lib "Kernel" (ByVal Appname As String, ByVal KeyName As String, ByVal NewString As String, ByVal FileName As String) As Integer
130 Declare Function WinExec Lib "Kernel" (ByVal CmndStrng As String, ByVal ShowState As Integer) As Integer
131
132 ' Define Media Control Interface for Multimedia Functions - Requires Windows 3.1 MMSYSTEM.DLL MCI Extenstions
133 Declare Function mciExecute Lib "mmsystem.dll" (ByVal CmndStrng As String) As Integer
134 Declare Function mciSendString Lib "mmsystem.dll" (ByVal CmndStrng As String, ByVal RtrnStrng As String, ByVal RtrnLngth As Integer, ByVal hCllBck As Integer) As Long
135
136 ' Q+E Database/VB Functions - Pioneer Software Systems, Inc.
137 Declare Function fDoQuery Lib "qevbdbf.vbx" (queryCtl As Control) As Integer
138 Declare Function fEndQuery Lib "qevbdbf.vbx" (queryCtl As Control) As Integer
139 Declare Function fNext Lib "qevbdbf.vbx" (queryCtl As Control) As Integer
140 Declare Function fPrevious Lib "qevbdbf.vbx" (queryCtl As Control) As Integer
141 Declare Function fRandom Lib "qevbdbf.vbx" (queryCtl As Control, ByVal RecNumber&) As Integer
142 Declare Function fNew Lib "qevbdbf.vbx" (queryCtl As Control, ByVal rowIndex%, ByVal before%) As Integer
143 Declare Function fEnterQBE Lib "qevbdbf.vbx" (queryCtl As Control) As Integer
144 Declare Function fClearQBE Lib "qevbdbf.vbx" (queryCtl As Control) As Integer
145 Declare Function fInsert Lib "qevbdbf.vbx" (queryCtl As Control, ByVal rowIndex%) As Integer
146 Declare Function fUpdate Lib "qevbdbf.vbx" (queryCtl As Control, ByVal rowIndex%) As Integer
147 Declare Function fDelete Lib "qevbdbf.vbx" (queryCtl As Control, ByVal rowIndex%) As Integer
148 Declare Function fLock Lib "qevbdbf.vbx" (queryCtl As Control, ByVal rowIndex%) As Integer
149 Declare Function fTranBegin Lib "qevbdbf.vbx" (queryCtl As Control) As Integer
150 Declare Function fTranCommit Lib "qevbdbf.vbx" (queryCtl As Control) As Integer
151 Declare Function fTranRollback Lib "qevbdbf.vbx" (queryCtl As Control) As Integer
152 Declare Function fExecSQL Lib "qevbdbf.vbx" (queryCtl As Control, ByVal SQLStmt$) As Integer
153
154 ' Q+E Database/VB Constants - Pioneer Software Systems, Inc.
155 ' Error Codes
156 Global Const QE_ERROR_CODES = 31000
157 Global Const QE_FUNCTION_ABORTED = 31001
158 Global Const QE_RECORD_NOT_FOUND = 31002
159 Global Const QE_DB_ERROR = 31003
160 Global Const QE_RECORD_LOCKED = 31004
161 Global Const QE_RECORD_CHANGED = 31005
162 ' Record State Codes
163 Global Const RECSTATE_NO_RECORD = 0
164 Global Const RECSTATE_FETCHING = 1
165 Global Const RECSTATE_UNCHANGED = 2
166 Global Const RECSTATE_CHANGED = 3
167 Global Const RECSTATE_NEW_UNCHANGED = 4
168 Global Const RECSTATE_NEW_CHANGED = 5
169 Global Const RECSTATE_QBE_UNCHANGED = 6
170 Global Const RECSTATE_QBE_CHANGED = 7
171 Global Const RECSTATE_COPYING = 8
172 Global Const RECSTATE_ENTERING_QBE = 9
173 Global Const RECSTATE_CLEARING_QBE = 10
174 Global Const RECSTATE_CLEARING_NEW = 11
175 ' Function Codes
176 Global Const F_DOQUERY = 1
177 Global Const F_ENDQUERY = 2
178 Global Const F_NEXT = 3
179 Global Const F_PREVIOUS = 4
180 Global Const F_RANDOM = 5
181 Global Const F_NEW = 6
182 Global Const F_ENTERQBE = 7
183 Global Const F_CLEARQBE = 8
184 Global Const F_INSERT = 9
185 Global Const F_UPDATE = 10
186 Global Const F_DELETE = 11
187 Global Const F_LOCK = 12
188 Global Const F_TRANBEGIN = 13
189 Global Const F_TRANCOMMIT = 14
190 Global Const F_TRANROLLBACK = 15

```
191 Global Const F_EXECSQL = 16
192
193 ' Window API Constant Declarations
194 Global Const COLORBLUE = &HFF0000
195 Global Const COLORGREY = &HC0C0C0
196 Global Const COLORRED = &HFF
197 Global Const COLORWHITE = &HFFFFFF
198
199 Global Const SRCCOPY = &HCC0020
200 Global Const SRCPAINT = &HEE0086
201 Global Const SRCAND = &H8800C6
202 Global Const SRCINVERT = &H660046
203 Global Const SRCERASE = &H440328
204 Global Const NOTSRCCOPY = &H330008
205 Global Const NOTSRCERASE = &H1100A6
206 Global Const MERGECOPY = &HC000CA
207 Global Const MERGEPAINT = &HBB0226
208 Global Const PATCOPY = &HF00021
209 Global Const PATPAINT = &HFB0A09
210 Global Const PATINVERT = &H5A0049
211 Global Const DSTINVERT = &H550009
212 Global Const BLACKNESS = &H42
213 Global Const WHITENESS = &HFF0062
214
215 Global Const MM_TEXT = 1
216 Global Const BLACKONWHITE = 1
217 Global Const WHITEONBLACK = 2
218 Global Const COLORONCOLOR = 3
219 Global Const OF_EXIST = &H4000
220 Global Const false = 0
221 Global Const true = -1
222 Global Const APP_NAME = "UCNWIN"
223 Global Const APP_FILE = "RTG.INI"
224 Global Const VERSION = "1.4 5/92"
225
226 ' Define Arrays of Slot Machine
227 Global Wheel() As Integer     ' Holds Symbol Positioning
228 Global Spin(2) As Integer     ' Holds Current Position of each wheel
229 Global hFrame(2) As Long      ' Display Contect of Frame, for speed
230 Global hMemDC(), hOldBM(), hBM(), hPal As Long ' Windows Struct to hold pictures
231 Global PayOff() As Integer    ' Holds winning combos and pay offs
232 Global WinItem() As String    ' Holds description of win
233
234 'Define Constants of Slot Machine
235 Global Cid As Integer              ' Windows Communication ID
236 Global TwipToPixX As Integer       ' Conversion from Twips to Pixels X Axis
237 Global TwipToPixY As Integer       ' Conversion from Twips to Pixels Y Axis
238 Global WheelItems As Integer       '# of Symbols on each wheel - 1
239 Global Wheel1 As Integer           ' Temp Variables for Rotation
240 Global Wheel2 As Integer
241 Global Wheela As Integer
242 Global Wheelb As Integer
243 Global Wheelc As Integer
244 Global CrntDir As String           ' Current Directory of Slot Machine
245 Global NmPictures As Integer       '# of Pictures on each wheel
246 Global MMEFlag As Integer          ' Flag if Multimedia Extensions are present
247 Global MusicFlag As Integer        ' Flag if Music On
248 Global CardIndex As String         ' Allow Legal Cards
249 Global CardDigits As Integer       ' # of Digits minimum for legal card
250 Global ResetTime As String         ' Time to Reset Cards
251 Global ResetInterval As Integer    ' How many hours in between each reset
252 Global AutoWin As String           ' Demo For Automatically displaying a win
253 Global GameSwitch, SwitchCtr As Integer   ' Holds Number of alternating Game Machines
254
255 ' Banner Globals
256 Global BannerTime As Long
257 Global BannerTimeOut As Integer
258 Global BannerCount As Integer
259 Global BannerWidth As Integer
260 Global BannerhMemDC() As Long
261 Global BannerhOldBM() As Long
```

```
262
263 ' Video Globals
264 Global VideoFlag As Integer
265 Global VideoTime As Long
266 Global VideoTimeOut As Integer
267
268 ' Current Format of Stat.Dat History File
269 ' Later to be modified to conform to the DBase IV standard, via Q+E Library
270 Type StatRecord
271   CardNo As String * 12
272   Result As String * 9
273   DatePlayed As Double
274   TimePlayed As Double
275   WinFlag As String * 1
276 End Type
277
```

Filename: C:\SM\SM1\MNSM.TXT
```
278 Sub Form_KeyPress (KeyAscii As Integer)
279   ' This routine is executed whenever Windows receives
280   ' a keypress while this form has the focus
281   If KeyAscii = Asc("S") Or KeyAscii = Asc("s") Then
282     Card$ = "000000000000"
283     PlaySlots Card$, Res$, WinFlag$
284   End If
285   If KeyAscii = Asc("R") Or KeyAscii = Asc("r") Then
286     Card$ = "000000"
287     ReadCard Card$
288   End If
289   If KeyAscii = Asc("Q") Or KeyAscii = Asc("q") Then Unload MainForm
290 End Sub
291
292 Sub Form_Resize ()
293   ' This routine is executed every time the form
294   ' is resized, and when form is first displayed
295
296   ' This causes the form to occupy an 800 X 600 Pixel screen,
297   ' regardless of the resolution of the display
298   MainForm.ScaleMode = 3
299   Width = 800 * TwipToPixX
300   Height = 600 * TwipToPixY
301   Top = 0
302   Left = 0
303   For PicSet = 0 To 2
304     Pic_Frame(PicSet).Top = 8
305     Pic_Frame(PicSet).Width = 202
306     Pic_Frame(PicSet).Height = 584
307     Pic_Frame(PicSet).Left = PicSet * 247 + 52
308   Next PicSet
309   Pic_CpyRt.Top = 570
310   Pic_CpyRt.Left = 752
311 End Sub
312
313 Sub Pic_Frame_KeyPress (Index As Integer, KeyAscii As Integer)
314   ' This routine is executed whenever Windows receives
315   ' a keypress while this form has the focus
316   If KeyAscii = Asc("S") Or KeyAscii = Asc("s") Then
317     Card$ = "000000000000"
318     PlaySlots Card$, Res$, WinFlag$
319   End If
320   If KeyAscii = Asc("R") Or KeyAscii = Asc("r") Then
321     Card$ = "000000"
322     ReadCard Card$
323   End If
324   If KeyAscii = Asc("Q") Or KeyAscii = Asc("q") Then Unload MainForm
325 End Sub
326
327 Sub Form_Unload (Cancel As Integer)
328   For InitPic = 1 To NmPictures
329     temp = SelectObject(hMemDC(InitPic), hOldBM(InitPic))
```

```
330    temp = DeleteObject(hBM(InitPic))
331    temp = DeleteDC(hMemDC(InitPic))
332   Next InitPic
333   If BannerFlag Then
334    For InitPic = 1 To BannerCount
335      temp = SelectObject(BannerhMemDC(InitPic), BannerhOldBM(InitPic))
336      temp = DeleteDC(BannerhMemDC(InitPic))
337    Next InitPic
338   End If
339   If MMEFlag Then
340    Bfr$ = Space$(80)
341    templong& = mciSendString("close all", Bfr$, 80, 0)
342   End If
343 End Sub
344
```

Filename: C:\SM\SM1\SM.TXT
```
345 DefInt A-Z
346
347 Sub LoadWheels ()
348   Wheel1 = WheelItems * 2
349   Wheel2 = Wheel1 + 2
350   Wheela = WheelItems - 2
351   Wheelb = WheelItems - 1
352   Wheelc = WheelItems + 1
353   ReDim Wheel(WheelItems, 2)
354   SMHandle = FreeFile
355   Open "SM.DAT" For Input As SMHandle
356    For Row = 0 To 2
357     Line Input #SMHandle, WheelSym$
358     For Count = 0 To WheelItems
359       Wheel(Count, Row) = Val(Mid$(WheelSym$, Count + 1, 1))
360       If Wheel(Count, Row) = 0 Then Stop
361    Next Count, Row
362   Close SMHandle
363
364   LoadPalette
365
366   Load DisplayForm
367   LoadBitMaps
368   ResetPlayers
369
370   For SpinRow = 0 To 2
371    Spin(SpinRow) = Int(Rnd(1) * WheelItems) * 2
372    RotateWheel (SpinRow)
373   Next SpinRow
374
375 End Sub
376
377 Sub RotateWheel (SpinRow)
378  ' Rotate Spinner
379   SpinTemp = Spin(SpinRow) + 1
380   SpinTemp = SpinTemp + (SpinTemp > Wheel1) * Wheel2
381   DrawWheel SpinTemp, SpinRow
382   Spin(SpinRow) = SpinTemp
383 End Sub
384
385 Sub DrawWheel (SpinCount, SpinRow)
386   WheelItem = SpinCount \ 2
387   If (SpinCount Mod 2) Then
388    DrawPic WheelItem - (WheelItem < 1) * Wheelc - 1, SpinRow, 6
389    DrawPic WheelItem, SpinRow, 4
390    DrawPic WheelItem + (WheelItem > Wheelb) * Wheelc + 1, SpinRow, 2
391    DrawPic WheelItem + (WheelItem > Wheela) * Wheelc + 2, SpinRow, 0
392   Else
393    DrawPic WheelItem + (WheelItem > Wheela) * Wheelc + 2, SpinRow, -1
394    DrawPic WheelItem + (WheelItem > Wheelb) * Wheelc + 1, SpinRow, 1
395    DrawPic WheelItem, SpinRow, 3
396    DrawPic WheelItem - (WheelItem < 1) * Wheelc - 1, SpinRow, 5
397   End If
```

```
398 End Sub
399
400 Sub DrawPic (WI, SpinRow, PicHeight)
401     temp = BitBlt(hFrame(SpinRow), 0, PicHeight * 100, 200, 200, hMemDC(Wheel(WI, SpinRow) + SwitchCtr * NmPictures), 0, 0, SRCCOPY)
402 End Sub
403
404 Sub PlaySlots (Card$, Res$, WinFlag$)
405
406 ' Start Timer, & Initialize Variables
407 ReDim XM(100, 5)
408
409 If MMEFlag Then
410     Bfr$ = Space$(80)
411     templong& = mciSendString("open whlstp.wav alias wheelstop wait", Bfr$, 80, 0)
412     templong& = mciSendString("open wheel.wav alias sound buffer 9 wait", Bfr$, 80, 0)
413     templong& = mciSendString("play sound from 0", Bfr$, 80, 0)
414 End If
415 ' ST1 = Rnd(1) * 10 + WheelItems * 2 - 10 ' Full Speed
416 ST1 = Rnd(1) * 20 + 35
417 SpinStopRow = 0        ' All Wheels in Motion
418 ReDim SpinCount(2)     ' Amount of Wheel Afterspin...
419 Spin(1) = Spin(1) + 1  ' Offset center wheel before spin
420
421 For SpinInit = 0 To 2
422    SpinCount(SpinInit) = Rnd(1) * 10 + 5
423 Next SpinInit
424
425 For SpinRow = 0 To 2
426    Spin(SpinRow) = Spin(SpinRow) + Rand(100) + 100
427    Spin(SpinRow) = Spin(SpinRow) Mod Wheel1
428 Next SpinRow
429
430 For SpinTimer = 1 To ST1
431    For SpinRow = 0 To 2
432       RotateWheel SpinRow
433    Next SpinRow
434    If DoFlag Then temp = DoEvents()
435    DoFlag = Not DoFlag
436 Next SpinTimer
437 While SpinStopRow < 3
438 ' Count Through Every Row & Check to stop spinning
439    For SpinRow = 0 To 2
440       If SpinRow = SpinStopRow Then
441          If SpinCount(SpinRow) > 0 Then
442             SpinCount(SpinRow) = SpinCount(SpinRow) - 1
443          ElseIf Spin(SpinRow) Mod 2 Then
444             AutoWinCheck = Val(Mid$(AutoWin, SpinRow + 1, 1))
445             If AutoWinCheck < 1 Or AutoWinCheck = Wheel(Spin(SpinRow) \ 2 + 1, SpinRow) Then
446                SpinStopRow = SpinStopRow + 1
447                If MMEFlag Then
448                   Bfr$ = Space$(80)
449                   templong& = mciSendString("stop sound wait", Bfr$, 80, 0)
450                   templong& = mciSendString("stop wheelstop wait", Bfr$, 80, 0)
451                   templong& = mciSendString("play wheelstop from 0", Bfr$, 80, 0)
452                Else
453                   Beep
454                End If
455             End If
456          End If
457       End If
458       If SpinStopRow <= SpinRow Then RotateWheel SpinRow
459    Next SpinRow
460    If DoFlag Then temp = DoEvents()
461    DoFlag = Not DoFlag
462
463    SpinTimer = SpinTimer - 1
464 Wend
465 If MMEFlag Then
466    Bfr$ = Space$(80)
467    templong& = mciSendString("close sound wait", Bfr$, 80, 0)
468    templong& = mciSendString("stop wheelstop wait", Bfr$, 80, 0)
```

```
469    templong& = mciSendString("play wheelstop from 0 wait", Bfr$, 80, 0)
470    templong& = mciSendString("stop wheelstop wait", Bfr$, 80, 0)
471    templong& = mciSendString("close wheelstop wait", Bfr$, 80, 0)
472  End If
473
474  Buf$ = ReadCom$()
475  CheckPayOff Card$, Res$, WinFlag$
476 End Sub
477
478 Sub LoadOdds ()
479    ReDim PayOff(NmPictures * GameSwitch + 15, 2), WinItem$(NmPictures * GameSwitch + 15, 2)
480    SMHandle = FreeFile
481    OddsCounter = 1
482    WinItem$(0, 0) = "Test Coupon"
483    WinItem$(0, 1) = "This is a test"
484    WinItem$(0, 2) = "000000"
485    Open "SMPay.Dat" For Input As SMHandle
486      While Not EOF(SMHandle)
487        Line Input #SMHandle, Ln$
488        ValStart = InStr(Ln$, "=")
489        If Ln$ > "" And ValStart > 3 Then
490          Values$ = Left$(Ln$, ValStart - 1)
491          Descript$ = Mid$(Ln$, ValStart + 1)
492          If Len(Values$) = 3 Then
493            PayOff(OddsCounter, 0) = Val(Mid$(Values$, 1, 1))
494            PayOff(OddsCounter, 1) = Val(Mid$(Values$, 2, 1))
495            PayOff(OddsCounter, 2) = Val(Mid$(Values$, 3, 1))
496          Else
497            ValEnd = 0
498            ValStart = 1
499            For CurrentValue = 0 To 1
500              ValEnd = InStr(ValStart, Values$, ",")
501              PayOff(OddsCounter, CurrentValue) = Val(Mid$(Values$, ValStart, ValEnd))
502              ValStart = ValEnd + 1
503            Next CurrentValue
504            PayOff(OddsCounter, CurrentValue) = Val(Mid$(Values$, ValStart))
505          End If
506        End If
507        ColonStart = InStr(Descript$, ":")
508        If ColonStart > 1 Then
509          WinItem$(OddsCounter, 0) = Left$(Descript$, ColonStart - 1)
510          Desc1$ = ""
511          ColonStart = ColonStart + 1
512          ColonEnd = InStr(ColonStart, Descript$, ":")
513          While ColonEnd > ColonStart
514            Desc1$ = Desc1$ + Mid$(Descript$, ColonStart, ColonEnd - ColonStart) + Chr$(13)
515            ColonStart = ColonEnd + 1
516            ColonEnd = InStr(ColonStart, Descript$, ":")
517          Wend
518          ColonEnd = InStr(ColonStart, Descript$, ";")
519          If ColonEnd > ColonStart Then
520            Desc1$ = Desc1$ + Mid$(Descript$, ColonStart, ColonEnd - ColonStart)
521            WinItem$(OddsCounter, 2) = Mid$(Descript$, ColonEnd + 1)
522          Else
523            Desc1$ = Desc1$ + Mid$(Descript$, ColonStart)
524          End If
525          WinItem$(OddsCounter, 1) = Desc1$
526        Else
527          ColonEnd = InStr(Descript$, ";")
528          If ColonEnd > 1 Then
529            WinItem$(OddsCounter, 0) = Left$(Descript$, ColonEnd - 1)
530            WinItem$(OddsCounter, 2) = Mid$(Descript$, ColonEnd + 1)
531          Else
532            WinItem$(OddsCounter, 0) = Descript$
533          End If
534        End If
535
536        OddsCounter = OddsCounter + 1
537      Wend
538      Close SMHandle
539      PayOff(OddsCounter, 0) = -1
```

```
540 End Sub
541
542 Sub Main ()
543   LoadCommon
544   LoadOdds
545
546   MainForm.Show
547   LoadVideo
548   LoadWheels
549   LoadBanner
550
551   OpenCom
552   Do While DoEvents()
553     CheckMusic
554     CheckSpin
555     CheckReset
556     CheckBanner
557     CheckVideo
558   Loop
559   CloseCom
560   End
561 End Sub
562
563 Sub CheckPayOff (Card$, Res$, WinFlag$)
564 ReDim ResNum(2)
565 ' Check the current position of the wheels for a "win"
566 DrawBox COLORBLUE, COLORBLUE
567
568 ' Statistics Log
569 Res$ = ""
570 For SpinRow = 0 To 2
571   SpinPos = Spin(SpinRow) \ 2 ' Current Spinner Position
572   SpinPos = SpinPos + (SpinPos > Wheelb) * Wheelc + 1 ' Add 1 for middle row
573   ResNum(SpinRow) = Wheel(SpinPos, SpinRow) + NmPictures * SwitchCtr
574   Res$ = Res$ + Format$(ResNum(SpinRow)) + ","
575 Next SpinRow
576
577 ' Start Counter at 1
578 Odds = 1
579 NoWinCheck = tr    ' No Winner found yet
580 While PayOff(Odds, 0) > -1 And NoWinCheck
581   If WinItem$(Odds, 0) > "" Then
582     WinFlag = "*" ' Set to show a winner!!!
583     ' Check each wheel for winning position
584     For SpinRow = 0 To 2
585       SpinPos = Spin(SpinRow) \ 2 ' Current Spinner Position
586       SpinPos = SpinPos + (SpinPos > Wheelb) * Wheelc + 1 ' Add 1 for middle row
587       If PayOff(Odds, SpinRow) <> ResNum(SpinRow) And PayOff(Odds, SpinRow) > 0 Then WinFlag$ = " ": SpinRow = 3 ' No win, so reset win flag
588     Next SpinRow
589     If WinFlag$ = "*" Then ' Do we have a winner?
590       If MMEFlag Then
591         Bfr$ = Space$(80)
592         templong& = mciSendString("open win.wav alias sound wait", Bfr$, 80, 0)
593         templong& = mciSendString("play sound from 0", Bfr$, 80, 0)
594       End If
595       For PicFr = 0 To 2
596         MainForm.PIC_Frame(PicFr).Line (0, 0)-(200, 196), COLORGREY, BF
597         MainForm.PIC_Frame(PicFr).Line (0, 400)-(200, 600), COLORGREY, BF
598         temp = DoEvents()
599       Next PicFr
600       ' Yes, so show win sequence
601       For Radi = 1 To 100 Step 4
602         ' Erase Box arround middle row...
603         Rem DrawBox COLORWHITE, COLORGREY
604         ClrSwitch = Not ClrSwitch
605         If ClrSwitch Then tmpClr& = COLORWHITE Else tmpClr& = COLORRED
606         For PicFr = 0 To 2
607           MainForm.PIC_Frame(PicFr).DrawWidth = 3
608           MainForm.PIC_Frame(PicFr).Circle (110, 100), Radi, tmpClr&
609           MainForm.PIC_Frame(PicFr).Circle (110, 500), Radi, tmpClr&
610         Next PicFr
```

```
611      ' Draw Blue Box around middle row...
612      Rem DrawBox COLORBLUE, COLORBLUE
613      temp = DoEvents()
614     Next Radi
615
616     For PicFr = 0 To 2
617       MainForm.PIC_Frame(PicFr).CurrentX = 30
618       MainForm.PIC_Frame(PicFr).CurrentY = 78
619       MainForm.PIC_Frame(PicFr).Print "WINNER"
620       MainForm.PIC_Frame(PicFr).CurrentX = 30
621       MainForm.PIC_Frame(PicFr).CurrentY = 478
622       MainForm.PIC_Frame(PicFr).Print "WINNER"
623     Next PicFr
624     If MMEFlag Then
625       Bfr$ = Space$(80)
626       templong& = mciSendString("stop sound wait", Bfr$, 80, 0)
627       templong& = mciSendString("close sound wait", Bfr$, 80, 0)
628       PicSay$ = "Win" + Format$(Odds) + ".Wav"
629       PlayFile PicSay$
630       PlayFile "Pickup.wav"
631     End If
632     PrintCoupon Odds
633
634     TempTimer! = Timer + 4
635     While Timer < TempTimer!: ret = DoEvents(): Wend
636     DisplayForm.Hide
637     RefreshForm
638     NoWinCheck = false
639    End If
640   End If
641   Odds = Odds + 1
642 Wend
643 If NoWinCheck And MMEFlag Then PlayFile "endspnt.wav"
644 SwitchCtr = SwitchCtr + 1
645 If SwitchCtr >= GameSwitch Then SwitchCtr = 0
646 RefreshForm
647 End Sub
648
649 Sub OpenCom ()
650   Comm$ = Space$(25)
651   temp = GetPrivateProfileString(APP_NAME, "CardDevice", "COM1:9600,N,8,1", Comm$, 25, APP_FILE)
652   Comm$ = RTrim$(Comm$)
653   DCB$ = Space$(60)
654
655   ' Build Communication Structure
656   ret = BuildCommDCB(Comm$, DCB$)
657   ' Open Communcations Port
658   Comm$ = Left$(Comm$, 5)
659   Cid = OpenComm(Comm$, 90, 90)
660   If Cid < 0 Then
661     MsgBox "Communication Error:" + Str$(Cid), 16, "Slot Machine"
662     Unload MainForm
663     End
664   Else
665     ' Put ID of device in Communication Structure and set
666     Mid$(DCB$, 1, 1) = Chr$(Cid)
667     ret = SetCommState(DCB$)
668     ret = FlushComm(Cid, 1)
669   End If
670 End Sub
671
672 Function ReadCom$ ()
673   ' If something at comm port, read for .2 seconds
674
675   BufTemp$ = ""
676   Buf$ = Space$(30)
677   charRead = ReadComm(Cid, Buf$, 25)
678   If charRead = 0 Then
679     Bfr$ = Space$(80)
680     temp = GetCommError(Cid, Bfr$)
681     ReadCom$ = ""
```

```
682    Exit Function
683    End If
684
685    Buf$ = RTrim$(Buf$)
686    If Buf$ > "" Then
687       BufTemp$ = Buf$
688       BufTime! = Timer + .2
689       While Timer < BufTime!
690          Buf$ = Space$(30)
691          CharRead = ReadComm(Cid, Buf$, 25)
692          Buf$ = RTrim$(Buf$)
693          BufTemp$ = BufTemp$ + Buf$
694       Wend
695    End If
696    ret = FlushComm(Cid, 1)
697    ReadCom$ = BufTemp$
698 End Function
699
700 Sub CloseCom ()
701    ret = FlushComm(Cid, 1)
702    ret = CloseComm(Cid)
703 End Sub
704
705 Sub CheckSpin ()
706    Buf$ = ReadCom$()
707    If Buf$ = "" Then Exit Sub
708    Legal$ = "0123456789ABCDEFGHIJKLMNOPQRSTUVWXYZabcdefghijklmnopqrstuvwxyz"
709    Card$ = ""
710
711    For StripCount = 1 To Len(Buf$)
712       Ltr$ = Mid$(Buf$, StripCount, 1)
713       If InStr(Legal$, Ltr$) > 0 Then Card$ = Card$ + Ltr$
714    Next StripCount
715
716    If Len(Card$) < CardDigits Then Exit Sub
717    Card$ = Right$(Card$, CardDigits)
718    ReadCard Card$
719 End Sub
720
721 Sub ResetPlayers ()
722    On Error GoTo ErrHandlerRP
723    Kill "*.PLY"
724
725 ErrHandlerRP:
726    Resume ExitRP
727
728 ExitRP:
729    Rem Do Nothing
730
731 End Sub
732
733 Function Exists$ (fname$)
734    On Error GoTo ErrHandlerEX
735    TempHandle = FreeFile
736    Open fname$ For Input As TempHandle: Close TempHandle
737    Dat$ = Space$(40)
738    Open fname$ For Binary As TempHandle
739       Get #TempHandle, 1, Dat$
740    Close TempHandle
741    If Dat$ > "" Then
742       CRPos = InStr(Dat$, Chr$(13))
743       If CRPos > 0 Then Dat$ = Left$(Dat$, CRPos - 1)
744    End If
745    Exists$ = Dat$
746    Exit Function
747
748 ErrHandlerEX:
749    Resume ExitEX
750
751 ExitEX:
752    Exists$ = ""
```

```
753
754 End Function
755
756 Sub RefreshForm ()
757    DrawBox COLORWHITE, COLORGREY
758    For SpinRow = 0 To 2
759    ' MainForm.Pic_Frame(SpinRow).Refresh
760    SpinTemp = Spin(SpinRow)
761    SpinTemp = SpinTemp + (SpinTemp > Wheel1) * Wheel2
762    DrawWheel SpinTemp, SpinRow
763    MainForm.DrawWidth = 3
764    MainForm.Line (SpinRow * 247 + 50, 6)-(SpinRow * 247 + 255, 593), 0, B
765    Next SpinRow
766    MainForm.Banner.Refresh
767 End Sub
768
769 Sub DrawBox (ClrB&, ClrP&)
770        MainForm.ScaleMode = 3
771        MainForm.DrawWidth = 7
772        MainForm.Line (0, 210)-(797, 405), ClrB&, B
773        For PicFr = 0 To 2
774          MainForm.PIC_Frame(PicFr).ScaleMode = 3
775          MainForm.PIC_Frame(PicFr).DrawWidth = 7
776          MainForm.PIC_Frame(PicFr).FontSize = 24
777          MainForm.PIC_Frame(PicFr).Line (0, 202)-(800, 202), ClrP&
778          MainForm.PIC_Frame(PicFr).Line (0, 397)-(800, 397), ClrP&
779          MainForm.PIC_Frame(PicFr).DrawWidth = 1
780        Next PicFr
781
782 End Sub
783
784 Sub LoadPalette ()
785    lpBitsHdr$ = String$(54, 0)
786    lpPal$ = String$(1024, 0)
787
788    PalHandle = FreeFile
789    Open "Pic1.BMP" For Binary Access Read Shared As PalHandle
790      Get #PalHandle, 1, lpBitsHdr$
791      Get #PalHandle, , lpPal$
792    Close PalHandle
793
794    lpPal$ = Chr$(0) + Chr$(3) + Chr$(0) + Chr$(1) + lpPal$
795    hPal = CreatePalette(lpPal$)
796
797    For FrameDraw = 0 To 2
798      hFrame(FrameDraw) = MainForm.PIC_Frame(FrameDraw).hDC
799      temp = SelectPalette(hFrame(FrameDraw), hPal, 0)
800      temp = RealizePalette(hFrame(FrameDraw))
801    Next FrameDraw
802
803 End Sub
804
805 Sub LoadBitMaps ()
806    NumPicsLoad = NmPictures * GameSwitch
807    ReDim hMemDC(NumPicsLoad), hBM(NumPicsLoad), hOldBM(NumPicsLoad)
808
809    lpBitsHdr$ = String$(14, 0)
810    lpBitsInfo$ = String$(1064, 0)
811    lpBits$ = String$(40000, 0)
812
813    PicHandle = FreeFile
814
815    For PicNo = 1 To NumPicsLoad
816
817      PicNm$ = "PIC" + Format$(PicNo) + ".BMP"
818
819      If Exists(PicNm$) = "" Then
820        GameSwitch = Int(PicNo / NmPictures)
821        Exit Sub
822      End If
823
```

```
824  Open PicNm$ For Binary Access Read Shared As PicHandle
825    Get #PicHandle, 1, lpBitsHdr$
826    Get #PicHandle, , lpBitsInfo$
827    Get #PicHandle, , lpBits$
828  Close #PicHandle
829
830  If Asc(lpBitsHdr$) = 0 Then Stop
831
832  If hPal = 0 Then
833    lpPal$ = Chr$(0) + Chr$(3) + Chr$(0) + Chr$(1) + Mid$(lpBitsInfo$, 41)
834    hPal = CreatePalette(lpPal$)
835  End If
836
837  hMemDC(PicNo) = CreateCompatibleDC(MainForm.hDC)
838  hBM(PicNo) = CreateCompatibleBitMap(MainForm.hDC, 200, 200)
839  hOldBM(PicNo) = SelectObject(hMemDC(PicNo), hBM(PicNo))
840
841  temp = SelectPalette(hMemDC(PicNo), hPal, 0)
842  temp = RealizePalette(hMemDC(PicNo))
843  temp = StretchDIBits(hMemDC(PicNo), 0, 0, 200, 200, 0, 0, 200, 200, lpBits$, lpBitsInfo$, DIB_RGB_COLORS, SRCCOPY)
844
845 Next PicNo
846
847 End Sub
848
849 Sub CheckMusic ()
850
851   Static SongNo
852   If MMEFlag = false Or MusicFlag = false Then Exit Sub
853   Bfr$ = Space$(80)
854   templong& = mciSendString("status song mode wait", Bfr$, 80, 0)
855   Bfr$ = Left$(Bfr$, 4)
856   If Bfr$ = "play" Then Exit Sub
857
858   templong& = mciSendString("close song wait", Bfr$, 80, 0)
859   SongName$ = "SONGS.WAV" ' Override Music settings
860   Bfr$ = Space$(80)
861   templong& = mciSendString("open " + SongName$ + " alias song wait", Bfr$, 80, 0)
862   templong& = mciSendString("play song from 0", Bfr$, 80, 0)
863
864 End Sub
865
866 Sub WriteStat (CardNo$, Rslt$, WinFlag$)
867   StatHandle = FreeFile
868   Dim StatInfo As StatRecord
869   tempStrng$ = Exists("Stat.Dat")
870   Open "Stat.Dat" For Random As StatHandle Len = Len(StatInfo)
871   If tempStrng$ = "" Then
872     StatInfo.CardNo = "000000"
873     StatInfo.Result = "000"
874     StatInfo.DatePlayed = 0#
875     StatInfo.TimePlayed = 1#
876     Put #StatHandle, 1, StatInfo
877     Close #StatHandle
878     Open "Stat.Dat" For Random As StatHandle Len = Len(StatInfo)
879   End If
880   ' Update Record Pointer
881   Get #StatHandle, 1, StatInfo
882   RecNo! = StatInfo.TimePlayed
883   RecNo! = RecNo! + 1
884   StatInfo.TimePlayed = RecNo!
885   Put #StatHandle, 1, StatInfo
886
887   ' Update Record...
888   StatInfo.CardNo = CardNo$
889   StatInfo.Result = Rslt$
890   StatInfo.DatePlayed = DateValue(Date$)
891   StatInfo.TimePlayed = TimeValue(Time$)
892   StatInfo.WinFlag = WinFlag$
893   Put #StatHandle, RecNo!, StatInfo
894   Close #StatHandle
```

```
895  End Sub
896
897  Sub PrintStat ()
898    DisplayForm.PIC_DF.Picture = LoadPicture("Card.bmp")
899    DisplayForm.Show 0
900    DisplayForm.TXT_DF(0).Caption = ""
901    DisplayForm.TXT_DF(1).Caption = "Printing All"
902    DisplayForm.TXT_DF(2).Caption = "Statistics."
903    DisplayForm.TXT_DF(3).Caption = "Please wait..."
904    DisplayForm.TXT_DF(4).Caption = ""
905    DisplayForm.Refresh
906    If MMEFlag Then PlayFile "printall.wav"
907
908    StatHandle = FreeFile
909    Static StatInfo As StatRecord
910    Open "Stat.Dat" For Random As StatHandle Len = Len(StatInfo)
911    ' Get Record Pointer
912    Get #StatHandle, 1, StatInfo
913    RecEnd# = StatInfo.TimePlayed
914
915    FeedCtr = 0
916    NoWins = 0
917    NoOpCrd = 0
918    NoInv = 0
919    NoUsd = 0
920    NoPlays = 0
921    For RecNo# = 2 To RecEnd#
922      If FeedCtr > 65 Then
923        PrintIt Chr$(12)
924        FeedCtr = 0
925      End If
926      If FeedCtr = 0 Then
927        PrintIt "All Statistics for Index " + CardIndex
928        PrintIt "Printed: " + Date$ + ", " + Time$
929        PrintIt ""
930        PrintIt ""
931        PrintIt "Card #    Play     Date     Time"
932        PrintIt "————————————————————"
933        FeedCtr = 6
934      End If
935      Get #StatHandle, RecNo#, StatInfo
936      DtFmt$ = Format$(StatInfo.DatePlayed, "m/d/yy")
937      TmFmt$ = Format$(StatInfo.TimePlayed, "hh:mm am/pm")
938      PrintIt Left$(StatInfo.CardNo, 8) + " " + StatInfo.Result + Space$(9 - Len(StatInfo.Result)) + DtFmt$ + Space$(10 - Len(DtFmt$)) + TmFmt$
939      FeedCtr = FeedCtr + 1
940      Select Case Left$(StatInfo.CardNo, 3)
941        Case "RES", "MUS", "PST", "LNS", "VUP", "VDN", "PUP", "PDN", "KST", "PWS", "BUS", "PTC"
942          NoOpCrd = NoOpCrd + 1
943        Case "INV"
944          NoInv = NoInv + 1
945        Case "USD"
946          NoUsd = NoUsd + 1
947        Case Else
948          If StatInfo.WinFlag = "" Then
949            Wins = Wins + 1
950          Else
951            NoWins = NoWins + 1
952          End If
953      End Select
954    Next RecNo#
955    PrintIt ""
956    PrintIt ""
957    PrintIt "Total Wins:         " + Format$(Wins)
958    PrintIt "Total Plays/Not Wins: " + Format$(NoWins)
959    PrintIt "Total Invalid Cards:  " + Format$(NoInv)
960    PrintIt "Total Card Reattempts:" + Format$(NoUsd)
961    PrintIt "Total Op Cards Used:  " + Format$(NoOpCrd)
962
963    For LFeed = 1 To 5: PrintIt "": Next LFeed
964    PrintIt Chr$(12)
```

```
966    ' Auto Cut if necessary
967    CPHandle = FreeFile
968    Open "Coupon.Dat" For Input As CPHandle
969      Line Input #CPHandle, AutoCut$
970    Close CPHandle
971    If Left$(AutoCut$, 2) = "$A" And Len(AutoCut$) > 2 Then
972      RtLn$ = Mid$(AutoCut$, 3)
973      While Len(RtLn$) > 1
974        MdLn$ = MdLn$ + Chr$(Val("&H" + Left$(RtLn$, 2)))
975        RtLn$ = Mid$(RtLn$, 3)
976      Wend
977      PrintIt MdLn$
978    End If
979
980    Printer.EndDoc
981    Close #StatHandle
982    DisplayForm.Hide
983    RefreshForm
984 End Sub
985
986 Sub LoadNewSoftware ()
987    On Error GoTo LNSErrHandler
988
989    DisplayForm.PIC_DF.Picture = LoadPicture("Card.bmp")
990    DisplayForm.Show 0
991    DisplayForm.TXT_DF(0).Caption = "Loading Software"
992    DisplayForm.TXT_DF(1).Caption = "stand by for"
993    DisplayForm.TXT_DF(2).Caption = "Automatic Reset"
994    DisplayForm.TXT_DF(3).Caption = ""
995    DisplayForm.TXT_DF(4).Caption = ""
996    DisplayForm.Refresh
997    If MMEFlag Then PlayFile "ldsftt.wav"
998
999    Match$ = Dir$("A:*.*")
1000   While Match$ > ""
1001     If Match$ = "RTG.INI" Then ' Special Case for Init File
1002       DisplayForm.TXT_DF(4).Caption = "** System File **": DisplayForm.Refresh
1003       CopyFile "A:" + Match$, "C:\Windows\" + Match$
1004     ElseIf Match$ = "UCNWIN.CHG" Then
1005       TempHandle = FreeFile
1006       Open "A:UCNWIN.CHG" For Input As TempHandle
1007       While Not EOF(TempHandle)
1008         Line Input #TempHandle, LnChg$
1009         EqualSign = InStr(LnChg$, "=")
1010         StringToSet$ = Left$(LnChg$, EqualSign - 1)
1011         NewString$ = Mid$(LnChg$, EqualSign + 1)
1012         DisplayForm.TXT_DF(4).Caption = "  Change: " + StringToSet$: DisplayForm.Refresh
1013         temp = WritePrivateProfileString(APP_NAME, StringToSet$, NewString$, APP_FILE)
1014       Wend
1015       Close TempHandle
1016     Else
1017       DisplayForm.TXT_DF(4).Caption = "File: " + Match$: DisplayForm.Refresh
1018       CopyFile "A:" + Match$, CmtDir + "\" + Match$
1019     End If
1020     Match$ = Dir$
1021   Wend
1022
1023   If MMEFlag Then
1024     Bfr$ = Space$(80)
1025     templong& = mciSendString("close all wait", Bfr$, 80, 0)
1026   End If
1027
1028 LNSErrHandler:
1029   CloseCom
1030   Unload DisplayForm
1031   Unload MainForm
1032
1033   temp = WinExec("SM.EXE", 1)
1034   End
1035
1036 End Sub
```

```
1037
1038 Sub CopyFile (Source$, Destin$)
1039   On Error GoTo CopyFileErrHandler
1040   ' Does Source file exist?
1041   tempStrng$ = Exists(Source$)
1042   If tempStrng$ = "" Then Exit Sub
1043
1044   ' If Destin File Exists, then overwrite...
1045   tempStrng$ = Exists(Destin$)
1046   If tempStrng$ <> "" Then
1047     OutHandle = FreeFile
1048     Open Destin$ For Output As OutHandle
1049     Close OutHandle
1050   End If
1051
1052   BfrSize& = 8192
1053   BfrPos& = 1
1054   Bfr$ = Space$(BfrSize&)
1055   InHandle = FreeFile
1056   Open Source$ For Binary As InHandle
1057   OutHandle = FreeFile
1058   Open Destin$ For Binary As OutHandle
1059
1060   While BfrPos& < LOF(InHandle)
1061     If BfrPos& + BfrSize& > LOF(InHandle) Then
1062       BfrSize& = LOF(InHandle) - BfrPos& + 1&
1063       Bfr$ = Space$(BfrSize&)
1064     End If
1065     Get #InHandle, BfrPos&, Bfr$
1066     Put #OutHandle, BfrPos&, Bfr$
1067     BfrPos& = BfrPos& + BfrSize&
1068   Wend
1069   Close #InHandle
1070   Close #OutHandle
1071
1072 CopyFileErrHandler:
1073
1074 End Sub
1075
1076 Sub PlayFile (flname$)
1077   If MMEFlag Then
1078     Bfr$ = Space$(80)
1079     templong& = mciSendString("close sound wait", Bfr$, 80, 0)
1080     templong& = mciSendString("open " + flname$ + " alias sound wait", Bfr$, 80, 0)
1081     templong& = mciSendString("play sound from 0 wait", Bfr$, 80, 0)
1082     templomg& = mciSendString("stop sound wait", Bfr$, 80, 0)
1083     templong& = mciSendString("close sound wait", Bfr$, 80, 0)
1084   End If
1085 End Sub
1086
1087 Sub ReadCard (Card$)
1088
1089   If MMEFlag And MusicFlag Then
1090     Bfr$ = Space$(80)
1091     templong& = mciSendString("stop song wait", Bfr$, 80, 0)
1092   End If
1093   ResetVideo
1094   ResetBanner
1095
1096   ' Check if Card belongs to this machine
1097
1098   CardRead$ = Left$(Card$, Len(CardIndex))
1099   WinFlag$ = ""
1100   Res$ = "      "
1101   If CardRead$ <> CardIndex And CardIndex > "" Then
1102     DisplayForm.PIC_DF.Picture = LoadPicture("card.bmp")
1103     DisplayForm.Show 0
1104     DisplayForm.TXT_DF(0).Caption = "Index: " + CardIndex
1105     DisplayForm.TXT_DF(1).Caption = "Card: " + Card$
1106     DisplayForm.TXT_DF(2).Caption = "is invalid at this"
1107     DisplayForm.TXT_DF(3).Caption = "machine!"
```

```
1108    DisplayForm.TXT_DF(4).Caption = ""
1109    DisplayForm.Refresh
1110    PlayFile "crdinv.wav"
1111    TempTimer! = Timer + 2
1112    While Timer < TempTimer!: ret = DoEvents(): Wend
1113    DisplayForm.Hide
1114    RefreshForm
1115    Card$ = "INV  "
1116    Res$ = "I" + CardRead$
1117    BannerTime = Timer + BannerTimeOut
1118    VideoTime = Timer + VideoTimeOut
1119    WriteStat Right$(Card$, 6), Res$, WinFlag$
1120    If MMEFlag Then
1121      Bfr$ = Space$(80)
1122      If MusicFlag Then templong& = mciSendString("play song", Bfr$, 80, 0)
1123    End If
1124    Exit Sub
1125  End If
1126
1127  If CardDigits < 8 Then CardLength = CardDigits Else CardLength = 8
1128  CardRead$ = Right$(Card$, 5)
1129  Card$ = Right$(Card$, CardLength)
1130  Select Case CardRead$
1131  Case "00000"
1132    Rem Reset Cards for additional Play
1133    ResetCards
1134    Card$ = "RES  "
1135
1136  Case "00001"
1137    If MMEFlag = false Then Exit Sub
1138    Rem Toggle Music On/Off
1139    MusicFlag = Not MusicFlag
1140    If MusicFlag = true Then
1141      PlayFile "muson.wav"
1142    Else
1143      Bfr$ = Space$(80)
1144      templong& = mciSendString("close all wait", Bfr$, 80, 0)
1145      PlayFile "musoff.wav"
1146    End If
1147    Card$ = "MUS  "
1148    WriteStat Card$, Res$, WinFlag$
1149    Exit Sub
1150
1151  Case "00002"
1152    PrintStat
1153    Card$ = "PST  "
1154
1155  Case "00003"
1156    Card$ = "LNS  "
1157    WriteStat Card$, Res$, WinFlag$
1158    LoadNewSoftware
1159
1160  Case "00004"
1161    SetVolumeUp
1162    Card$ = "VUP  "
1163
1164  Case "00005"
1165    SetVolumeDown
1166    Card$ = "VDN  "
1167
1168  Case "00006"
1169    SetPauseUp
1170    Card$ = "PUP  "
1171
1172  Case "00007"
1173    SetPauseDown
1174    Card$ = "PDN  "
1175
1176  Case "00008"
1177    KillStats
1178    Card$ = "KST  "
```

```
1179
1180   Case "00009"
1181     PrintWinStat
1182     Card$ = "PWS   "
1183
1184   Case "00010"
1185     BackupStat
1186     Card$ = "BUS   "
1187
1188   Case "00011"
1189     PrintTest
1190     Card$ = "PTC   "
1191
1192   Case "00012"
1193     PlaySlots Card$, Res$, WinFlag$
1194     Card$ = "*Test* "
1195
1196   Case Else
1197     fname$ = Card$ + ".INV"
1198     tempStrng$ = Exists$(fname$)
1199     If tempStrng$ <> "" Then
1200       DisplayForm.PIC_DF.Picture = LoadPicture("card.bmp")
1201       DisplayForm.Show 0
1202       DisplayForm.TXT_DF(0).Caption = ""
1203       DisplayForm.TXT_DF(1).Caption = "Card: " + Right$(Card$, CardLength)
1204       DisplayForm.TXT_DF(2).Caption = "is invalid at this"
1205       DisplayForm.TXT_DF(3).Caption = "machine!"
1206       DisplayForm.TXT_DF(4).Caption = ""
1207       DisplayForm.Refresh
1208       PlayFile "crdinv.wav"
1209       TempTimer! = Timer + 2
1210       While Timer < TempTimer!: ret = DoEvents(): Wend
1211       DisplayForm.Hide
1212       RefreshForm
1213       Res$ = Card$
1214       Card$ = "INV   "
1215     Else
1216       fname$ = Card$ + ".PLY"
1217       tempStrng$ = Exists$(fname$)
1218       If tempStrng$ = "" Then
1219         PlaySlots Card$, Res$, WinFlag$
1220         TempHandle = FreeFile
1221         Open fname$ For Output As #TempHandle
1222           Print #TempHandle, Time$
1223           Print #TempHandle, Date$
1224         Close #TempHandle
1225       Else
1226         DisplayForm.PIC_DF.Picture = LoadPicture("card.bmp")
1227         DisplayForm.Show 0
1228         DisplayForm.TXT_DF(0).Caption = ""
1229         DisplayForm.TXT_DF(1).Caption = "Card: " + Card$
1230         DisplayForm.TXT_DF(2).Caption = "was already used"
1231         DisplayForm.TXT_DF(3).Caption = "at " + Format$(TimeValue(Left$(tempStrng$, Len(tempStrng$) - 3)), "hh:mm AM/PM") + "!"
1232         DisplayForm.TXT_DF(4).Caption = ""
1233         DisplayForm.Refresh
1234         PlayFile "crdusd.wav"
1235         TempTimer! = Timer + 2
1236         While Timer < TempTimer!: ret = DoEvents(): Wend
1237         DisplayForm.Hide
1238         RefreshForm
1239         Card$ = "USD   "
1240         Res$ = Card$
1241       End If
1242     End If
1243   End Select
1244   BannerTime = Timer + BannerTimeOut
1245   VideoTime = Timer + VideoTimeOut
1246   WriteStat Card$, Res$, WinFlag$
1247   If MMEFlag Then
1248     Bfr$ = Space$(80)
1249     If MusicFlag Then templong& = mciSendString("play song", Bfr$, 80, 0)
```

```
1250   End If
1251 End Sub
1252
1253 Sub ResetCards ()
1254    Rem Reset Cards
1255    ResetPlayers
1256    DisplayForm.PIC_DF.Picture = LoadPicture("Card.bmp")
1257    DisplayForm.Show 0
1258    DisplayForm.TXT_DF(0).Caption = "Version " + VERSION
1259    DisplayForm.TXT_DF(1).Caption = "All Cards Reset"
1260    DisplayForm.TXT_DF(2).Caption = "for additional"
1261    DisplayForm.TXT_DF(3).Caption = "Play!"
1262    DisplayForm.TXT_DF(4).Caption = ""
1263    DisplayForm.Refresh
1264    If MMEFlag Then PlayFile "reset.wav"
1265    TempTmr! = Timer + 2: While TempTmr! > Timer: TempDo = DoEvents(): Wend
1266    DisplayForm.Hide
1267    RefreshForm
1268 End Sub
1269
1270 Sub SetVolumeUp ()
1271    If MMEFlag = false Then Exit Sub
1272
1273    Bfr$ = Space$(80)
1274    templong& = mciSendString("open mixer alias mix wait", Bfr$, 80, 0)
1275    templong& = mciSendString("get mix device_out AMP control volume both", Bfr$, 80, 0)
1276    VolLevel = Val(Bfr$)
1277    templong& = mciSendString("close mix wait", Bfr$, 80, 0)
1278
1279    If VolLevel >= 75 Then
1280       PlayFile "volmax.wav"
1281    Else
1282       SetVolume VolLevel + 10
1283       PlayFile "volup.wav"
1284    End If
1285 End Sub
1286
1287 Sub SetVolumeDown ()
1288    If MMEFlag = false Then Exit Sub
1289    .
1290    Bfr$ = Space$(80)
1291    templong& = mciSendString("open mixer alias mix wait", Bfr$, 80, 0)
1292    templong& = mciSendString("get mix device_out AMP control volume both", Bfr$, 80, 0)
1293    VolLevel = Val(Bfr$)
1294    templong& = mciSendString("close mix wait", Bfr$, 80, 0)
1295    If VolLevel <= 25 Then
1296       PlayFile "volmin.wav"
1297    Else
1298       SetVolume VolLevel - 10
1299       PlayFile "voldwn.wav"
1300    End If
1301 End Sub
1302
1303 Sub SetVolume (VolLevel)
1304    Bfr$ = Space$(80)
1305    vset$ = LTrim$(Str$(VolLevel))
1306    templong& = mciSendString("open mixer alias mix wait", Bfr$, 80, 0)
1307    templong& = mciSendString("set mix device_out AMP control volume both to " + vset$, Bfr$, 80, 0)
1308    templong& = mciSendString("close mix wait", Bfr$, 80, 0)
1309    temp = WritePrivateProfileString(APP_NAME, "Volume", vset$, APP_FILE)
1310 End Sub
1311
1312 Sub CheckReset ()
1313    If Val(Right$(Time$, 2)) > 19 Then Exit Sub
1314    If Left$(Time$, 4) = ResetTime Then
1315       ResetPlayers
1316    Else
1317       For CheckResetTime = Val(Left$(ResetTime, 2)) To 47 Step ResetInterval
1318          CheckHour = CheckResetTime Mod 24
1319          CheckTime$ = Format$(CheckHour) + ":": If Len(CheckTime$) < 3 Then CheckTime$ = "0" + CheckTime$
1320          CheckTime$ = CheckTime$ + Mid$(ResetTime, 4, 2)
```

```
1321         If CheckTime$ = Left$(Time$, 5) Then
1322           ResetPlayers
1323           Exit For
1324         End If
1325       Next CheckResetTime
1326    End If
1327 End Sub
1328
1329 Sub LoadBanner ()
1330    If BannerCount = false Then Exit Sub
1331    Load BannerForm
1332    ReDim BannerhMemDC(BannerCount), BannerhOldBM(BannerCount)
1333    For InitPic = 1 To BannerCount
1334       BannerForm.BannerPic(InitPic).Width = BannerWidth
1335       BannerForm.BannerPic(InitPic).Height = 154
1336       BannerForm.BannerPic(InitPic).Picture = LoadPicture("Banner" + Format$(InitPic) + ".BMP")
1337       ' Get Banner BitMap...
1338       BannerhMemDC(InitPic) = CreateCompatibleDC(BannerForm.BannerPic(InitPic).hDC)
1339       BannerhOldBM(InitPic) = SelectObject(BannerhMemDC(InitPic), BannerForm.BannerPic(InitPic).Picture)
1340    Next InitPic
1341    ResetBanner
1342 End Sub
1343
1344 Sub CheckBanner ()
1345    Static BnrPos
1346    If BannerTime > Timer Or BannerCount = false Then Exit Sub
1347    BannerTime = -1
1348
1349    If MainForm.Banner.Height = 24 Then ' Start New Banner Scroll
1350       MainForm.Banner.Left = 0
1351       MainForm.Banner.Top = 20
1352       MainForm.Banner.Height = 154
1353       MainForm.Banner.Width = 800
1354       MainForm.Banner.BorderStyle = 0
1355       MainForm.Banner.CurrentY = 50
1356    End If
1357
1358    ' MainForm.Banner.Refresh
1359    BnrPos = BnrPos + 2
1360    If BnrPos > BannerCount * BannerWidth Then BnrPos = 0
1361    DrawBanner = BnrPos \ BannerWidth + 1: If DrawBanner > BannerCount Then DrawBanner = 1
1362    XPosScrn = 0
1363    XPosPic = BnrPos Mod BannerWidth
1364    While XPosScrn < 800  ' Draw until edge of screen
1365       temp = BitBlt(MainForm.Banner.hDC, XPosScrn, 0, BannerWidth - XPosPic, 150, BannerhMemDC(DrawBanner), XPosPic, 0, SRCCOPY)
1366       DrawBanner = DrawBanner + 1: If DrawBanner > BannerCount Then DrawBanner = 1
1367       XPosScrn = XPosScrn + BannerWidth - XPosPic
1368       XPosPic = 0
1369    Wend
1370
1371 End Sub
1372
1373 Sub ResetBanner ()
1374       MainForm.Banner.BorderStyle = 0
1375       MainForm.Banner.Height = 24
1376       MainForm.Banner.Width = 24
1377       RefreshForm
1378 End Sub
1379
1380 Function Rand (Value)
1381    Rand = Int((Value + 1) * Rnd)
1382 End Function
1383
1384 Sub LoadCommon ()
1385    On Error GoTo ErrHndlr
1386    Randomize
1387
1388    ' Get Multimedia Extension Flag...
1389    Bfr$ = Space$(5)
1390    temp = GetPrivateProfileString(APP_NAME, "MME", "False", Bfr$, 5, APP_FILE)
1391    Bfr$ = Left$(UCase$(Bfr$), 4)
```

```
1392  MMEFlag = false
1393  If Bfr$ = "TRUE" Or Bfr$ = "ON" Then MMEFlag = true
1394
1395  ' Get Music On or Off Flag
1396  Bfr$ = Space$(6)
1397  temp = GetPrivateProfileString(APP_NAME, "Music", "True", Bfr$, 6, APP_FILE)
1398  Bfr$ = Left$(UCase$(Bfr$), 5)
1399  MusicFlag = true
1400  If Bfr$ = "FALSE" Or Bfr$ = "OFF" Then MusicFlag = false
1401
1402  ' Get Reset Base Time
1403  Bfr$ = Space$(5)
1404  temp = GetPrivateProfileString(APP_NAME, "ResetTime", "00:00", Bfr$, 5, APP_FILE)
1405  Bfr$ = Left$(UCase$(Bfr$), 4)
1406  ResetTime = Bfr$
1407
1408  ' Get Video On or Off Flag
1409  Bfr$ = Space$(6)
1410  temp = GetPrivateProfileString(APP_NAME, "Video", "False", Bfr$, 6, APP_FILE)
1411  Bfr$ = Left$(UCase$(Bfr$), 4)
1412  VideoFlag = false
1413  If Bfr$ = "TRUE" Or Bfr$ = "ON" Then VideoFlag = true
1414
1415  ' Get Index of legal Cards
1416  Bfr$ = Space$(9)
1417  temp = GetPrivateProfileString(APP_NAME, "CardIndex", "0", Bfr$, 9, APP_FILE)
1418  For ZeroLook = 1 To Len(Bfr$)
1419    If Asc(Mid$(Bfr$, ZeroLook, 1)) = 0 Then Exit For
1420  Next ZeroLook
1421  Bfr$ = RTrim$(Left$(Bfr$, ZeroLook - 1))
1422  If Bfr$ = "0" Then Bfr$ = ""
1423  CardIndex = Bfr$
1424
1425  ' Get Autowin, if any
1426  Bfr$ = Space$(4)
1427  temp = GetPrivateProfileString(APP_NAME, "AutoWin", " ", Bfr$, 4, APP_FILE)
1428  AutoWin = LTrim$(Left$(Bfr$, 3))
1429  If Len(AutoWin) < 3 Then AutoWin = "  "
1430
1431  Bfr$ = Space$(12)
1432  temp = GetPrivateProfileString(APP_NAME, "MainBack", "&H00FFFFFF", Bfr$, 12, APP_FILE)
1433  Load MainForm
1434  MainForm.BackColor = Val(Bfr$)
1435
1436  WheelItems = GetPrivateProfileInt(APP_NAME, "WheelItems", 27, APP_FILE)
1437  NmPictures = GetPrivateProfileInt(APP_NAME, "NmPictures", 7, APP_FILE)
1438  CardDigits = GetPrivateProfileInt(APP_NAME, "CardDigits", 12, APP_FILE)
1439  ResetInterval = GetPrivateProfileInt(APP_NAME, "ResetInterval", 1, APP_FILE)
1440  BannerCount = GetPrivateProfileInt(APP_NAME, "BannerCount", 0, APP_FILE)
1441  BannerWidth = GetPrivateProfileInt(APP_NAME, "BannerWidth", 500, APP_FILE)
1442  BannerTimeOut = GetPrivateProfileInt(APP_NAME, "BannerTimeOut", 12, APP_FILE)
1443  VideoTimeOut = GetPrivateProfileInt(APP_NAME, "VideoTimeOut", 12, APP_FILE)
1444  VolLevel = GetPrivateProfileInt(APP_NAME, "VolLevel", 50, APP_FILE)
1445  If VolLevel And MMEFlag Then SetVolume VolLevel
1446  GameSwitch = GetPrivateProfileInt(APP_NAME, "GameSwitch", 1, APP_FILE)
1447  If GameSwitch < 1 Then GameSwitch = 1
1448
1449  ' Get Twips to Pixel Scale...
1450  TwipToPixX = 1440 / GetDeviceCaps(MainForm.hDC, 88)' LOGPIXELX
1451  TwipToPixY = 1440 / GetDeviceCaps(MainForm.hDC, 90)' LOGPIXELY
1452
1453  ' Get and set default directory, if any
1454  Bfr$ = Space$(80)
1455  temp = GetPrivateProfileString(APP_NAME, "Dir", "", Bfr$, 80, APP_FILE)
1456  Bfr$ = RTrim$(Bfr$)
1457  While Asc(Right$(Bfr$, 1)) = 0 Or Right$(Bfr$, 1) = "\": Bfr$ = Left$(Bfr$, Len(Bfr$) - 1): Wend
1458  If Len(Bfr$) Then
1459    CmtDir = Bfr$
1460    ChDir CmtDir
1461  End If
1462
```

```
1463 ContinueHere:
1464  Exit Sub
1465
1466 ErrHndlr:
1467  If Err = 76 Then Resume ContinueHere ' No Directory Exists
1468  MsgBox "Error: " + Str$(Err) + " in Loading Common!", 16, "UCWIN"
1469  End
1470
1471 End Sub
1472
1473 Sub SetPauseUp ()
1474  If BannerCount = false Then Exit Sub
1475
1476  BannerTimeOut = BannerTimeOut + 3
1477  If BannerTimeOut > 30 Then BannerTimeOut = 30
1478  DisplayForm.PIC_DF.Picture = LoadPicture("Card.bmp")
1479  DisplayForm.Show 0
1480  DisplayForm.TXT_DF(0).Caption = ""
1481  DisplayForm.TXT_DF(1).Caption = "Pause before"
1482  DisplayForm.TXT_DF(2).Caption = "banner lengthened"
1483  DisplayForm.TXT_DF(3).Caption = "to" + Str$(BannerTimeOut) + " seconds"
1484  DisplayForm.TXT_DF(4).Caption = ""
1485  DisplayForm.Refresh
1486  If MMEFlag Then
1487    If BannerTimeOut = 30 Then
1488      PlayFile "pausmax.wav"
1489    Else
1490      PlayFile "pausl.wav"
1491    End If
1492  End If
1493
1494  SetPause
1495  TempTmr! = Timer + 3: While TempTmr! > Timer: TempDo = DoEvents(): Wend
1496  DisplayForm.Hide
1497  RefreshForm
1498
1499 End Sub
1500
1501 Sub SetPause ()
1502   Bfr$ = Space$(80)
1503   bset$ = LTrim$(Str$(BannerTimeOut))
1504   temp = WritePrivateProfileString(APP_NAME, "BannerTimeOut", bset$, APP_FILE)
1505 End Sub
1506
1507 Sub SetPauseDown ()
1508  If BannerCount = false Then Exit Sub
1509
1510  BannerTimeOut = BannerTimeOut - 3
1511  If BannerTimeOut < 3 Then BannerTimeOut = 3
1512  DisplayForm.PIC_DF.Picture = LoadPicture("Card.bmp")
1513  DisplayForm.Show 0
1514  DisplayForm.TXT_DF(0).Caption = ""
1515  DisplayForm.TXT_DF(1).Caption = "Pause before"
1516  DisplayForm.TXT_DF(2).Caption = "banner shortened"
1517  DisplayForm.TXT_DF(3).Caption = "to" + Str$(BannerTimeOut) + " seconds"
1518  DisplayForm.TXT_DF(4).Caption = ""
1519  DisplayForm.Refresh
1520  If MMEFlag Then
1521    If BannerTimeOut = 3 Then
1522      PlayFile "pausmin.wav"
1523    Else
1524      PlayFile "pauss.wav"
1525    End If
1526  End If
1527
1528  SetPause
1529  TempTmr! = Timer + 3: While TempTmr! > Timer: TempDo = DoEvents(): Wend
1530  DisplayForm.Hide
1531  RefreshForm
1532
1533 End Sub
```

```
1534
1535 Sub KillStats ()
1536   On Error GoTo ErrHandlerKS
1537   Kill "Stat.Dat"
1538   GoTo ExitKS
1539
1540 ErrHandlerKS:
1541   Resume ExitKS
1542
1543 ExitKS:
1544   If MMEFlag Then PlayFile "erastat.wav"
1545
1546 End Sub
1547
1548 Sub PrintIt (Pmt$)
1549   Printer.Print Pmt$
1550 End Sub
1551
1552 Sub PrintWinStat ()
1553   ReDim ResNum(2)
1554   DisplayForm.PIC_DF.Picture = LoadPicture("Card.bmp")
1555   DisplayForm.Show 0
1556   DisplayForm.TXT_DF(0).Caption = ""
1557   DisplayForm.TXT_DF(1).Caption = "Printing All"
1558   DisplayForm.TXT_DF(2).Caption = "Winner Stats."
1559   DisplayForm.TXT_DF(3).Caption = "Please wait..."
1560   DisplayForm.TXT_DF(4).Caption = ""
1561   DisplayForm.Refresh
1562   If MMEFlag Then PlayFile "printwin.wav"
1563
1564   StatHandle = FreeFile
1565   Static StatInfo As StatRecord
1566   Open "Stat.Dat" For Random As StatHandle Len = Len(StatInfo)
1567       ' Get Record Pointer
1568       Get #StatHandle, 1, StatInfo
1569       RecEnd# = StatInfo.TimePlayed
1570       FeedCtr = 0
1571       NoWins = 0
1572       NoOpCrd = 0
1573       NoInv = 0
1574       NoUsd = 0
1575       NoPlays = 0
1576       For RecNo# = 2 To RecEnd#
1577          If FeedCtr > 65 Then
1578             PrintIt Chr$(12)
1579             FeedCtr = 0
1580          End If
1581          If FeedCtr = 0 Then
1582             PrintIt "All Winner Stats for Index " + CardIndex
1583             PrintIt "Printed at " + Date$ + " " + Time$
1584             PrintIt ""
1585             PrintIt ""
1586             PrintIt "Card #    Play     Date     Time"
1587             PrintIt "---------------------------------"
1588             FeedCtr = 6
1589          End If
1590          Get #StatHandle, RecNo#, StatInfo
1591          If StatInfo.WinFlag = "*" Then
1592             NoWins = NoWins + 1
1593             DtFmt$ = Format$(StatInfo.DatePlayed, "m/d/yy")
1594             TmFmt$ = Format$(StatInfo.TimePlayed, "hh:mm am/pm")
1595             PrintIt Left$(StatInfo.CardNo, 8) + " " + StatInfo.Result + Space$(9 - Len(StatInfo.Result)) + DtFmt$ + Space$(10 - Len(DtFmt$)) + TmFmt$
1596             FeedCtr = FeedCtr + 1
1597          End If
1598          NoPlays = NoPlays + 1
1599       Next RecNo#
1600       PrintIt ""
1601       PrintIt ""
1602       PrintIt "Total Wins:    " + Format$(NoWins)
1603       PrintIt "Total Cards Used:" + Format$(NoPlays)
1604
```

```
1605    For LFeed = 1 To 5: PrintIt "": Next LFeed
1606    PrintIt Chr$(12)
1607
1608    ' Auto Cut if necessary
1609    CPHandle = FreeFile
1610    Open "Coupon.Dat" For Input As CPHandle
1611      Line Input #CPHandle, AutoCut$
1612    Close CPHandle
1613    If Left$(AutoCut$, 2) = "$A" And Len(AutoCut$) > 2 Then
1614      RtLn$ = Mid$(AutoCut$, 3)
1615      While Len(RtLn$) > 1
1616        MdLn$ = MdLn$ + Chr$(Val("&H" + Left$(RtLn$, 2)))
1617        RtLn$ = Mid$(RtLn$, 3)
1618      Wend
1619      PrintIt MdLn$
1620    End If
1621
1622    Printer.EndDoc
1623    Close #StatHandle
1624    DisplayForm.Hide
1625    RefreshForm
1626
1627 End Sub
1628
1629 Sub BackupStat ()
1630   On Error GoTo ErrHandlerBus
1631
1632   DisplayForm.PIC_DF.Picture = LoadPicture("Card.bmp")
1633   DisplayForm.Show 0
1634   DisplayForm.TXT_DF(0).Caption = ""
1635   DisplayForm.TXT_DF(1).Caption = "Backing Up"
1636   DisplayForm.TXT_DF(2).Caption = "Statistics"
1637   DisplayForm.TXT_DF(3).Caption = "Please Wait..."
1638   DisplayForm.TXT_DF(4).Caption = ""
1639   DisplayForm.Refresh
1640   If MMEFlag Then PlayFile "backstat.wav"
1641
1642   CopyFile "Stat.Dat", "A:Stat.Dat"
1643   GoTo ExitBus
1644
1645 ErrHandlerBus:
1646   Resume ExitBus
1647
1648 ExitBus:
1649   DisplayForm.Hide
1650   RefreshForm
1651
1652 End Sub
1653
1654 Sub PrintCoupon (ItemPrint)
1655 ' Read from Coupon.Dat, Coupon Format
1656 ' Use the following codes as special characters
1657 ' $C - Card No
1658 ' $T - Time and Date
1659 ' $1 - Main Name of Winning Coupon
1660 ' $2 - Description of Main Name, if any
1661 ' $$ - Print Dollar Sign
1662 ' $D - Send Direct Code: Format $DXXXXXX where XX equals character codes
1663 ' $S - Start Drawing Box
1664 ' $E - Stop Drawing Box
1665 ' $R - Remarks
1666 ' $A - Must be first line of Coupon.Dat, Code to Cut Paper
1667   BoxFlag = 0
1668   CPHandle = FreeFile
1669   Open "Coupon.Dat" For Input As CPHandle
1670     While Not (EOF(CPHandle))
1671       Line Input #CPHandle, Ln$
1672       Cntrl = InStr(Ln$, "$")
1673       While Cntrl > 0
1674         LftLn$ = Left$(Ln$, Cntrl - 1)
1675         RtLn$ = Mid$(Ln$, Cntrl + 2)
```

```
1676        MdLn$ = ""
1677        Select Case Mid$(Ln$, Cntrl + 1, 1)
1678          Case "C"
1679            MdLn$ = Card$
1680          Case "T"
1681            MdLn$ = Time$ + ", " + Date$
1682          Case "S"
1683            BoxFlag = 1
1684            RtLn$ = String$(36, "*")
1685          Case "E"
1686            BoxFlag = 0
1687            RtLn$ = String$(38, "*")
1688          Case "1"
1689            MdLn$ = WinItem$(ItemPrint, 0)
1690          Case "2"
1691            BrkUp$ = WinItem$(ItemPrint, 1)
1692            BrkUpPt = InStr(BrkUp$, Chr$(13))
1693            While BrkUpPt > 0
1694              MdLn$ = Left$(BrkUp$, BrkUpPt - 1)
1695              If BoxFlag Then
1696                If Len(MdLn$) > 36 Then MdLn$ = Left$(MdLn$, 36)
1697                SpcAdd1 = (36 - Len(MdLn$)) \ 2
1698                If Len(MdLn$) Mod 2 Then SpcAdd2 = SpcAdd1 Else SpcAdd2 = SpcAdd1 - 1
1699                MdLn$ = "*" + Space$(SpcAdd1) + MdLn$ + Space$(SpcAdd2) + "*"
1700              End If
1701              PrintIt MdLn$
1702              BrkUp$ = Mid$(BrkUp$, BrkUpPt + 1)
1703              BrkUpPt = InStr(BrkUp$, Chr$(13))
1704            Wend
1705            MdLn$ = BrkUp$
1706          Case "B"
1707            If Len(WinItem$(ItemPrint, 2)) > 0 Then
1708              MdLn$ = Chr$(29) + "H" + Chr$(2) + Chr$(27) + "$" + Chr$(40) + Chr$(0) + Chr$(29) + "k" + Chr$(0) + WinItem$(ItemPrint, 2) + Chr$(0)
1709            End If
1710          Case "J"
1711            While Len(RtLn$) > 1
1712              MdLn$ = MdLn$ + Chr$(Val("&H" + Left$(RtLn$, 2)))
1713              RtLn$ = Mid$(RtLn$, 3)
1714            Wend
1715          Case "R", "A"
1716            RtLn$ = ""
1717          Case "$"
1718            MdLn$ = "$"
1719          Case Else
1720        End Select
1721        Ln$ = LftLn$ + MdLn$ + RtLn$
1722        Cntrl = InStr(Cntrl, Ln$, "$")
1723      Wend
1724      If BoxFlag Then
1725        If Len(Ln$) > 36 Then Ln$ = Left$(Ln$, 36)
1726        SpcAdd1 = (36 - Len(Ln$)) \ 2
1727        If Len(Ln$) Mod 2 Then SpcAdd2 = SpcAdd1 + 1 Else SpcAdd2 = SpcAdd1
1728        Ln$ = "*" + Space$(SpcAdd1) + Ln$ + Space$(SpcAdd2) + "*"
1729      End If
1730      PrintIt Ln$
1731    Wend
1732  Close CPHandle
1733  Printer.EndDoc
1734 End Sub
1735
1736 Sub PrintTest ()
1737    Rem Reset Cards
1738    DisplayForm.PIC_DF.Picture = LoadPicture("Card.bmp")
1739    DisplayForm.Show 0
1740    DisplayForm.TXT_DF(0).Caption = ""
1741    DisplayForm.TXT_DF(1).Caption = "Printing Test"
1742    DisplayForm.TXT_DF(2).Caption = "Coupon"
1743    DisplayForm.TXT_DF(3).Caption = ""
1744    DisplayForm.TXT_DF(4).Caption = ""
1745    DisplayForm.Refresh
1746    If MMEFlag Then PlayFile "PmtTst.wav"
```

```
1747    PrintCoupon 0
1748    TempTmr! = Timer + 2: While TempTmr! > Timer: TempDo = DoEvents(): Wend
1749    DisplayForm.Hide
1750    RefreshForm
1751 End Sub
1752
1753 Sub CheckVideo ()
1754    If VideoTime > Timer Or VideoFlag = false Or MMEFlag = false Then Exit Sub
1755
1756    Bfr$ = Space$(80)
1757    templong& = mciSendString("status movie mode wait", Bfr$, 80, 0)
1758    templong& = Val(Bfr$)
1759    If templong& = 526 Then Exit Sub
1760    If templong& = 529 Then
1761        ResetVideo
1762        VideoTime = Timer + VideoTimeOut
1763        Exit Sub
1764    End If
1765
1766    templong& = mciSendString("window movie state show wait", Bfr$, 80, 0)
1767    templong& = mciSendString("status movie window handle wait", Bfr$, 80, 0)
1768    templong& = mciSendString("play movie from 0", Bfr$, 80, 0)
1769    VideoTime = -1
1770 End Sub
1771
1772 Sub ResetVideo ()
1773    If MMEFlag And VideoFlag Then
1774        Bfr$ = Space$(80)
1775        templong& = mciSendString("stop movie wait", Bfr$, 80, 0)
1776        templong& = mciSendString("window movie state hide wait", Bfr$, 80, 0)
1777        RefreshForm
1778    End If
1779 End Sub
1780
1781 Sub LoadVideo ()
1782    If VideoFlag = false Or MMEFlag = false Then Exit Sub
1783
1784    Bfr$ = Space$(80)
1785    templong& = mciSendString("close movie wait", Bfr$, 80, 0)
1786    VideoName$ = "MOVIE.VID" ' Override Video settings
1787    templong& = mciSendString("open " + VideoName$ + " alias movie type digitalvideo wait", Bfr$, 80, 0)
1788    templong& = mciSendString("set movie speed 1000 wait", Bfr$, 80, 0)
1789    templong& = mciSendString("window movie text Video wait", Bfr$, 80, 0)
1790    templong& = mciSendString("window movie state show wait", Bfr$, 80, 0)
1791    templong& = mciSendString("status movie window handle wait", Bfr$, 80, 0)
1792    VideohWnd& = Val(Bfr$)
1793    tempint = MoveWindow(VideohWnd&, 258, 350, 316, 217, true)
1794    templong& = mciSendString("window movie state hide wait", Bfr$, 80, 0)
1795 End Sub
1796
```

```
Page:1   SM                    Variable Cross-Ref
Functions
Name                           Module        Scope      Line No    # Refs
--------------------------------------------------------------------------
BitBlt..........................EXTERNAL........G............95..........2
BuildCommDCB....................EXTERNAL........G...........112..........1
CloseComm.......................EXTERNAL........G...........113..........1
CreateCompatibleBitMap..........EXTERNAL........G............97..........1
CreateCompatibleDC..............EXTERNAL........G............98..........2
CreatePalette...................EXTERNAL........G...........106..........2
DeleteDC........................EXTERNAL........G............99..........2
DeleteObject....................EXTERNAL........G...........100..........1
Exists..........................SM..............G...........733..........6
fClearQBE.......................EXTERNAL........G...........144..........0
fDelete.........................EXTERNAL........G...........147..........0
fDoQuery........................EXTERNAL........G...........137..........0
fEndQuery.......................EXTERNAL........G...........138..........0
fEnterQBE.......................EXTERNAL........G...........143..........0
fExecSQL........................EXTERNAL........G...........152..........0
fInsert.........................EXTERNAL........G...........145..........0
fLock...........................EXTERNAL........G...........148..........0
FlushComm.......................EXTERNAL........G...........114..........3
fNew............................EXTERNAL........G...........142..........0
fNext...........................EXTERNAL........G...........139..........0
fPrevious.......................EXTERNAL........G...........140..........0
fRandom.........................EXTERNAL........G...........141..........0
fTranBegin......................EXTERNAL........G...........149..........0
fTranCommit.....................EXTERNAL........G...........150..........0
fTranRollback...................EXTERNAL........G...........151..........0
fUpdate.........................EXTERNAL........G...........146..........0
```

| Name | Module | Scope | Line No | # Refs |
|---|---|---|---|---|
| GetBitmapBits | EXTERNAL | G | 103 | 0 |
| GetCommError | EXTERNAL | G | 121 | 1 |
| GetCommState | EXTERNAL | G | 115 | 0 |
| GetDeviceCaps | EXTERNAL | G | 109 | 2 |
| GetPrivateProfileInt | EXTERNAL | G | 127 | 10 |
| GetPrivateProfileString | EXTERNAL | G | 128 | 9 |
| GetTextExtent | EXTERNAL | G | 107 | 0 |
| mciExecute | EXTERNAL | G | 133 | 0 |
| mciSendString | EXTERNAL | G | 134 | 52 |
| MoveWindow | EXTERNAL | G | 124 | 1 |
| OpenComm | EXTERNAL | G | 116 | 1 |
| Rand | SM | G | 1380 | 1 |
| ReadCom | SM | G | 672 | 2 |
| ReadComm | EXTERNAL | G | 117 | 2 |
| RealizePalette | EXTERNAL | G | 123 | 2 |
| SelectObject | EXTERNAL | G | 104 | 4 |
| SelectPalette | EXTERNAL | G | 122 | 2 |
| SetBitmapBits | EXTERNAL | G | 105 | 0 |
| SetCommState | EXTERNAL | G | 118 | 1 |
| SetStretchBltMode | EXTERNAL | G | 102 | 0 |
| StretchBlt | EXTERNAL | G | 101 | 0 |
| StretchDIBits | EXTERNAL | G | 96 | 1 |
| TextOut | EXTERNAL | G | 108 | 0 |
| TransmitCommChar | EXTERNAL | G | 119 | 0 |
| WinExec | EXTERNAL | G | 130 | 1 |
| WriteComm | EXTERNAL | G | 120 | 0 |
| WritePrivateProfileString | EXTERNAL | G | 129 | 3 |

Page:2  SM                Variable Cross-Ref
Subprocedures

| Name | Module | Scope | Line No | # Refs |
|---|---|---|---|---|
| BackupStat | SM | G | 1629 | 1 |
| CheckBanner | SM | G | 1344 | 1 |
| CheckMusic | SM | G | 849 | 1 |
| CheckPayOff | SM | G | 563 | 1 |
| CheckReset | SM | G | 1312 | 1 |
| CheckSpin | SM | G | 705 | 1 |
| CheckVideo | SM | G | 1753 | 1 |
| CloseCom | SM | G | 700 | 2 |
| CopyFile | SM | G | 1038 | 3 |
| DrawBox | SM | G | 769 | 2 |
| DrawPic | SM | G | 400 | 8 |
| DrawWheel | SM | G | 385 | 2 |
| Form_KeyPress | MNSM | M | 278 | 0 |
| Form_Resize | MNSM | M | 292 | 0 |
| Form_Unload | MNSM | M | 327 | 0 |
| KillStats | SM | G | 1535 | 1 |
| LoadBanner | SM | G | 1329 | 1 |
| LoadBitMaps | SM | G | 805 | 1 |
| LoadCommon | SM | G | 1384 | 1 |
| LoadNewSoftware | SM | G | 986 | 1 |
| LoadOdds | SM | G | 478 | 1 |
| LoadPalette | SM | G | 784 | 1 |
| LoadVideo | SM | G | 1781 | 1 |
| LoadWheels | SM | G | 347 | 1 |
| Main | SM | G | 542 | 0 |
| OpenCom | SM | G | 649 | 1 |
| Pic_Frame_KeyPress | MNSM | M | 313 | 0 |
| PlayFile | SM | G | 1076 | 23 |
| PlaySlots | SM | G | 404 | 4 |
| PrintCoupon | SM | G | 1654 | 2 |
| PrintIt | SM | G | 1548 | 35 |
| PrintStat | SM | G | 897 | 1 |
| PrintTest | SM | G | 1736 | 1 |
| PrintWinStat | SM | G | 1552 | 1 |
| ReadCard | SM | G | 1087 | 3 |
| RefreshForm | SM | G | 756 | 14 |
| ResetBanner | SM | G | 1373 | 2 |
| ResetCards | SM | G | 1253 | 1 |
| ResetPlayers | SM | G | 721 | 4 |
| ResetVideo | SM | G | 1772 | 2 |
| RotateWheel | SM | G | 377 | 3 |
| SetPause | SM | G | 1501 | 2 |
| SetPauseDown | SM | G | 1507 | 1 |
| SetPauseUp | SM | G | 1473 | 1 |
| SetVolume | SM | G | 1303 | 3 |
| SetVolumeDown | SM | G | 1287 | 1 |
| SetVolumeUp | SM | G | 1270 | 1 |
| WriteStat | SM | G | 866 | 4 |

Page:3  SM                Variable Cross-Ref
Line Labels and Numbers

| Name | Procedure | Module | Line No | # Refs |
|---|---|---|---|---|
| ContinueHere | LoadCommon | SM | 1463 | 2 |
| CopyFileErrHandler | CopyFile | SM | 1072 | 2 |
| ErrHandlerBus | BackupStat | SM | 1645 | 2 |
| ErrHandlerEX | Exists | SM | 748 | 2 |
| ErrHandlerKS | KillStats | SM | 1540 | 2 |
| ErrHandlerRP | ResetPlayers | SM | 725 | 2 |
| ErrHndlr | LoadCommon | SM | 1466 | 2 |
| ExitBus | BackupStat | SM | 1648 | 3 |
| ExitEX | Exists | SM | 751 | 2 |
| ExitKS | KillStats | SM | 1543 | 3 |
| ExitRP | ResetPlayers | SM | 728 | 2 |
| LNSErrHandler | LoadNewSoftware | SM | 1028 | 2 |

Page:4  SM                Variable Cross-Ref
Constants

| Name | Module | Scope | Line No | # Refs |
|---|---|---|---|---|
| APP_FILE | SMGLB | G | 223 | 22 |
| APP_NAME | SMGLB | G | 222 | 22 |

```
BLACKNESS......................SMGLB..........G............212............0
BLACKONWHITE...................SMGLB..........G............216............
COLORBLUE......................SMGLB..........G............194............2
COLORGREY......................SMGLB..........G............195............3
COLORONCOLOR...................SMGLB..........G............218............0
COLORRED.......................SMGLB..........G............196............1
COLORWHITE.....................SMGLB..........G............197............2
DSTINVERT......................SMGLB..........G............211............0
F_CLEARQBE.....................SMGLB..........G............183............0
F_DELETE.......................SMGLB..........G............186............0
F_DOQUERY......................SMGLB..........G............176............0
F_ENDQUERY.....................SMGLB..........G............177............0
F_ENTERQBE.....................SMGLB..........G............182............0
F_EXECSQL......................SMGLB..........G............191............0
F_INSERT.......................SMGLB..........G............184............0
F_LOCK.........................SMGLB..........G............187............0
F_NEW..........................SMGLB..........G............181............0
F_NEXT.........................SMGLB..........G............178............0
F_PREVIOUS.....................SMGLB..........G............179............0
F_RANDOM.......................SMGLB..........G............180............0
F_TRANBEGIN....................SMGLB..........G............188............0
F_TRANCOMMIT...................SMGLB..........G............189............0
F_TRANROLLBACK.................SMGLB..........G............190............0
F_UPDATE.......................SMGLB..........G............185............0
false..........................SMGLB..........G............220...........17
MERGECOPY......................SMGLB..........G............206............0
MERGEPAINT.....................SMGLB..........G............207............0
MM_TEXT........................SMGLB..........G............215............0
NOTSRCCOPY.....................SMGLB..........G............204............0
NOTSRCERASE....................SMGLB..........G............205............0
OF_EXIST.......................SMGLB..........G............219............0
PATCOPY........................SMGLB..........G............208............0
PATINVERT......................SMGLB..........G............210............0
PATPAINT.......................SMGLB..........G............209............0
QE_DB_ERROR....................SMGLB..........G............159............0
QE_ERROR_CODES.................SMGLB..........G............156............0
QE_FUNCTION_ABORTED............SMGLB..........G............157............0
QE_RECORD_CHANGED..............SMGLB..........G............161............0
QE_RECORD_LOCKED...............SMGLB..........G............160............0
QE_RECORD_NOT_FOUND............SMGLB..........G............158............0
RECSTATE_CHANGED...............SMGLB..........G............166............0
RECSTATE_CLEARING_NEW..........SMGLB..........G............174............0
RECSTATE_CLEARING_QBE..........SMGLB..........G............173............0
RECSTATE_COPYING...............SMGLB..........G............171............0
RECSTATE_ENTERING_QBE..........SMGLB..........G............172............0
RECSTATE_FETCHING..............SMGLB..........G............164............0
RECSTATE_NEW_CHANGED...........SMGLB..........G............168............0
RECSTATE_NEW_UNCHANGED.........SMGLB..........G............167............0
RECSTATE_NO_RECORD.............SMGLB..........G............163............0
RECSTATE_QBE_CHANGED...........SMGLB..........G............170............0
RECSTATE_QBE_UNCHANGED.........SMGLB..........G............169............0
RECSTATE_UNCHANGED.............SMGLB..........G............165............0
SRCAND.........................SMGLB..........G............201............0
```

Page:5   SM                Variable Cross-Ref
Constants
Name                              Module     Scope    Line No    # Refs
------------------------------------------------------------------------

```
SRCCOPY........................SMGLB..........G............199............3
SRCERASE.......................SMGLB..........G............203............0
SRCINVERT......................SMGLB..........G............202............0
SRCPAINT.......................SMGLB..........G............200............0
true...........................SMGLB..........G............221............6
VERSION........................SMGLB..........G............224............1
WHITENESS......................SMGLB..........G............213............0
WHITEONBLACK...................SMGLB..........G............217............0
```

Page:6   SM                Variable Cross-Ref
Scalar Variables
Name                              Mod/Proc                Scope    # Refs
------------------------------------------------------------------------

```
Access.........................SM/LoadPalette................L............1
    SM.TXT
        LoadPalette: 789
Access.........................SM/LoadBitMaps................L............1
    SM.TXT
        LoadBitMaps: 824
AutoCut........................SM/PrintWinStat...............L............4
    SM.TXT
        PrintWinStat: 1611, 1613, 1613, 1614
AutoCut........................SM/PrintStat..................L............4
    SM.TXT
        PrintStat: 969, 971, 971, 972
AutoWin........................SMGLB.........................G............4
    SM.TXT
        PlaySlots: =444
        LoadCommon: =1428, 1429, =1429
AutoWinCheck...................SM/PlaySlots..................L............3
    SM.TXT
        PlaySlots: =444, 445, =445
B..............................SM/RefreshForm................L............1
    SM.TXT
        RefreshForm: 764
B..............................SM/DrawBox....................L............1
    SM.TXT
        DrawBox: 772
BannerCount....................SMGLB.........................G...........10
    MNSM.TXT
        Form_Unload: 334
    SM.TXT
        LoadBanner: =1330, 1333
        CheckBanner: =1346, 1360, 1361, 1366
        LoadCommon: =1440
        SetPauseUp: =1474
        SetPauseDown: =1508
```

```
BannerFlag.........................MNSM/Form_Unload...............L...........1
    MNSM.TXT
        Form_Unload: 333
BannerhMemDC......................SMGLB.........................G...........5
    MNSM.TXT
        Form_Unload: 335, 336
    SM.TXT
        LoadBanner: 1338, 1339
        CheckBanner: 1365
BannerhOldBM......................SMGLB.........................G...........2
    MNSM.TXT
        Form_Unload: 335
    SM.TXT
        LoadBanner: 1339
BannerTime........................SMGLB.........................G...........4
    SM.TXT
        ReadCard: =1117, =1244
        CheckBanner: 1346, =1347
BannerTimeOut.....................SMGLB.........................G..........16
    SM.TXT
        ReadCard: 1117, 1244
        LoadCommon: =1442

Page:7  SM                Variable Cross-Ref
Scalar Variables
Name                              Mod/Proc                      Scope    # Refs
--------------------------------------------------------------------------------

SetPauseUp: =1476, 1476, 1477, =1477, 1483, =1487
        SetPause: 1503
        SetPauseDown: =1510, 1510, 1511, =1511, 1517, =1521
BannerWidth.......................SMGLB.........................G...........7
    SM.TXT
        LoadBanner: 1334
        CheckBanner: 1360, 1361, 1363, 1365, 1367
        LoadCommon: =1441
BF................................SM/CheckPayOff................L...........2
    SM.TXT
        CheckPayOff: 596, 597
Bfr...............................SM/SetVolumeUp................L...........5
    SM.TXT
        SetVolumeUp: =1273, 1274, 1275, 1276, 1277
Bfr...............................SM/PlayFile...................L...........6
    SM.TXT
        PlayFile: =1078, 1079, 1080, 1081, 1082, 1083
Bfr...............................SM/CheckVideo.................L...........6
    SM.TXT
        CheckVideo: =1756, 1757, 1758, 1766, 1767, 1768
Bfr...............................SM/SetVolumeDown..............L...........5
    SM.TXT
        SetVolumeDown: =1290, 1291, 1292, 1293, 1294
Bfr...............................SM/ReadCard...................L...........8
    SM.TXT
        ReadCard: =1090, 1091, =1121, 1122, =1143, 1144, =1248, 1249
Bfr...............................SM/CopyFile...................L...........4
    SM.TXT
        CopyFile: =1054, =1063, 1065, 1066
Bfr...............................SM/ResetVideo.................L...........3
    SM.TXT
        ResetVideo: =1774, 1775, 1776
Bfr...............................SM/LoadCommon.................L..........49
    SM.TXT
        LoadCommon: =1389, 1390, =1391, 1391, =1393, =1393, =1396, 1397,
            =1398, 1398, =1400, =1400, =1403, 1404, =1405, 1405, 1406, =1409,
            1410, =1411, 1411, =1413, =1413, =1416, 1417, 1418, =1419, =1421,
            1421, =1422, =1422, 1423, =1426, 1427, 1428, =1431, 1432, 1434,
            =1454, 1455, =1456, 1456, =1457, 1457, =1457, 1457, 1457, 1458,
            1459
Bfr...............................SM/LoadVideo..................L...........9
    SM.TXT
        LoadVideo: =1784, 1785, 1787, 1788, 1789, 1790, 1791, 1792, 1794
Bfr...............................SM/SetPause...................L...........1
    SM.TXT
        SetPause: =1502
Bfr...............................SM/SetVolume..................L...........4
    SM.TXT
        SetVolume: =1304, 1306, 1307, 1308
Bfr...............................SM/ReadCom....................L...........2
    SM.TXT
        ReadCom: =679, 680
Bfr...............................MNSM/Form_Unload..............L...........2
    MNSM.TXT
        Form_Unload: =340, 341

Page:8  SM                Variable Cross-Ref
Scalar Variables
Name                              Mod/Proc                      Scope    # Refs
--------------------------------------------------------------------------------

Bfr...............................SM/CheckPayOff................L...........6
    SM.TXT
        CheckPayOff: =591, 592, 593, =625, 626, 627
Bfr...............................SM/LoadNewSoftware............L...........2
    SM.TXT
        LoadNewSoftware: =1024, 1025
Bfr...............................SM/PlaySlots..................L..........14
    SM.TXT
        PlaySlots: =410, 411, 412, 413, =448, 449, 450, 451, =466, 467, 468,
            469, 470, 471
Bfr...............................SM/CheckMusic.................L...........9
    SM.TXT
        CheckMusic: =853, 854, =855, 855, =856, 858, =860, 861, 862
BfrPos............................SM/CopyFile...................L...........8
    SM.TXT
        CopyFile: =1053, 1060, 1061, 1062, 1065, 1066, =1067, 1067
BfrSize...........................SM/CopyFile...................L...........6
```

```
        SM.TXT
            CopyFile: =1052, 1054, 1061, =1062, 1063, 1067
BnrPos........................SM/CheckBanner................L..........7
        SM.TXT
            CheckBanner: 1345, =1359, 1359, 1360, =1360, 1361, 1363
BoxFlag.......................SM/PrintCoupon................L..........5
        SM.TXT
            PrintCoupon: =1667, =1683, =1686, 1695, 1724
BrkUp.........................SM/PrintCoupon................L..........7
        SM.TXT
            PrintCoupon: =1691, 1692, 1694, =1702, 1702, 1703, 1705
BrkUpPt.......................SM/PrintCoupon................L..........5
        SM.TXT
            PrintCoupon: =1692, 1693, 1694, 1702, =1703
bset..........................SM/SetPause...................L..........2
        SM.TXT
            SetPause: =1503, 1504
Buf...........................SM/ReadCom....................L.........11
        SM.TXT
            ReadCom: =676, 677, =685, 685, 686, 687, =690, 691, =692, 692, 693
Buf...........................SM/CheckSpin..................L..........4
        SM.TXT
            CheckSpin: =706, =707, 711, 712
Buf...........................SM/PlaySlots..................L..........1
        SM.TXT
            PlaySlots: =474
BufTemp.......................SM/ReadCom....................L..........5
        SM.TXT
            ReadCom: =675, =687, =693, 693, 697
BufTime.......................SM/ReadCom....................L..........2
        SM.TXT
            ReadCom: =688, 689
Cancel........................MNSM/Form_Unload..............L..........1
        MNSM.TXT
            Form_Unload: 327
Card..........................MNSM/Form_KeyPress............L..........4
        MNSM.TXT
            Form_KeyPress: =282, 283, =286, 287

Page:9  SM                    Variable Cross-Ref
Scalar Variables
Name                          Mod/Proc                    Scope   # Refs
------------------------------------------------------------------------

Card..........................SM/ReadCard...................L.........34
        SM.TXT
            ReadCard: 1087, 1098, 1105, =1115, 1119, 1128, =1129, 1129, =1134,
                =1147, 1148, =1153, =1156, 115., =1162, =1166, =1170, =1174,
                =1178, =1182, =1186, =1190, 1193, =1194, 1197, 1203, 1213, =1214,
                1216, 1219, 1229, =1239, 1240, 1246
Card..........................SM/CheckPayOff................L..........1
        SM.TXT
            CheckPayOff: 563
Card..........................SM/CheckSpin..................L..........7
        SM.TXT
            CheckSpin: =709, =713, 713, 716, =717, 717, 718
Card..........................SM/PrintCoupon................L..........1
        SM.TXT
            PrintCoupon: 1679
Card..........................SM/PlaySlots..................L..........2
        SM.TXT
            PlaySlots: 404, 475
Card..........................MNSM/Pic_Frame_KeyPress.......L..........4
        MNSM.TXT
            Pic_Frame_KeyPress: =317, 318, =321, 322
CardDigits....................SMGLB.........................G..........5
        SM.TXT
            CheckSpin: 716, 717
            ReadCard: 1127, 1127
            LoadCommon: =1438
CardIndex.....................SMGLB.........................G..........7
        SM.TXT
            PrintStat: 927
            ReadCard: 1098, 1101, 1101, 1104
            LoadCommon: =1423
            PrintWinStat: 1582
CardLength....................SM/ReadCard...................L..........4
        SM.TXT
            ReadCard: =1127, =1127, 1129, 1203
CardNo........................SM/WriteStat..................L..........2
        SM.TXT
            WriteStat: 866, 888
CardRead......................SM/ReadCard...................L..........5
        SM.TXT
            ReadCard: =1098, 1101, 1116, =1128, 1130
charRead......................SM/ReadCom....................L..........3
        SM.TXT
            ReadCom: =677, =678, =691
CheckHour.....................SM/CheckReset.................L..........2
        SM.TXT
            CheckReset: =1318, 1319
CheckResetTime................SM/CheckReset.................L..........3
        SM.TXT
            CheckReset: =1317, 1318, 1325
CheckTime.....................SM/CheckReset.................L..........7
        SM.TXT
            CheckReset: =1319, 1319, =1319, 1319, =1320, 1320, =1321
Cid...........................SMGLB.........................G.........11
        SM.TXT
            OpenCom: =659, 660, 661, 666, 668

Page:10 SM                    Variable Cross-Ref
Scalar Variables
Name                          Mod/Proc                    Scope   # Refs
------------------------------------------------------------------------

ReadCom: 677, 680, 691, 696
```

```
        CloseCom: 701, 702
ClrB.........................SM/DrawBox....................L..........2
    SM.TXT
        DrawBox: 769, 772
ClrP.........................SM/DrawBox....................L..........3
    SM.TXT
        DrawBox: 769, 777, 778
ClrSwitch....................SM/CheckPayOff................L..........3
    SM.TXT
        CheckPayOff: =604, 604, 605
Cntrl........................SM/PrintCoupon................L..........7
    SM.TXT
        PrintCoupon: =1672, 1673, 1674, 1675, 1677, =1722, 1722
ColonEnd.....................SM/LoadOdds...................L.........13
    SM.TXT
        LoadOdds: =512, 513, 514, 515, =516, =518, 519, 520, 521, =527, 528,
            529, 530
ColonStart...................SM/LoadOdds...................L.........16
    SM.TXT
        LoadOdds: =507, 508, 509, =511, 511, 512, 513, 514, 514, =515, 516,
            518, 519, 520, 520, 523
Comm.........................SM/OpenCom....................L..........8
    SM.TXT
        OpenCom: =650, 651, =652, 652, 656, =658, 658, 659
Count........................SM/LoadWheels.................L..........5
    SM.TXT
        LoadWheels: =358, 359, 359, 360, 361
CPBandle.....................SM/PrintCoupon................L..........5
    SM.TXT
        PrintCoupon: =1668, 1669, 1670, =1671, 1732
CPBandle.....................SM/PrintStat..................L..........4
    SM.TXT
        PrintStat: =967, 968, =969, 970
CPBandle.....................SM/PrintWinStat...............L..........4
    SM.TXT
        PrintWinStat: =1609, 1610, =1611, 1612
CrntDir......................SMGLB.........................G..........3
    SM.TXT
        LoadNewSoftware: 1018
        LoadCommon: =1459, 1460
CRPos........................SM/Exists.....................L..........3
    SM.TXT
        Exists: =742, 743, 743
CurrentValue.................SM/LoadOdds...................L..........4
    SM.TXT
        LoadOdds: =499, =501, 503, =504
Dat..........................SM/Exists.....................L..........7
    SM.TXT
        Exists: =737, 739, 741, 742, =743, 743, 745
DCB..........................SM/OpenCom....................L..........4
    SM.TXT
        OpenCom: =653, 656, =666, 667
Descl........................SM/LoadOdds...................L..........8
    SM.TXT
        LoadOdds: =510, =514, 514, =520, 520, =523, 523, 525

Page:11 SM                    Variable Cross-Ref
Scalar Variables
Name                          Mod/Proc                      Scope   # Refs
---------------------------------------------------------------------------

Descript.....................SM/LoadOdds...................L.........14
    SM.TXT
        LoadOdds: =491, 507, 509, 512, =514, 516, 518, =520, 521, =523, 527,
            529, 530, 532
Destin.......................SM/CopyFile...................L..........4
    SM.TXT
        CopyFile: 1038, 1045, 1048, 1058
DIB_RGB_COLORS...............SM/LoadBitMaps................L..........1
    SM.TXT
        LoadBitMaps: 843
DoFlag.......................SM/PlaySlots..................L..........6
    SM.TXT
        PlaySlots: 434, =435, 435, 460, =461, 461
DrawBanner...................SM/CheckBanner................L..........8
    SM.TXT
        CheckBanner: =1361, 1361, =1361, 1365, =1366, 1366, 1366, =1366
DtFmt........................SM/PrintWinStat...............L..........3
    SM.TXT
        PrintWinStat: =1593, 1595, 1595
DtFmt........................SM/PrintStat..................L..........3
    SM.TXT
        PrintStat: =936, 938, 938
EqualSign....................SM/LoadNewSoftware............L..........3
    SM.TXT
        LoadNewSoftware: =1009, 1010, 1011
FeedCtr......................SM/PrintWinStat...............L..........7
    SM.TXT
        PrintWinStat: =1570, 1577, =1579, =1581, =1588, =1596, 1596
FeedCtr......................SM/PrintStat..................L..........7
    SM.TXT
        PrintStat: =915, 922, =924, =926, =933, =939, 939
flname.......................SM/Exists.....................L..........3
    SM.TXT
        Exists: 733, 736, 738
flname.......................SM/ReadCard...................L..........5
    SM.TXT
        ReadCard: =1197, 1198, =1216, 1217, 1221
flname.......................SM/PlayFile...................L..........2
    SM.TXT
        PlayFile: 1076, 1080
FrameDraw....................SM/LoadPalette................L..........6
    SM.TXT
        LoadPalette: =797, =798, 798, 799, 800, 801
GameSwitch...................SMGLB.........................G..........6
    SM.TXT
        CheckPayOff: 645
```

```
        LoadBitMaps: 806, =820
        LoadCommon: =1446, 1447, =1447
Height..........................MNSM/Form_Resize..............L..........1
    MNSM.TXT
        Form_Resize: =300
hFrame..........................SMGLB.........................G..........4
    SM.TXT
        DrawPic: 401
        LoadPalette: 798, 799, 800

Page:12  SM                 Variable Cross-Ref
Scalar Variables
Name                            Mod/Proc                  Scope    # Refs
------------------------------------------------------------------------- hPal............................SMGLB.........................G..........5
    SM.TXT
        LoadPalette: =795, 799
        LoadBitMaps: =821, =834, 841
Index...........................MNSM/Pic_Frame_KeyPress........L..........1
    MNSM.TXT
        Pic_Frame_KeyPress: 313
InHandle........................SM/CopyFile...................L..........7
    SM.TXT
        CopyFile: =1055, 1056, 1060, 1061, 1062, 1065, 1069
InitPic.........................MNSM/Form_Unload..............L.........11
    MNSM.TXT
        Form_Unload: =328, 329, 329, 330, 331, 332, =334, 335, 335, 336, 337
InitPic.........................SM/LoadBanner.................L.........11
    SM.TXT
        LoadBanner: =1333, =1334, =1335, =1336, 1336, =1338, 1338, =1339,
            1339, 1339, 1340
ItemPrint.......................SM/PrintCoupon................L..........5
    SM.TXT
        PrintCoupon: 1654, 1689, 1691, 1707, 1708
KeyAscii........................MNSM/Pic_Frame_KeyPress........L..........7
    MNSM.TXT
        Pic_Frame_KeyPress: 313, =316, =316, =320, =320, =324, =324
KeyAscii........................MNSM/Form_KeyPress............L..........7
    MNSM.TXT
        Form_KeyPress: 278, =281, =281, =285, =285, =289, =289
Left............................MNSM/Form_Resize..............L..........1
    MNSM.TXT
        Form_Resize: =302
Legal...........................SM/CheckSpin..................L..........2
    SM.TXT
        CheckSpin: =708, 713
LFeed...........................SM/PrintWinStat...............L..........2
    SM.TXT
        PrintWinStat: =1605, 1605
LFeed...........................SM/PrintStat..................L..........2
    SM.TXT
        PrintStat: =963, 963
LftLn...........................SM/PrintCoupon................L..........2
    SM.TXT
        PrintCoupon: =1674, 1721
Ln..............................SM/LoadOdds...................L..........5
    SM.TXT
        LoadOdds: 487, 488, 489, 490, 491
Ln..............................SM/PrintCoupon................L.........15
    SM.TXT
        PrintCoupon: 1671, 1672, 1674, 1675, =1677, =1721, 1722, 1725, =1725,
            1725, 1726, 1727, =1728, 1728, 1730
LnChg...........................SM/LoadNewSoftware............L..........4
    SM.TXT
        LoadNewSoftware: 1008, 1009, 1010, 1011
lpBits..........................SM/LoadBitMaps................L..........3
    SM.TXT
        LoadBitMaps: =811, 827, 843
lpBitsHdr.......................SM/LoadPalette................L..........2

Page:13  SM                 Variable Cross-Ref
Scalar Variables
Name                            Mod/Proc                  Scope    # Refs
-------------------------------------------------------------------------

SM.TXT
        LoadPalette: =785, 790
lpBitsHdr.......................SM/LoadBitMaps................L..........3
    SM.TXT
        LoadBitMaps: =809, 825, =830
lpBitsInfo......................SM/LoadBitMaps................L..........4
    SM.TXT
        LoadBitMaps: =810, 826, =833, 843
lpPal...........................SM/LoadBitMaps................L..........2
    SM.TXT
        LoadBitMaps: =833, 834
lpPal...........................SM/LoadPalette................L..........5
    SM.TXT
        LoadPalette: =786, 791, =794, 794, 795
Ltr.............................SM/CheckSpin..................L..........3
    SM.TXT
        CheckSpin: =712, 713, 713
Match...........................SM/LoadNewSoftware............L.........10
    SM.TXT
        LoadNewSoftware: =999, 1000, =1001, 1003, 1003, =1004, 1017, 1018,
            1018, =1020
MdLn............................SM/PrintWinStat...............L..........3
    SM.TXT
        PrintWinStat: =1616, 1616, 1619
MdLn............................SM/PrintCoupon................L.........19
    SM.TXT
        PrintCoupon: =1676, =1679, =1681, =1689, =1694, =1696, 1696, 1696,
            1697, 1698, =1699, 1699, 1701, =1705, =1708, =1712, 1712, =1718,
            1721
MdLn............................SM/PrintStat..................L..........3
```

```
    SM.TXT
        PrintStat: =974, 974, 977
MMEFlag.........................SMGLB..........................G..........31
    MNSM.TXT
        Form_Unload: 339
    SM.TXT
        PlaySlots: 409, 447, 465
        CheckPayOff: 590, 624, 643
        CheckMusic: =852
        PrintStat: 906
        LoadNewSoftware: 997, 1023
        PlayFile: 1077
        ReadCard: 1089, 1120, =1137, 1247
        ResetCards: 1264
        SetVolumeUp: =1271
        SetVolumeDown: =1288
        LoadCommon: =1392, =1393, 1445
        SetPauseUp: 1486
        SetPauseDown: 1520
        KillStats: 1544
        PrintWinStat: 1562
        BackupStat: 1640
        PrintTest: 1746
        CheckVideo: =1754
        ResetVideo: 1773
        LoadVideo: =1782

Page:14  SM                    Variable Cross-Ref
Scalar Variables
Name                          Mod/Proc                    Scope    # Refs
----------------------------------------------------------------------------

MusicFlag......................SMGLB..........................G..........9
    SM.TXT
        CheckMusic: =852
        ReadCard: 1089, 1122, =1139, 1139, =1140, 1249
        LoadCommon: =1399, =1400
NewString......................SM/LoadNewSoftware............L..........2
    SM.TXT
        LoadNewSoftware: =1011, 1013
NmPictures.....................SMGLB..........................G..........6
    MNSM.TXT
        Form_Unload: 328
    SM.TXT
        DrawPic: 401
        CheckPayOff: 573
        LoadBitMaps: 806, 820
        LoadCommon: =1437
NoInv..........................SM/PrintWinStat...............L..........1
    SM.TXT
        PrintWinStat: 1573
NoInv..........................SM/PrintStat..................L..........4
    SM.TXT
        PrintStat: =918, =944, 944, 959
NoOpCrd........................SM/PrintStat..................L..........4
    SM.TXT
        PrintStat: =917, =942, 942, 961
NoOpCrd........................SM/PrintWinStat...............L..........1
    SM.TXT
        PrintWinStat: 1572
NoPlays........................SM/PrintWinStat...............L..........4
    SM.TXT
        PrintWinStat: =1575, =1598, 1598, 1603
NoPlays........................SM/PrintStat..................L..........1
    SM.TXT
        PrintStat: =920
NoUsd..........................SM/PrintStat..................L..........4
    SM.TXT
        PrintStat: =919, =946, 946, 960
NoUsd..........................SM/PrintWinStat...............L..........1
    SM.TXT
        PrintWinStat: 1574
NoWinCheck.....................SM/CheckPayOff................L..........4
    SM.TXT
        CheckPayOff: =579, 580, =638, 643
NoWins.........................SM/PrintStat..................L..........4
    SM.TXT
        PrintStat: =916, =951, 951, 958
NoWins.........................SM/PrintWinStat...............L..........4
    SM.TXT
        PrintWinStat: =1571, =1592, 1592, 1602
NumPicsLoad....................SM/LoadBitMaps................L..........2
    SM.TXT
        LoadBitMaps: =806, 815
Odds...........................SM/CheckPayOff................L..........9
    SM.TXT
        CheckPayOff: =578, 580, 581, 587, 587, 628, 632, =641, 641

Page:15  SM                    Variable Cross-Ref
Scalar Variables
Name                          Mod/Proc                    Scope    # Refs
----------------------------------------------------------------------------

OddsCounter....................SM/LoadOdds...................L..........15
    SM.TXT
        LoadOdds: =481, 493, 494, 495, 501, 504, 509, 521, 525, 529, 530, 532,
            =536, 536, 539
OutHandle......................SM/CopyFile...................L..........7
    SM.TXT
        CopyFile: =1047, 1048, 1049, =1057, 1058, 1066, 1070
PalHandle......................SM/LoadPalette................L..........5
    SM.TXT
        LoadPalette: =788, 789, 790, 791, 792
PicFr..........................SM/CheckPayOff................L..........17
    SM.TXT
        CheckPayOff: =595, 596, 597, 599, =606, =607, 608, 609, 610, =616,
            =617, =618, 619, =620, =621, 622, 623
```

```
PicFr..........................SM/DrawBox..................L..........8
    SM.TXT
        DrawBox: =773, =774, =775, =776, 777, 778, =779, 780
PicHandle......................SM/LoadBitMaps..............L..........6
    SM.TXT
        LoadBitMaps: =813, 824, 825, 826, 827, 828
PicHeight......................SM/DrawPic..................L..........2
    SM.TXT
        DrawPic: 400, 401
PicNm..........................SM/LoadBitMaps..............L..........3
    SM.TXT
        LoadBitMaps: =817, =819, 824
PicNo..........................SM/LoadBitMaps..............L.........12
    SM.TXT
        LoadBitMaps: =815, 817, 820, =837, =838, =839, 839, 839, 841, 842,
            843, 845
PicSay.........................SM/CheckPayOff..............L..........2
    SM.TXT
        CheckPayOff: =628, 629
PicSet.........................MNSM/Form_Resize............L..........7
    MNSM.TXT
        Form_Resize: =303, =304, =305, =306, =307, 307, 308
Prnt...........................SM/PrintIt..................L..........2
    SM.TXT
        PrintIt: 1548, 1549
Radi...........................SM/CheckPayOff..............L..........4
    SM.TXT
        CheckPayOff: =601, 608, 609, 614
Re d...........................SM/LoadBitMaps..............L..........1
    SM.TXT
        LoadBitMaps: 824
Read...........................SM/LoadPalette..............L..........1
    SM.TXT
        LoadPalette: 789
RecEnd.........................SM/PrintStat................L..........2
    SM.TXT
        PrintStat: =?13, 921
RecEnd.........................SM/PrintWinStat.............L..........2
    SM.TXT
        PrintWinStat: =1569, 1576
RecNo..........................SM/PrintWinStat.............L..........3

Page:16  SM              Variable Cross-Ref
Scalar Variables
Name                          Mod/Proc                    Scope    # Refs
-------------------------------------------------------------------------

SM.TXT
        PrintWinStat: =1576, 1590, 1599
RecNo..........................SM/WriteStat................L..........5
    SM.TXT
        WriteStat: =882, =883, 883, 884, 893
RecNo..........................SM/PrintStat................L..........3
    SM.TXT
        PrintStat: =921, 935, 954
Res............................SM/ReadCard.................L.........10
    SM.TXT
        ReadCard: =1100, =1116, 1119, 1148, 1157, 1193, =1213, 1219, =1240,
            1246
Res............................MNSM/Form_KeyPress..........L..........1
    MNSM.TXT
        Form_KeyPress: 283
Res............................MNSM/Pic_Frame_KeyPress.....L..........1
    MNSM.TXT
        Pic_Frame_KeyPress: 318
Res............................SM/PlaySlots................L..........2
    SM.TXT
        PlaySlots: 404, 475
Res............................SM/CheckPayOff..............L..........4
    SM.TXT
        CheckPayOff: 563, =569, =574, 574
ResetInterval..................SMGLB.......................G..........2
    SM.TXT
        CheckReset: 1317
        LoadCommon: =1439
ResetTime......................SMGLB.......................G..........4
    SM.TXT
        CheckReset: 1314, 1317, =1320
        LoadCommon: =1406
ret............................SM/ReadCom..................L..........1
    SM.TXT
        ReadCom: =696
ret............................SM/CheckPayOff..............L..........1
    SM.TXT
        CheckPayOff: =635
ret............................SM/OpenCom..................L..........3
    SM.TXT
        OpenCom: =656, =667, =668
ret............................SM/ReadCard.................L..........3
    SM.TXT
        ReadCard: =1112, =1210, =1236
ret............................SM/CloseCom.................L..........1
    SM.TXT
        CloseCom: =701
ret............................SM/CloseCom.................L..........1
    SM.TXT
        CloseCom: =702
Row............................SM/LoadWheels...............L..........4
    SM.TXT
        LoadWheels: =356, =359, =360, 361
Rslt...........................SM/WriteStat................L..........2
    SM.TXT
        WriteStat: 866, 889
```

```
Page:17  SM                     Variable Cross-Ref
Scalar Variables
Name                            Mod/Proc                          Scope   # Refs
-------------------------------------------------------------------------------

RtLn.............................SM/PrintStat.....................L..........5
    SM.TXT
        PrintStat: =972, 973, 974, =975, 975
RtLn.............................SM/PrintCoupon...................L..........9
    SM.TXT
        PrintCoupon: =1675, =1684, =1687, 1711, 1712, =1713, 1713, =1716, 1721
RtLn.............................SM/PrintWinStat..................L..........5
    SM.TXT
        PrintWinStat: =1614, 1615, 1616, =1617, 1617
SMHandle.........................SM/LoadWheels....................L..........4
    SM.TXT
        LoadWheels: =354, 355, =357, 362
SMHandle.........................SM/LoadOdds......................L..........5
    SM.TXT
        LoadOdds: =480, 485, 486, =487, 538
SongName.........................SM/CheckMusic....................L..........2
    SM.TXT
        CheckMusic: =859, 861
SongNo...........................SM/CheckMusic....................L..........1
    SM.TXT
        CheckMusic: 851
Source...........................SM/CopyFile......................L..........3
    SM.TXT
        CopyFile: 1038, 1041, 1056
SpcAdd1..........................SM/PrintCoupon...................L..........8
    SM.TXT
        PrintCoupon: =1697, 1698, 1698, 1699, =1726, 1727, 1727, 1728
SpcAdd2..........................SM/PrintCoupon...................L..........6
    SM.TXT
        PrintCoupon: =1698, =1698, 1699, =1727, =1727, 1728
Spin.............................SMGLB............................G.........14
    SM.TXT
        LoadWheels: 371
        RotateWheel: 379, 382
        PlaySlots: 419, 419, 426, 427, 427, 443, 445
        CheckPayOff: 571, 585
        RefreshForm: 760
SpinCount........................SM/DrawWheel.....................L..........3
    SM.TXT
        DrawWheel: 385, 386, 387
SpinInit.........................SM/PlaySlots.....................L..........3
    SM.TXT
        PlaySlots: =421, =422, 423
SpinPos..........................SM/CheckPayOff...................L..........9
    SM.TXT
        CheckPayOff: =571, =572, 572, 572, 573, =585, =586, 586, 586
SpinRow..........................SM/RotateWheel...................L..........4
    SM.TXT
        RotateWheel: 377, 379, 381, =382
SpinRow..........................SM/DrawWheel.....................L..........9
    SM.TXT
        DrawWheel: 385, 388, 389, 390, 391, 393, 394, 395, 396
SpinRow..........................SM/CheckPayOff...................L.........13
    SM.TXT
        CheckPayOff: =570, 571, =573, 573, 574, 575, =584, 585, 587, 587, 587,
            =587, 588

Page:18  SM                     Variable Cross-Ref
Scalar Variables
Name                            Mod/Proc                          Scope   # Refs
-------------------------------------------------------------------------------

SpinRow..........................SM/DrawPic.......................L..........3
    SM.TXT
        DrawPic: 400, 401, 401
SpinRow..........................SM/LoadWheels....................L..........4
    SM.TXT
        LoadWheels: =370, =371, 372, 373
SpinRow..........................SM/RefreshForm...................L..........6
    SM.TXT
        RefreshForm: =758, 760, 762, 764, 764, 765
SpinRow..........................SM/PlaySlots.....................L.........21
    SM.TXT
        PlaySlots: =425, =426, 426, =427, 427, 428, =431, 432, 433, =439,
            =440, 441, =442, 442, 443, 444, 445, 445, 458, 458, 459
SpinStopRow......................SM/PlaySlots.....................L..........6
    SM.TXT
        PlaySlots: =417, 437, 440, =446, 446, 458
SpinTemp.........................SM/RotateWheel...................L..........6
    SM.TXT
        RotateWheel: =379, =380, 380, 380, 381, 382
SpinTemp.........................SM/RefreshForm...................L..........5
    SM.TXT
        RefreshForm: =760, =761, 761, 761, 762
SpinTimer........................SM/PlaySlots.....................L..........4
    SM.TXT
        PlaySlots: =430, 436, =463, 463
ST1..............................SM/PlaySlots.....................L..........2
    SM.TXT
        PlaySlots: =416, 430
StatHandle.......................SM/PrintWinStat..................L..........5
    SM.TXT
        PrintWinStat: =1564, 1566, 1568, 1590, 1623
StatHandle.......................SM/PrintStat.....................L..........5
    SM.TXT
        PrintStat: =908, 910, 912, 935, 981
StatHandle.......................SM/WriteStat.....................L..........9
    SM.TXT
        WriteStat: =867, 870, 876, 877, 878, 881, 885, 893, 894
StatInfo.........................SM/PrintStat.....................L..........4
    SM.TXT
        PrintStat: 909, 910, 912, 935
```

```
StatInfo...........................SM/PrintWinStat................L..........4
    SM.TXT
        PrintWinStat: 1565, 1566, 1569, 1590
StatInfo...........................SM/WriteStat...................L..........6
    SM.TXT
        WriteStat: 870, 876, 878, 881, 885, 893
StatInfo.CardNo....................SM/PrintWinStat................L..........1
    SM.TXT
        PrintWinStat: 1595
StatInfo.CardNo....................SM/WriteStat...................L..........2
    SM.TXT
        WriteStat: =872, =888
StatInfo.CardNo....................SM/PrintStat...................L..........2
    SM.TXT
        PrintStat: 938, 940

Page:19  SM              Variable Cross-Ref
Scalar Variables
Name                            Mod/Proc                     Scope    # Refs
-------------------------------------------------------------------------------

StatInfo.DatePlayed................SM/WriteStat...................L..........2
    SM.TXT
        WriteStat: =874, =890
StatInfo.DatePlayed................SM/PrintWinStat................L..........1
    SM.TXT
        PrintWinStat: 1593
StatInfo.DatePlayed................SM/PrintStat...................L..........1
    SM.TXT
        PrintStat: 936
StatInfo.Result....................SM/PrintWinStat................L..........2
    SM.TXT
        PrintWinStat: 1595, 1595
StatInfo.Result....................SM/WriteStat...................L..........2
    SM.TXT
        WriteStat: =873, =889
StatInfo.Result....................SM/PrintStat...................L..........2
    SM.TXT
        PrintStat: 938, 938
StatInfo.TimePlayed................SM/WriteStat...................L..........4
    SM.TXT
        WriteStat: =875, 882, =884, =891
StatInfo.TimePlayed................SM/PrintWinStat................L..........2
    SM.TXT
        PrintWinStat: 1569, 1594
StatInfo.TimePlayed................SM/PrintStat...................L..........2
    SM.TXT
        PrintStat: 913, 937
StatInfo.WinFlag...................SM/WriteStat...................L..........1
    SM.TXT
        WriteStat: =892
StatInfo.WinFlag...................SM/PrintStat...................L..........1
    SM.TXT
        PrintStat: =948
StatInfo.WinFlag...................SM/PrintWinStat................L..........1
    SM.TXT
        PrintWinStat: =1591
Step...............................SM/CheckPayOff.................L..........1
    SM.TXT
        CheckPayOff: 601
Step...............................SM/CheckReset..................L..........1
    SM.TXT
        CheckReset: 1317
StringToSet........................SM/LoadNewSoftware.............L..........3
    SM.TXT
        LoadNewSoftware: =1010, 1012, 1013
StripCount.........................SM/CheckSpin...................L..........3
    SM.TXT
        CheckSpin: =711, 712, 714
SwitchCtr..........................SMGLB..........................G..........6
    SM.TXT
        DrawPic: 401
        CheckPayOff: 573, =644, 644, 645, =645
temp...............................SM/LoadCommon..................L..........8
    SM.TXT
        LoadCommon: =1390, =1397, =1404, =1410, =1417, =1427, =1432, =1455

Page:20  SM              Variable Cross-Ref
Scalar Variables
Name                            Mod/Proc                     Scope    # Refs
------------------------------------------------------------------------------- temp...............................SM/CheckPayOff.................L..........2
    SM.TXT
        CheckPayOff: =598, =613
temp...............................SM/LoadPalette.................L..........2
    SM.TXT
        LoadPalette: =799, =800
temp...............................SM/LoadBitMaps.................L..........3
    SM.TXT
        LoadBitMaps: =841, =842, =843
temp...............................SM/SetVolume...................L..........1
    SM.TXT
        SetVolume: =1309
temp...............................MNSM/Form_Unload...............L..........5
    MNSM.TXT
        Form_Unload: =329, =330, =331, =335, =336
temp...............................SM/SetPause....................L..........1
    SM.TXT
        SetPause: =1504
temp...............................SM/LoadNewSoftware.............L..........2
    SM.TXT
        LoadNewSoftware: =1013, =1033
temp...............................SM/ReadCom.....................L..........1
    SM.TXT
        ReadCom: =680
```

```
temp..........................SM/DrawPic................L...........1
    SM.TXT
        DrawPic: =401
temp..........................SM/CheckBanner............L...........1
    SM.TXT
        CheckBanner: =1365
temp..........................SM/OpenCom................L...........1
    SM.TXT
        OpenCom: =651
temp..........................SM/PlaySlots.............. L...........2
    SM.TXT
        PlaySlots: =434, =460
TempDo........................SM/SetPauseDown...........L...........1
    SM.TXT
        SetPauseDown: =1529
TempDo........................SM/PrintTest..............L...........1
    SM.TXT
        PrintTest: =1748
TempDo........................SM/ResetCards.............L...........1
    SM.TXT
        ResetCards: =1265
TempDo........................SM/SetPauseUp.............L...........1
    SM.TXT
        SetPauseUp: =1495
TempHandle....................SM/Exists.................L...........6
    SM.TXT
        Exists: =735, 736, 736, 738, 739, 740
TempHandle....................SM/LoadNewSoftware........L...........5
    SM.TXT
        LoadNewSoftware: =1005, 1006, 1007, =1008, 1015
TempHandle....................SM/ReadCard...............L...........5
```

We claim:

1. A method for operating a promotional game for inducing potential customers to come to particular establishment, comprising the steps of:
   a) providing a game machine which is played for no consideration;
   b) establishing at least two separate series of images on said game machine, at least one of said series including representations of products, services or a combination of products and services;
   c) upon play by a patron, randomly moving said at least two series with respect to one another so that an image in one of said series will be aligned at a reference point with an image in another one of said series to form one of various combinations, select ones of said various combinations being winning combinations; and
   d) awarding a prize to said patron if one of said winning combinations is formed upon play by said patron, said prize being selected from the group consisting of said products or services whose representations form said one of said winning combinations, a product or service which is related to said products or services whose representations form said one of said winning combinations, and a retail product or service which is available from said establishment.

2. A method as claimed in claim 1, wherein said prize is related to said products or services whose representations form said one of said winning combinations.

3. A method as claimed in claim 1, further comprising the steps of:
   a) distributing game cards to patrons, each one of said game cards being coded with a game card code to identify the game card and an establishment code to identify said establishment; and
   b) automatically reading said game cards when inserted into said game machine and initiating said random movement step responsive to said establishment code meeting predetermined criteria.

4. A method as claimed in claim 1 further comprising the steps of:
   a) distributing game cards to patrons, each one of said game cards being coded with a game card code to identify the game card; and
   b) automatically reading said game cards when inserted into said game machine and initiating said random movement step responsive to the reading of said game cards.

5. A method as claimed in claim 4, wherein each one of said game cards is coded with a unique bar-code series.

6. A method as claimed in claim 4, wherein each one of said game cards is coded with a unique magnetic code upon a magnetic stripe on said game cards.

7. A method as claimed in claim 4, wherein said random movement step includes the step of positioning said at least two series so that the relative positions of said representations depend upon information coded on said game cards.

8. A method as claimed in claim 4, wherein said random movement step is performed by a random movement device in said game machine so that the relative positions of said representations do not depend upon information coded on said game cards.

9. A method as claimed in claim 4, further comprising the steps of recording identification data regarding each patron who requests one of said game cards and comparing said identification data to previously recorded identification data so as to prevent the issuance of more than one game card to each patron.

10. A method as claimed in claim 4, wherein said game card code is read by said game machine upon insertion of a game card into said game machine and is stored within said game machine for a selectable period of time.

11. A method as claimed in claim 10, wherein said stored game card code is erased from storage at the end of said selectable period of time.

12. A method as claimed in claim 10, wherein said game card code of an inserted game card is compared with all previously stored game card codes and the initiation of said random movement step is prevented if said game card code of said inserted game card matches one of said stored game card codes, whereby said random placement step can only be initiated once within said selectable period of time by a particular game card code.

13. A method as claimed in claim 10, wherein said game card code of an inserted game card is compared with all stored game card codes and the initiation of said random movement step is prevented if said game card code of said inserted game card is found to have been stored a selected number of times by said game machine within said selectable period of time.

14. A method as claimed in claim 13, wherein when initiation of said random movement step is prevented, a display is made of each time said inserted game card was used within said selectable period of time.

15. A method as claimed in claim 13, wherein said stored game card codes are erased from storage at the end of said selectable period of time.

16. A method as claimed in claim 1, wherein said establishing step includes the step of establishing said at least two separate series of images so that said representations of at least one of said products or services are present in two of said series, and said winning combinations include a match formed by aligning at said reference point a representation of a product or service in one of said two series with a representation of said product or service in another of said two series.

17. A method as claimed in claim 16, wherein said prize is related to said product or service whose representations on said two series form said match.

18. A method as claimed in claim 17, wherein said product or service whose representations form said match is a retail product or service available from said establishment.

19. A method as claimed in claim 18, wherein said establishment includes a plurality of retail locations and said prize is available from one of said retail locations.

20. A method as claimed in claim 1, wherein said establishing step includes the step of establishing said at least two separate series of images so that at least one of said series includes at least one wild card symbol and wherein at least one of said winning combinations includes said at least one wild card symbol.

21. A method as claimed in claim 20, wherein said winning combinations include at least one winning combination which does not include said wild card symbol and said prize is awarded in a magnitude which depends upon whether said wild card symbol is present in the particular winning combination which is formed.

22. A method as claimed in claim 20, wherein said wild card symbol is a symbol representing a business identity.

23. A method as claimed in claim 22, wherein said wild card symbol represents said business identity of said establishment in which said promotional game is operated.

24. A method as claimed in claim 20, further comprising the steps of:
a) distributing game cards to patrons, each one of said game cards being coded with a game card code to identify the game card and an establishment code to identify said establishment; and
b) automatically reading said game cards when inserted into said game machine and initiating said random movement step responsive to said establishment code meeting predetermined criteria.

25. A method as claimed in claim 20, further comprising the steps of:
a) distributing game cards to patrons, each one of said game cards being coded with a game card code to identify the game card; and
b) automatically reading said game cards when inserted into said game machine and initiating said random movement step responsive to the reading of said game cards.

26. A method as claimed in claim 1, wherein said establishing step includes the step of establishing at least three separate series of images including representations of products, services or a combination of products and services, and at least one wild card symbol, said representations of at least one of said products or services being present in at least two of said series, said winning combinations including a match formed by aligning at said reference point a representation of a product or service in one of said series with a representation of said product or service in another of said series, and at least one of said winning combinations including said at least one wild card symbol.

27. A method as claimed n claim 1, wherein said establishing step includes the step of displaying a visual representation of peripheral surface of each of at least two individual wheels in said game machine, each of said wheels containing one of said series of images, and wherein said step of randomly moving said at least two series includes the step of causing said individual wheels to rotate independently in said visual representation with respect to one another and then stop so that said various combinations of said images on said at least two wheels can be read out at said reference point.

28. A method as claimed in claim 27, wherein said establishing step includes the step of simultaneously displaying more than one of said images in each of said series, said various combinations including only said image in each of said series which is aligned at said reference point.

29. A method as claimed in claim 27, further comprising the step of displaying fixed images including representations of products, services or a combination of products and services, said fixed images remaining unchanged during said random movement step.

30. A method as claimed in claim 27, wherein said step of awarding a prize includes the step of providing a signal to a location remote from said game machine instructing that said prize be awarded to said playing patron.

31. A method as claimed in claim 27, wherein said step of displaying said visual representation of said wheels includes the step of displaying said representation on a video screen in said game machine, the method further comprising the step of displaying messages upon said video screen between plays by patrons.

32. A method as claimed in claim 27, wherein said step of awarding a prize includes the step of issuing a coupon by said game machine exchangeable for said prize.

33. A method as claimed in claim 32, wherein said coupon is pre-stored in said game machine.

34. A method as claimed in claim 32, wherein said coupon is printed by said game machine in response to the formation of said one of said winning combinations.

35. A method as claimed in claim 1, wherein said establishing step includes the step of displaying said at least two series of images on a video screen, the method further comprising the step of displaying messages upon said video screen between plays by patrons.

36. A method as claimed in claim 35, wherein said messages do not obstruct said images in said combination formed upon play.

37. A method as claimed in claim 35, wherein said messages include advertisements for products, services or a combination of products and services.

38. A method as claimed in claim 37, wherein said advertisements are for said products or services represented in said at least one of said two series.

39. A method as claimed in claim 1, wherein said establishing step includes the step of displaying said at least two series of images on a video screen, the method further comprising the step of displaying moving videos upon said video screen between plays by patrons.

40. A method as claimed in claim 39, wherein said moving videos include advertisements for products, services or a combination of products and services.

41. A method as claimed in claim 39, wherein said moving videos include a video demonstrating how to play the game.

42. A method as claimed in claim 1, wherein said establishing step includes the step of displaying said at least two series of images on a video screen, said images being displayed in an initial image size during play of the game, and one of said images in said one of said various combinations increasing in size to an enlarged size encompassing a major portion of said video screen at a predetermined period of time after said one of said various combinations has been formed.

43. A method as claimed in claim 42, further comprising the step of generating an advertising message for said product or service in said enlarged image after said image has been enlarged.

44. A method as claimed in claim 1, wherein said representations of products comprise images of packaging for said products.

45. A method for operating a promotional game for inducing potential customers to come to a particular establishment, comprising the steps of:
(a) providing a game machine which is played for no consideration;
(b) establishing at least two separate series of images on said game machine, said images including partial representations of products, services or a combination of products and services;
(c) upon play by a patron, randomly moving said at least two series with respect to one another so that an image in one of said series will be aligned at a reference point with an image in another one of said series in one of various combinations, select ones of said various combinations being winning combinations; and
(d) awarding a prize to said patron if one of said winning combinations is formed upon play by said patron, said prize being selected from the group consisting of said products or services whose representations form said one of said winning combinations, a product or service which is related to said products or services whose representations form said one of said winning combinations, and a retail product or service which is available from said establishment.

46. A method a claimed in claim 45, wherein said winning combinations include a match formed by aligning a partial representation of a product or service in each one of said at least two series to display a complete representation of said product or service.

47. A method as claimed in claim 46, wherein said prize is related to said product or service whose partial representations form said complete representation.

48. A method as claimed in claim 47, wherein said product or service whose partial representations form said match is available from said establishment.

49. A method as claimed in claim 45, wherein said establishing step includes the step of establishing said at least two separate series of images so that at least one of said series includes at least one wild card symbol, and wherein at least one of said winning combinations includes said at least one wild card symbol.

50. A method as claimed in claim 45, wherein said partial representations of products comprise partial images of packaging for said products.

51. A method for operating a promotional game for inducing potential customers to come to a particular establishment, comprising the steps of:
a) providing a game machine;
b) establishing at least two separate series of images on said game machine, said images including representations of products, services or a combination of products and services;
c) randomly moving said at least two series with respect to one another so that a representation in one of said series will be aligned at a reference point with a representation in another one of said series to form one of various combinations, select ones of said various combinations including a match formed by aligning a representation of a product or service in one of said series with a representation of said product or service in another of said series; and
d) awarding a prize on each play of the game, said prize being selected from the group consisting of said product or service whose representation appears at said reference point in said one of said series, a product or service which is related to said product or service whose representation appears at said reference point in said one of said series, and a retail product or service which is available from said establishment, said prize being awarded in a first magnitude when said one combination does not include said match, and said prize being awarded in a second magnitude greater than said first magnitude when said one combination includes said match.

52. A method as claimed in claim 51, wherein said representations of products comprise images of packaging for said products.

53. A promotional game apparatus for inducing potential customers to come to a particular establishment, comprising
a) display means for establishing a reference point and at least two separate series of images, at least one series including representations of products, services or a combination of products and services, said at least two series being independently movable with respect to one another and with respect to said reference point so that an image in one of said series can be aligned at said reference point with an image in another one of said series to form various combinations, select ones of said various combination being winning combinations;
b) movement means for moving said at least two series with respect to one another so as to form said various combinations randomly;
c) activating means for activating said movement means for no consideration;
d) means for signaling that one of said winning combinations has been formed; and
e) means for awarding a prize upon the formation of said one of said winning combinations, said prize being selected from the group consisting of said products or services whose representations form said one of said winning combinations, a product or service which is related to said products or services whose representations form said one of said winning combinations, and a retail product or service which is available from said establishment.

54. The promotional game apparatus as claimed in claim 53, wherein said winning combinations include a match formed by aligning at said reference point a representation of a product or service in one of said series with a representation of said product or service in another of said series, and said means for awarding a prize includes means for awarding a prize related to said product or service whose representations on said series form said match.

55. The promotional game apparatus as claimed in claim 54, wherein at least one of said series includes at least one wild card symbol and wherein select ones of said winning combinations include said at least one wild card symbol.

56. The promotional game apparatus as claimed in claim 55, wherein said wild card symbol is a symbol representing a business identity.

57. The promotional game apparatus as claimed in claim 56, wherein said wild card symbol represents said business identity of said establishment.

58. The promotional game apparatus as claimed in claim 53, wherein said representations of products comprise images of packaging for said products.

59. A promotional game apparatus for inducing potential customers to come to a particular establishment, comprising
a) display means for establishing a reference point and at least two separate series of images, at least one series including representations of products, services or a combination of products and services, said at least two series being independently movable with respect to one another and with respect to said reference point so that an image in one of said series can be aligned at said reference point with an image in another one of said series to form various combinations, select ones of said various combinations being winning combinations;
b) movement means for moving said at least two series with respect to one another so as to form said various combinations randomly;
c) reading means for reading a code on a game card and for signaling said movement means to move said at least two series in response to said code;
d) detection means for determining when one of said winning combinations has been formed at said reference point; and
e) means responsive to said detection means for awarding a prize upon the formation of said one of said winning combinations, said prize being selected from the group consisting of said products or services whose representations form said one of said winning combinations, a product or service which is related to said products or services whose representations form said one of said winning combinations, and a retail product or service which is available from said establishment.

60. The promotional game apparatus as claimed in claim 59, wherein said code includes a first portion comprising a game card code for identifying the game card and a second portion comprising an establishment code for identifying establishments at which said game card may be used, and wherein said reading means reads said first and second portions of said code and signals said movement means to move said at least two series randomly in response to predetermined establishment codes.

61. The promotional game apparatus as claimed in claim 59, wherein said representations of products comprise images of packaging for said products.

* * * * *

UNITED STATES PATENT AND TRADEMARK OFFICE
CERTIFICATE OF CORRECTION

PATENT NO. : 5,373,440

DATED : December 13, 1994

INVENTOR(S) : Cohen et al.

It is certified that error appears in the above-identified patent and that said Letters Patent is hereby corrected as shown below:

Column 1, line 61, "4 723,212" should read --4,723,212--.

Column 5, line 9, "9B" should read --9b--.

Column 16, after line 9, insert --bodiments and that other arrangements may be devised--.

Column 31, item 579, "= tr" should read --= true--.

Column 88, line 61, "placement" should read --movement--.

Column 90, line 11, "n" should read --in--.

Column 90, line 13, "of peripheral" should read --of a peripheral--.

Signed and Sealed this

Twelfth Day of December, 1995

Attest:

BRUCE LEHMAN

Attesting Officer

Commissioner of Patents and Trademarks